(12) United States Patent
Yamashita et al.

(10) Patent No.: US 7,153,017 B2
(45) Date of Patent: *Dec. 26, 2006

(54) LIGHT DEFLECTION ELEMENT AND LIGHT SOURCE APPARATUS USING THE SAME

(75) Inventors: Tomoyoshi Yamashita, Kanagawa (JP); Issei Chiba, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 82 days.

This patent is subject to a terminal disclaimer.

(21) Appl. No.: 10/502,931

(22) PCT Filed: Jan. 30, 2003

(86) PCT No.: PCT/JP03/00923

§ 371 (c)(1),
(2), (4) Date: Jul. 29, 2004

(87) PCT Pub. No.: WO03/065083

PCT Pub. Date: Aug. 7, 2003

(65) Prior Publication Data

US 2005/0094295 A1    May 5, 2005

(30) Foreign Application Priority Data

| Jan. 31, 2002 | (JP) | ............................. | 2002-024422 |
| Feb. 7, 2002 | (JP) | ............................. | 2002-031418 |
| Mar. 15, 2002 | (JP) | ............................. | 2002-072971 |
| May 13, 2002 | (JP) | ............................. | 2002-137098 |

(51) Int. Cl.
*F21V 7/04* (2006.01)

(52) U.S. Cl. ...................... 362/606; 362/620; 362/626; 362/615; 362/330; 362/339

(58) Field of Classification Search ................ 362/330, 362/339, 606, 607
See application file for complete search history.

(56) References Cited

U.S. PATENT DOCUMENTS

| 5,668,913 | A | * | 9/1997 | Tai et al. ..................... 385/146 |
| 6,011,602 | A | | 1/2000 | Miyashita et al. |
| 6,502,947 | B1 | | 1/2003 | Matsumoto et al. ........ 362/626 |
| 6,648,485 | B1 | | 11/2003 | Colgan et al. .............. 362/600 |

FOREIGN PATENT DOCUMENTS

| EP | 0 292 159 A1 | 11/1988 |
| JP | 63-298902 A | 6/1988 |

(Continued)

*Primary Examiner*—Renee Luebke
*Assistant Examiner*—Zahra I. Bennett
(74) *Attorney, Agent, or Firm*—Morgan, Lewis & Bockius, LLP

(57) ABSTRACT

A surface light source apparatus includes a primary light source (1), an optical guide (3) for guiding light emitted from the primary light source and having a light incoming surface (31) and a light outgoing surface (32), a light deflection element (4) arranged adjacent to the light outgoing surface of the optical guide and having a light incoming surface (41) and a light outgoing surface (42), and a light diffusion element (6) arranged adjacent to the light outgoing surface of the light deflection element. The light incoming surface (41) of the light deflection element has a plurality of prism strings arranged substantially parallel to each other and each having two prism surfaces. At least one of the prism surfaces of these prism strings has a prism surface consisting of at least two planes having different inclination angles. As the plane approaches the light going surface, the inclination becomes larger.

34 Claims, 18 Drawing Sheets

FOREIGN PATENT DOCUMENTS

| | | |
|---|---|---|
| JP | 7-8804 | 1/1995 |
| JP | 07-230002 A | 8/1995 |
| JP | 0-8304607 A | 11/1996 |
| JP | 9-105804 A | 4/1997 |
| JP | 9-507584 A | 7/1997 |
| JP | 11-38209 A | 2/1999 |
| JP | 11-271765 | 8/1999 |
| JP | 11-271765 A * | 10/1999 |
| JP | 2000-35763 A | 2/2000 |
| JP | 2000-15840 A | 6/2000 |
| JP | 2001-124909 A | 5/2001 |
| JP | 2001-143515 | 5/2001 |
| JP | 2003-66206 A | 3/2003 |

* cited by examiner

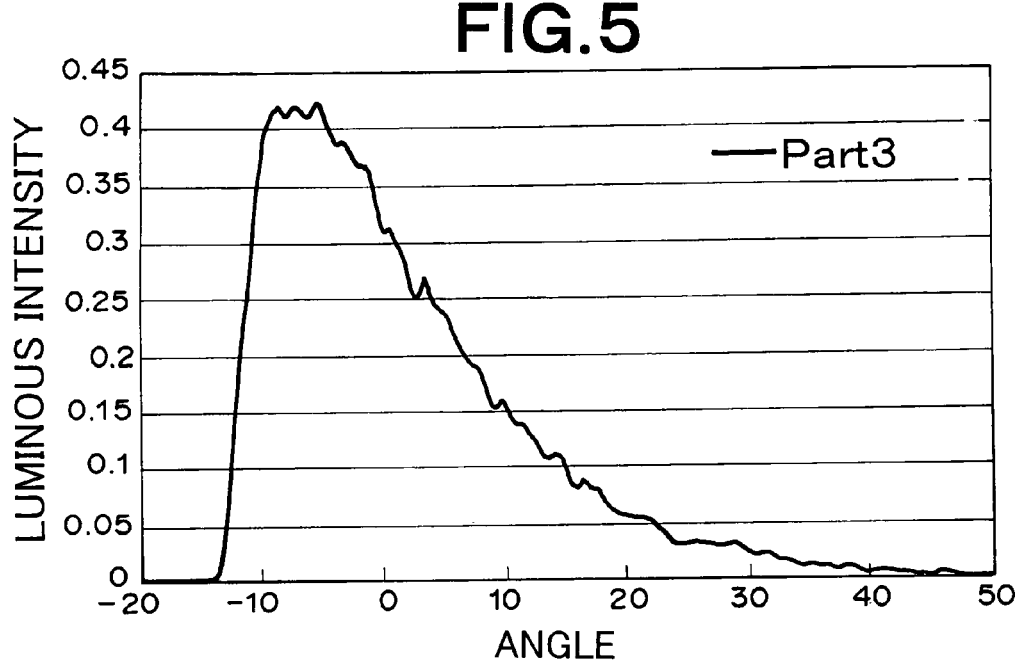
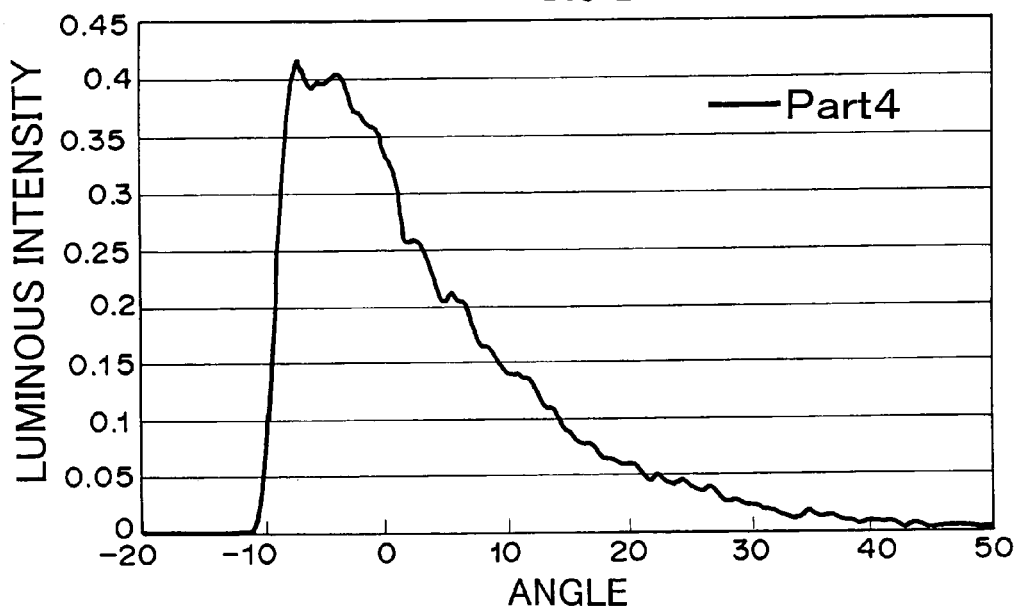

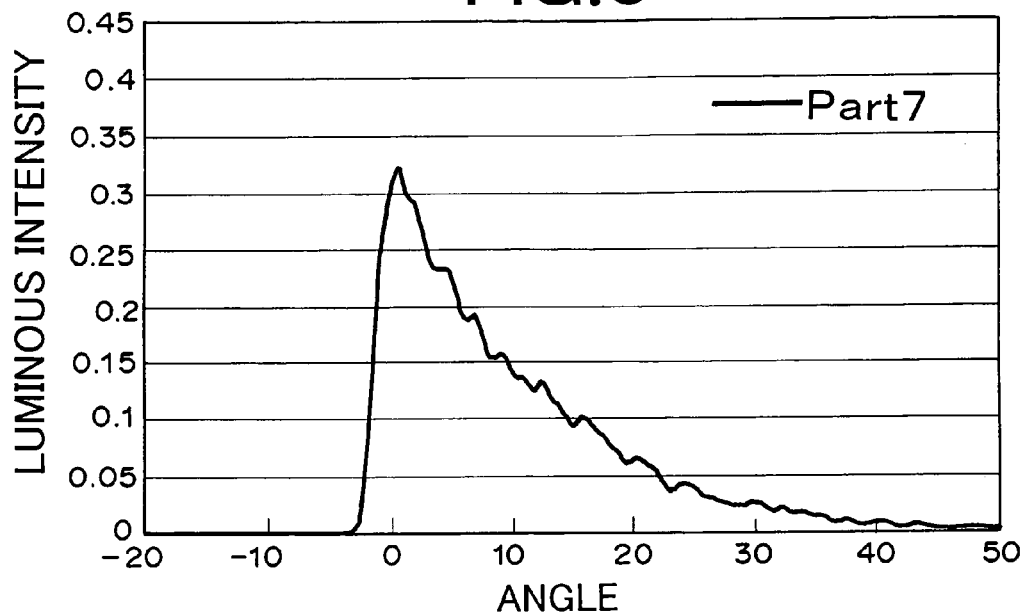
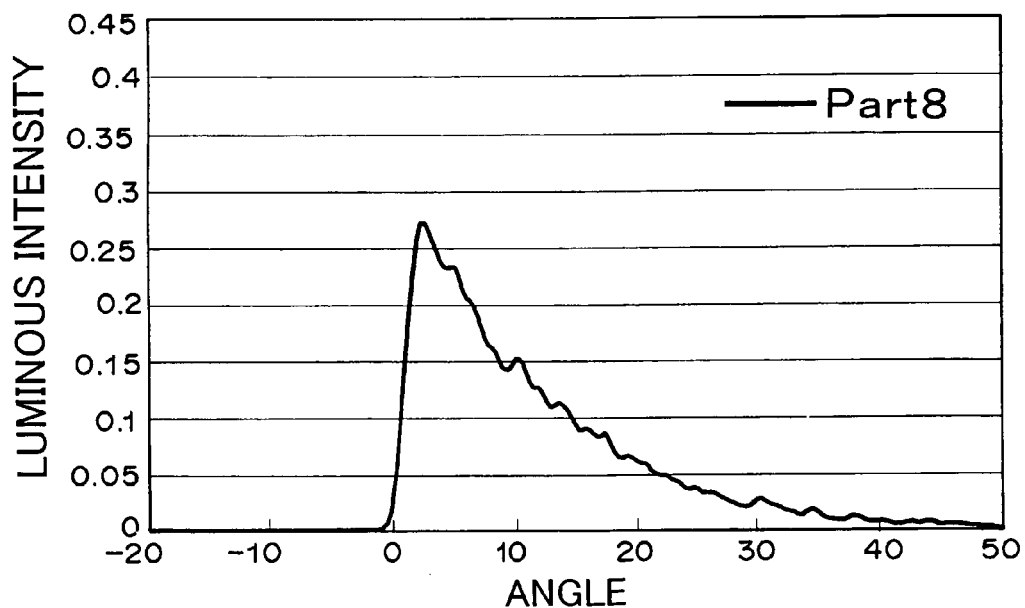

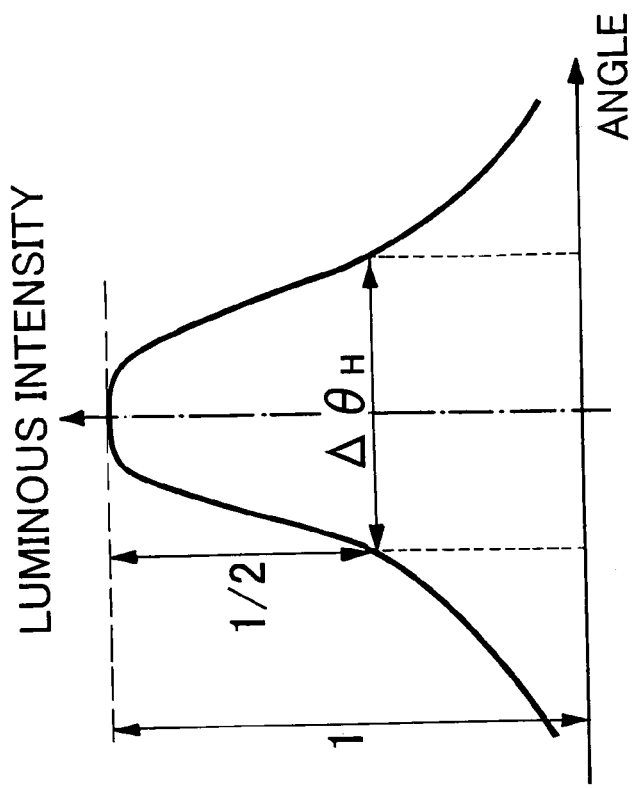
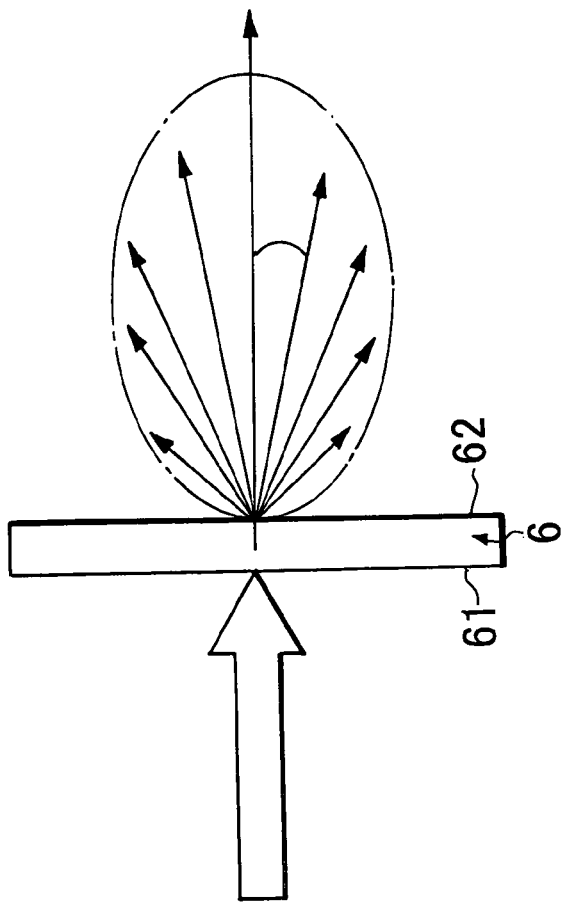
FIG.21

LIGHT DEFLECTION ELEMENT AND LIGHT SOURCE APPARATUS USING THE SAME

TECHNICAL FIELD

The present invention relates to an edge-light type light source device or light source apparatus forming a liquid crystal display device or the like that is used as a display portion in a notebook personal computer, a liquid crystal television, a portable telephone (cellular phone), a portable information terminal (personal digital assistants), or the like, and to a light deflector or light deflection element for use in the light source device. Particularly, the present invention relates to an improvement in the light deflector disposed adjacent to a light outgoing surface of a light guide of the light source device.

BACKGROUND ART

In recent years, color liquid crystal display devices have been widely used in various fields as monitors of portable notebook personal computers, personal computers, and so forth, or as display portions of liquid crystal televisions, video-combined liquid crystal televisions, portable telephones, portable information terminals, and so forth. Further, following increase in information processing amount, diversification of needs, multimedia adaptation, and so forth, increase in screen size and fineness of the liquid crystal display devices has been actively developed.

The liquid crystal display device basically comprises a backlight portion and a liquid crystal display element portion. For the backlight portion, there is an under-light type wherein a light source is disposed directly under the liquid crystal display element portion, or an edge-light type wherein a light source is disposed facing a side end surface of a light guide. In terms of making compact the liquid crystal display device, the edge-light type has often been used.

In recent years, for a display device with a relatively small screen size wherein a viewing direction range is relatively narrow, such as a liquid crystal display device used as a display portion of, for example, a portable telephone, use has been made of, in terms of reducing power consumption, one, as a backlight portion of the edge-light type, that reduces a spread angle of light emitted from a screen as much as possible to emit light in a concentrated manner in a required angle range for effectively utilizing the quantity of light emitted from a primary light source.

In the light source device used in the display device wherein the viewing direction range is limited as described above, in order to emit light in a concentrated manner in a relatively narrow range for increasing the utilization efficiency of the quantity of light of a primary light source to thereby reduce the power consumption, the present applicant has proposed in JP(A)-2001-143515 to use a prism sheet having prism-formed surfaces on both sides thereof so as to dispose it adjacent to a light outgoing surface of a light guide. In this double-sided prism sheet, a light entrance surface being one surface and a light exit surface being the other surface are respectively formed with a plurality of mutually parallel elongated prisms, wherein the directions of the elongated prisms are matched with each other on the light entrance surface and the light exit surface and further the elongated prisms are disposed at corresponding positions on both surfaces. With this configuration, light having a peak of outgoing light in a direction inclined relative to the light outgoing surface of the light guide and exiting from the light outgoing surface so as to be distributed in a proper angle range is incident on one-side prism surfaces at the light entrance surface of the prism sheet, then is internally reflected by the other-side prism surfaces, and is further subjected to a refraction action by the elongated prisms at the light exit surface, so that the light is emitted in a concentrated manner in a relatively narrow, required direction range.

According to this light source device, the concentrated light emission in the narrow angle range is enabled. However, in the prism sheet used as a light deflector, the plurality of mutually parallel elongated prisms are required such that the directions of the elongated prisms are matched with each other on the light entrance surface and the light exit surface, and further, the elongated prisms are disposed at the corresponding positions on both surfaces. This formation is complicated.

It is therefore an object of the present invention to provide a light deflector and light source device advantageous in control of very narrow distribution of the outgoing light, excellent in light utilization efficiency of a primary light source (that is, high in efficiency of allowing light emitted from a primary light source to convergently exit in a required observation direction), and also easy to improve quality for image forming illumination with a simple structure.

DISCLOSURE OF THE INVENTION

According to the present invention, there is provided a light deflector comprising a light entrance surface on which light is incident and a light exit surface located on an opposite side relative to the light entrance surface and allowing the incident light to exit therefrom, wherein the light entrance surface is formed with a plurality of elongated prisms arrayed substantially parallel to each other and each composed of two prism surfaces, at least one of the prism surfaces of each of the elongated prisms comprises at least two flat surfaces having mutually different inclination angles, any one of the flat surfaces located on a side closer to the light exit surface has a larger inclination angle, and a difference between the inclination angle of one of the flat surfaces closest to the light exit surface and the inclination angle of the other one of the flat surfaces farthest from the light exit surface is 15 degrees or less.

According to the present invention, there is also provided a light deflector comprising a light entrance surface on which light is incident and a light exit surface located on an opposite side relative to the light entrance surface and allowing the incident light to exit therefrom, wherein the light entrance surface is formed with a plurality of elongated prisms arrayed substantially parallel to each other and each composed of two prism surfaces, at least one of the prism surfaces of each of the elongated prisms comprises at least three flat surfaces having mutually different inclination angles, and any one of the flat surfaces located on a side closer to the light exit surface has a larger inclination angle.

According to the present invention, there is also provided a light deflector comprising a light entrance surface on which light is incident and a light exit surface located on an opposite side relative to the light entrance surface and allowing the incident light to exit therefrom, wherein the light entrance surface is formed with a plurality of elongated prisms arrayed substantially parallel to each other and each composed of two prism surfaces, at least one of the prism surfaces of each of the elongated prisms comprises at least two convex curved surfaces having mutually different inclination angles, and any one of the convex curved surfaces located on a side closer to the light exit surface has a larger inclination angle.

According to the present invention, there is also provided a light deflector comprising a light entrance surface on which light is incident and a light exit surface located on an opposite side relative to the light entrance surface and allowing the incident light to exit therefrom, wherein the light entrance surface is formed with a plurality of elongated prisms arrayed substantially parallel to each other and each composed of two prism surfaces, at least one of the prism surfaces of each of the elongated prisms comprises at least two flat surfaces having mutually different inclination angles and at least one convex curved surface, and any one of the flat and convex curved surfaces located on a side closer to the light exit surface has a larger inclination angle.

According to the present invention, there is also provided a light deflector comprising one surface serving as a light entrance surface and the other surface located on an opposite side relative to the one surface and serving as a light exit surface, wherein the light entrance surface is formed with a plurality of elongated prisms arrayed parallel to each other, each of the elongated prisms has two prism surfaces being a first prism surface and a second prism surface, and at least the second prism surface is formed as a substantially flat surface at one portion thereof located on a side of a vertex portion of each of the elongated prisms while formed into a convex curved surface at the other portion thereof located on a side of said light exit surface, and wherein a ratio (h/H) of a height (h) from the vertex portion of each of the elongated prisms to a portion of the convex curved surface relative to a height (H) of each of the elongated prisms is 25 to 60%.

According to the present invention, there is also provided a light source device comprising a primary light source, a light guide that guides light emitted from the primary light source and has a light incident surface on which the light emitted from the primary light source is incident, and a light outgoing surface from which the guided light exits, and any one of the above light deflectors disposed adjacent to the light outgoing surface of the light guide.

BRIEF DESCRIPTION OF THE DRAWINGS

FIG. 5 is an explanatory diagram showing outgoing light luminous intensity distribution (in the XZ-plane) from respective areas of the second prism surface (flat surface) of the light deflector;

FIG. 6 is an explanatory diagram showing outgoing light luminous intensity distribution (in the XZ-plane) from respective areas of the second prism surface (flat surface) of the light deflector;

FIG. 9 is an explanatory diagram showing outgoing light luminous intensity distribution (in the XZ-plane) from respective areas of the second prism surface (flat surface) of the light deflector;

FIG. 10 is an explanatory diagram showing outgoing light luminous intensity distribution (in the XZ-plane) from respective areas of the second prism surface (flat surface) of the light deflector;

FIG. 21 is an explanatory diagram of a full width half maximum of an outgoing light luminous intensity distribution (in the XZ-plane) of a light diffuser;

BEST MODE FOR CARRYING OUT THE INVENTION

Hereinbelow, embodiments of the present invention will be described with reference to the drawings.

Figure 1:
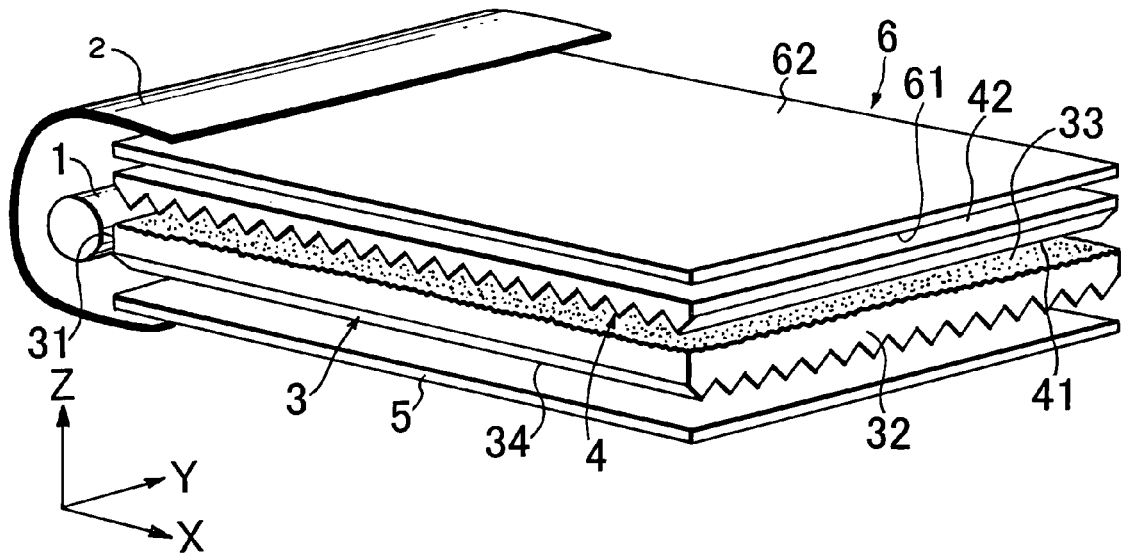
FIG. 1 is a schematic perspective view showing a light source device according to the present invention.

FIG. 1 is a schematic perspective view showing one embodiment of a surface light source device (planar light source device) as a light source device according to the present invention. As illustrated in FIG. 1, the light source device of the present invention comprises a light guide (optical guide) 3 in which at least one side end surface serves as a light incident surface (light incoming surface) 31 and one surface substantially perpendicular thereto serves as a light outgoing surface 33, a primary light source 1 disposed so as to face the light incident surface 31 of the light guide 3 and covered with a light source reflector 2, a light deflector or light deflection element 4 disposed on the light outgoing surface of the light guide 3, a light diffuser 6 disposed on a light exit surface (light outgoing surface) of the light deflector 4, and a light reflector 5 disposed so as to face a back surface 34 of the light guide 3 on its side opposite to the light outgoing surface 33.

The light guide 3 is disposed in parallel to the XY-plane and forms a rectangular plate shape on the whole. The light guide 3 has four side end surfaces wherein at least one of a pair of the side end surfaces parallel to the YZ-plane is used as the light incident surface 31. The light incident surface 31 is disposed so as to face the primary light source 1 so that light emitted from the primary light source 1 enters the light guide 3 through the light incident surface 31. In the present invention, for example, a light source may also be disposed so as to face another side end surface such as a side end surface 32 located on a side opposite to the light incident surface 31.

Two principal surfaces of the light guide 3 that are substantially perpendicular to the light incident surface 31 are located substantially in parallel to the XY surface, respectively, and either one principal surface (upper surface in the figure) is used as the light outgoing surface 33. A directive light-emitting function portion in the form of a roughened surface, a directive light-emitting function portion in the form of a lens surface on which a number of elongated lenses such as elongated prisms, elongated lenticular lenses, V-shaped grooves, or the like are formed side by side substantially parallel to the light incident surface 31, or the like is given to at least one of the light outgoing surface 33 and the back surface 34, so that light entering through the light incident surface 31 is guided in the light guide 3 and emitted from the light outgoing surface 33 as light having a directivity in the luminous intensity distribution in the plane (XZ-plane) that is perpendicular to the light incident surface 31 and the light outgoing surface 33. An angle formed between a direction of a peak of an outgoing light luminous intensity distribution in the XZ-plane distribution and the light outgoing surface 33 is set to a. This angle a is preferably set to 10 to 40 degrees, and the full width half maximum of the outgoing light luminous intensity distribution is preferably set to 10 to 40 degrees.

It is preferable in terms of improving the uniformity degree of luminance in the light outgoing surface 33 that the roughened surface or the elongated lenses formed on the surface of the light guide 3 be so set that an average inclination angle θa pursuant to ISO4287/1-1984 falls within the range of 0.5 to 15 degrees. The average inclination angle θa more preferably falls within the range of 1 to 12 degrees, and further preferably 1.5 to 11 degrees. It is preferable that the average inclination angle θa be set in the optimum range according to a ratio (L/t) of a thickness (t) of the light guide 3 and a length (L) thereof in a direction of propagation of the incident light. That is, when use is made of the light guide 3 having L/t of about 20 to 200, the average inclination angle θa is preferably set to 0.5 to 7.5 degrees, more preferably 1 to 5 degrees, and further preferably 1.5 to 4 degrees. On the other hand, when use is made of the light guide 3 having L/t of about 20 or less, the average inclination angle θa is preferably set to 7 to 12 degrees, and more preferably 8 to 11 degrees.

The average inclination angle θa of the roughened surface formed on the light guide 3 can be derived from the following equations (1) and (2) with an inclination function f(x) obtained by measuring a shape of the roughened surface using a contact-stylus type surface roughness meter and setting coordinates in a measurement direction as x, according to ISO4287/1-1984. Herein, L represents a measured length and Δa represents a tangent of the average inclination angle θa.

$$\Delta a = (1/L) \int_0^L |(d/dx) f(x)| dx \qquad (1)$$

$$\theta a = \tan^{-1}(\leftarrow a) \qquad (2)$$

Further, the light guide 3 has a light emission ratio preferably in the range of 0.5 to 5%, and more preferably 1 to 3%. This is because when the light emission ratio becomes smaller than 0.5%, there is a tendency that the quantity of light exiting from the light guide 3 decreases so that a sufficient luminance cannot be obtained, while, when the light emission ratio becomes greater than 5%, there is a tendency that a large quantity of light exits in the vicinity of the primary light source 1 so that attenuation of the outgoing light becomes significant in the X-direction on the light outgoing surface 33 to thereby lower the uniformity degree of luminance at the light outgoing surface 33. By setting the light emission ratio of the light guide 3 to 0.5 to 5% as described above, it is possible to provide a light source device that can emit from the light guide 3 the light having an exiting characteristic of a high directivity such that the angle (peak angle) of the peak light in the outgoing light luminous intensity distribution (in the XZ-plane) of the light exiting from the light outgoing surface falls within the range of 50 to 80 degrees relative to a normal of the light outgoing surface and the full width half maximum of the outgoing light luminous intensity distribution (in the XZ-plane) in the XZ-plane perpendicular to both the light incident surface and the light outgoing surface is 10 to 40 degrees, that can efficiently deflect a direction of the emission by the light deflector 4, and that can achieve a high luminance.

In the present invention, the light emission ratio of the light guide 3 is defined as follows. A light intensity ($I_0$) of outgoing light at an edge of the light outgoing surface 33 on the side of the light incident surface 31 and an outgoing light intensity (I) at a position of a distance L from the edge of the light outgoing surface 33 on the side of the light incident surface 31 satisfies a relationship of the following equation (3) given that the thickness (dimension in Z-direction) of the light guide 3 is t.

$$I=I_0 \cdot \alpha(1-\alpha)^{L/t} \qquad (3)$$

where a constant a represents the light emission ratio and is a ratio (%) of emission of light from the light guide 3 per unit length (length corresponding to the light guide thickness t) on the light outgoing surface 33 in the X-direction perpendicular to the light incident surface 31. With the axis of ordinates representing logarithm of light intensity of outgoing light from the light outgoing surface 23 and the axis of abscissas representing (L/t), a relationship thereof is plotted so that the light emission ratio α can be derived from a gradient thereof.

Further, it is preferable that a lens surface arranged with a number of elongated lenses extending in the direction (X-direction) substantially perpendicular to the light incident surface 31 be formed at the other principal surface, on which the directive light emitting function portion is not formed, for controlling the directivity of the outgoing light from the light guide 3 in the plane (YZ-plane) parallel to the primary light source 1. In the embodiment illustrated in FIG. 1, the light outgoing surface 33 is formed into a roughened surface, while the back surface 34 is formed with a lens surface composed of an array of a number of elongated lenses extending in the direction (X-direction) substantially perpendicular to the light incident surface 31. In the present invention, conversely to the embodiment illustrated in FIG. 1, the light outgoing surface 33 may be formed with the lens surface while the back surface 34 may be formed into the roughened surface.

When forming the elongated lenses at the back surface 34 or the light outgoing surface 33 of the light guide 3 as illustrated in FIG. 1, the elongated lenses may be elongated prisms, elongated lenticular lenses, V-shaped grooves, or the like extending substantially in the X-direction, while it is preferable that the elongated lenses be elongated prisms having a substantially triangular shape in YZ-section.

In the present invention, when forming the elongated prisms as the elongated lenses at the light guide 3, a vertical angle thereof is preferably set in the range of 70 to 150 degrees. This is because setting the vertical angle in this range makes it possible to sufficiently condense the outgoing light from the light guide 3 to thereby achieve sufficient improvement in luminance of the surface light source device. Specifically, setting the prism vertical angle in this range makes it possible to emit the condensed outgoing light in which the full width half maximum of the outgoing light luminous intensity distribution is 35 to 65 degrees in the plane including the peak light in the outgoing light luminous intensity distribution (in the XZ-plane) and perpendicular to the XZ-plane, to thereby improve the luminance of the surface light source device. When forming the elongated prisms at the light outgoing surface 33, the vertical angle is preferably set in the range of 80 to 100 degrees, while, when forming the elongated prisms at the back surface 34, the vertical angle is preferably set in the range of 70 to 80 degrees or 100 to 150 degrees.

In the present invention, instead of forming the light emitting function portion at the light outgoing surface 33 or the back surface 34 as described above or in addition thereto, a directive light emitting function may be given by mixing and dispersing light diffusion particles in the light guide. Further, for the light guide 3, various shapes such as a wedge shape and a boat shape can be used without being limited to the shape illustrated in FIG. 1.

Figure 2:
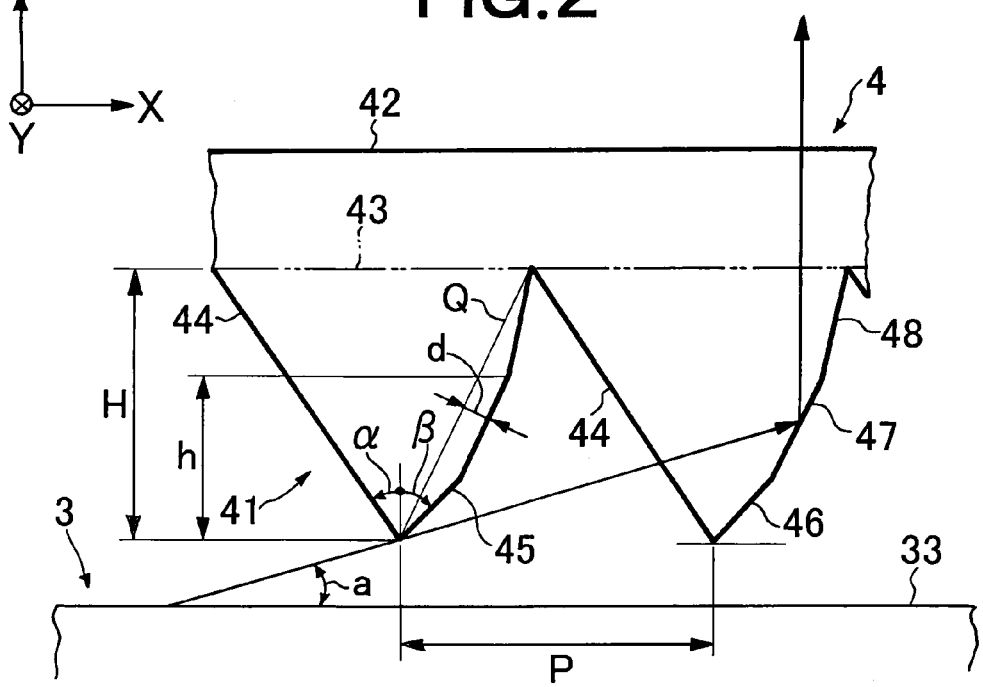
FIG. 2 is an explanatory diagram of the shape of each of elongated prisms of a light entrance surface of a light deflector according to the present invention.

FIG. 2 is an explanatory diagram of the shape of each of elongated prisms of the light deflector 4. The light deflector 4 uses one of its principal surfaces as a light entrance surface (light incoming surface) 41 and the other as a light exit surface (light outgoing surface) 42. The light entrance surface 41 has a number of elongated prisms arranged substantially in parallel to each other, and each elongated prism is composed of two prism surfaces, i.e. a first prism surface 44 located on the side closer to the primary light source and a second prism surface 45 located on the side farther from the primary light source. In the embodiment illustrated in FIG. 2, the first prism surface 44 is formed flat, while the second prism surface 45 is composed of three flat surfaces 46 to 48 having mutually different inclination angles wherein any one of the flat surfaces closer to the light exit surface has a larger inclination angle. Among the flat surfaces 46 to 48, a difference in inclination angle between the flat surface 48 closest to the light exit surface and the flat surface 46 farthest from the light exit surface is set to 15 degrees or less. Note that, in the present invention, the inclination angle of the flat surface represents an inclination angle of each flat surface relative to an elongated prism formed plane 43.

In the light deflector 4 of the present invention, the second prism surface 45 comprises at least two flat surfaces having mutually different inclination angles wherein the flat surface closer to the light exit surface has a larger inclination angle and the difference in inclination angle between the flat surface closest to the light exit surface and the flat surface farthest from the light exit surface is set to 15 degrees or less, so that an extremely high light condensing effect can be exhibited to thereby achieve an extremely high luminance of the light source device. This difference in inclination angle between the flat surface closest to the light exit surface and the flat surface farthest from the light exit surface is preferably in the range of 0.5 to 10 degrees and more preferably 1 to 7 degrees. Note that in case of forming three or more flat surfaces having different inclination angles, such a difference in inclination angle is preferably set in the foregoing range, but not particularly limited thereto. By configuring the second prism surface 45 as described above, it is possible to easily design a light deflector having a desired light condensing property and also possible to stably produce light deflectors having constant optical properties.

Figure 13:
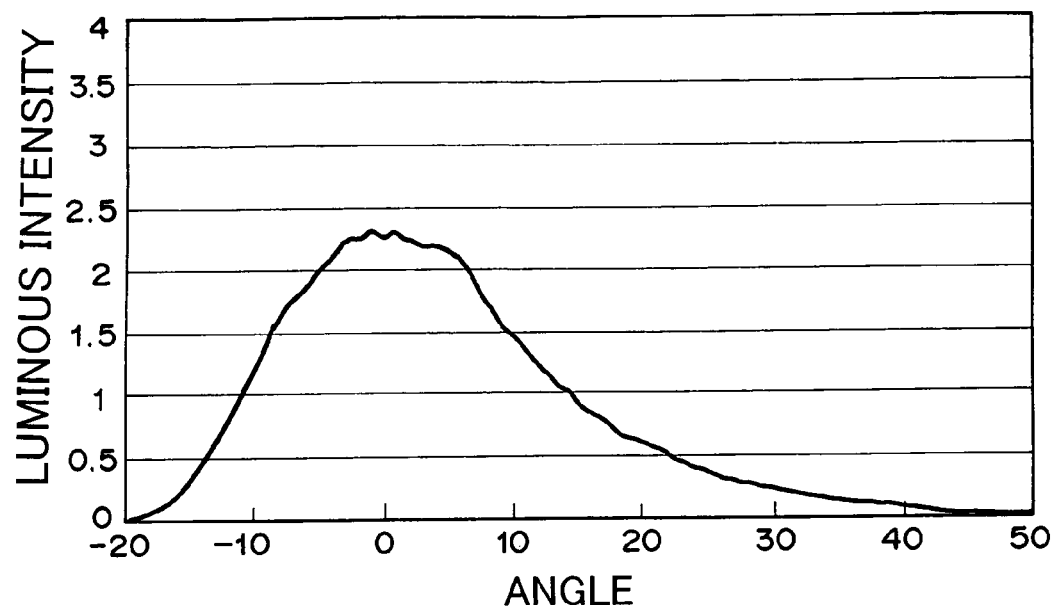
FIG. 13 is an explanatory diagram showing outgoing light luminous intensity distribution (in the XZ-plane) from the whole second prism surface (flat surface) of the light deflector.

Now, description will be made of shapes of prism surfaces of light deflectors of the present invention. FIGS. 3 to 14 show in what outgoing light luminous intensity distributions (in the XZ-plane) light whose peak angle in an outgoing light luminous intensity distribution (in the XZ-plane) from the light guide is 20 degrees exits from a conventional light deflector wherein two prism surfaces are both flat and a prism vertical angle is 65.4 degrees, in the plane perpendicular to both the light incident surface and the light outgoing surface of the light guide. FIGS. 3 to 12 show the states where incident light entering through the first prism surface is totally reflected by the second prism surface so as to exit from the light exit surface 42, i.e. show outgoing light luminous intensity distributions (in the XZ-plane) from respective areas that are obtained by evenly dividing the second prism surface into ten areas relative to the X-direction. The ten areas are given as Part 1, Part 2, ... Part 10 in order of location closer to the prism vertex portion. In an outgoing light luminous intensity distribution (in the XZ-plane) of the whole light that is totally reflected by the second prism surface to exit, peak light thereof exits in the normal direction and a full width half maximum is 22 degrees as shown in FIG. 13.

However, when observing the outgoing light luminous intensity distributions (in the XZ-plane) in the respective areas Part 1 to Part 10, it is understood that peak angles appear around −9 degrees (a negative angle value represents inclination toward the primary light source given that the normal direction is set to 0 degrees) in Part 1 and Part 2, then peak lights shift toward the 0-degree direction (normal direction) in Part 3 to Part 7 in order, and further shift toward the positive-angle direction in Part 8 to Part 10 in order. The peak angle of the light that is totally reflected by the area (Part 10) closest to the light exit surface 42 to exit is 7 degrees, and therefore, there is dispersion of 16 degrees in peak angle over the second prism surface (from Part 1 to Part 10). Further, the intensity of peak light from each area gradually decreases from Part 1 to Part 10.

Figure 14:
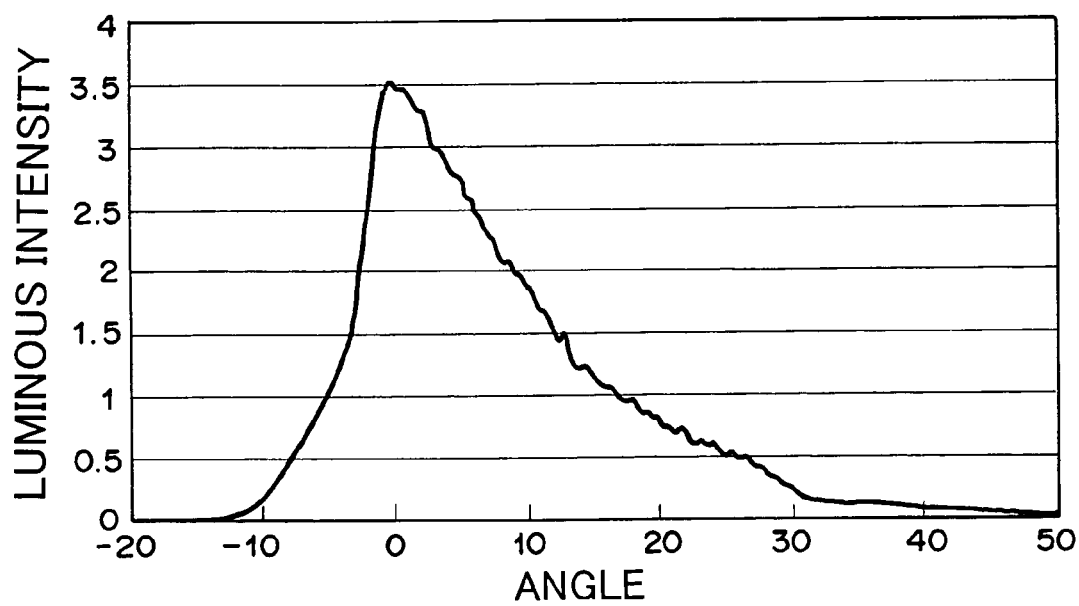
FIG. 14 is an explanatory diagram showing outgoing light luminous intensity distribution (in the XZ-plane) from the whole second prism surface (flat surface) of the light deflector according to the present invention.

As described above, it is understood that the light that is totally reflected by the prism surface composed of one flat surface to exit is dispersed in the considerably wide range depending on the total reflection areas of the prism surface. By adjusting inclination angles of the respective areas to emit the peak lights in the outgoing light luminous intensity distributions (in the XZ-plane) in substantially the same direction in all the areas, it is possible to emit most of outgoing lights convergently in a particular direction. In this case, the inclination angles of the surfaces in the respective areas are set to increase in order from Part 1 to Part 10, i.e. any one of the areas of prism surface closer to the light exit surface 42 has a larger inclination angle. By adjusting the inclination angles of the surfaces of the respective areas in this manner, outgoing light reflected by the whole prism surface can be condensed in a fixed direction as shown in FIG. 14 so that it is possible to emit light having a higher directivity and a larger peak intensity.

The number of the areas obtained by dividing the prism surface may be at least two. However, if the number of the areas (the number of the flat surfaces having different inclination angles) is too small, the light condensing property of the light deflector tends to be lowered to thereby spoil the luminance improving effect. Therefore, the number thereof is preferably set to three or more, more preferably five or more, and further preferably six or more. On the other hand, when the number of the areas is set to two, it is necessary to set a difference in inclination angle between the two flat surfaces to 15 degrees or less for suppressing the lowering of the light condensing property to some degree, preferably 0.5 to 10 degrees, and more preferably 1 to 7 degrees. Even when the number of the areas is three or more, the difference in inclination angle between the flat surface closest to the light exit surface and the flat surface farthest from the light exit surface is preferably set to 15 degrees or less in terms of the light condensing property, more preferably 0.5 to 10 degrees, and further preferably 1 to 7 degrees.

On the other hand, when the number of the areas is increased, although the convergence on the whole can be enhanced because the peak angle can be finely adjusted over the whole prism surface, the flat surfaces having different inclination angles should be finely formed so that it becomes complicated to design and produce die cutting tools for forming the prism surface of the light deflector and it also becomes difficult to stably obtain light deflectors having constant optical properties. In view of this, the number of the areas formed on the prism surface is preferably set to 20 or less, and more preferably 12 or less. The prism surface is preferably divided evenly, but is not necessarily divided evenly, which can be adjusted depending on a desired outgoing light luminance distribution (in the XZ-plane) of the whole prism surface. Further, the width of each of the flat surfaces (length of each of flat portions in a section of the elongated prism) having different inclination angles is preferably set in the range of 4 to 47% relative to the pitch of the elongated prisms, more preferably 6 to 30%, and further preferably 7 to 20%.

Figure 15:
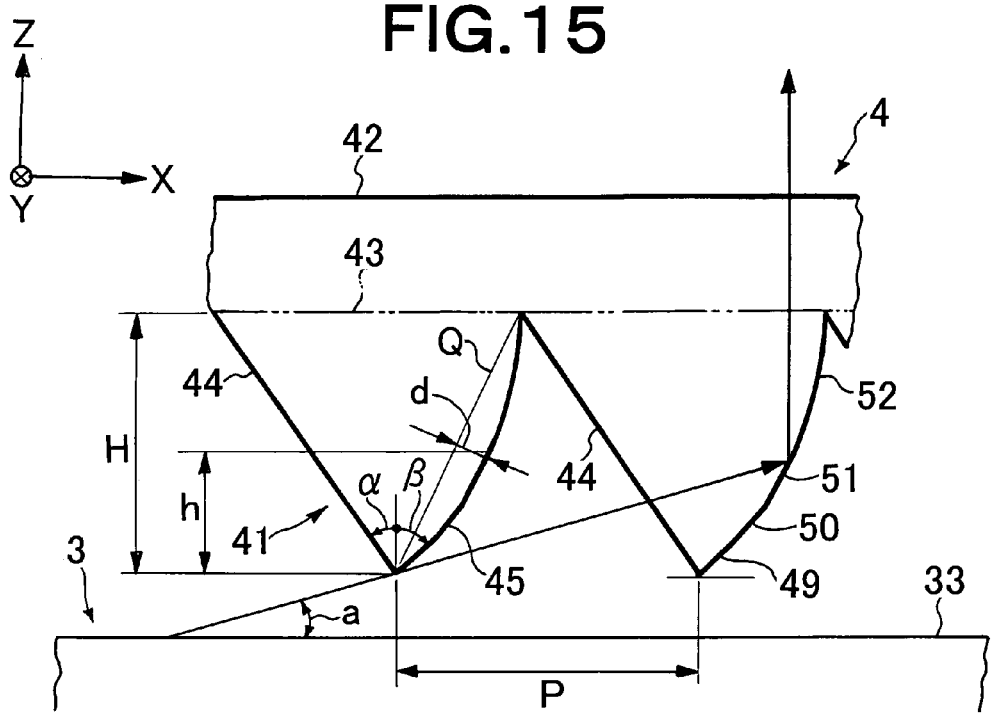
FIG. 15 is an explanatory diagram of the shape of each of elongated prisms of a light entrance surface of a light deflector according to the present invention.
Figure 16:
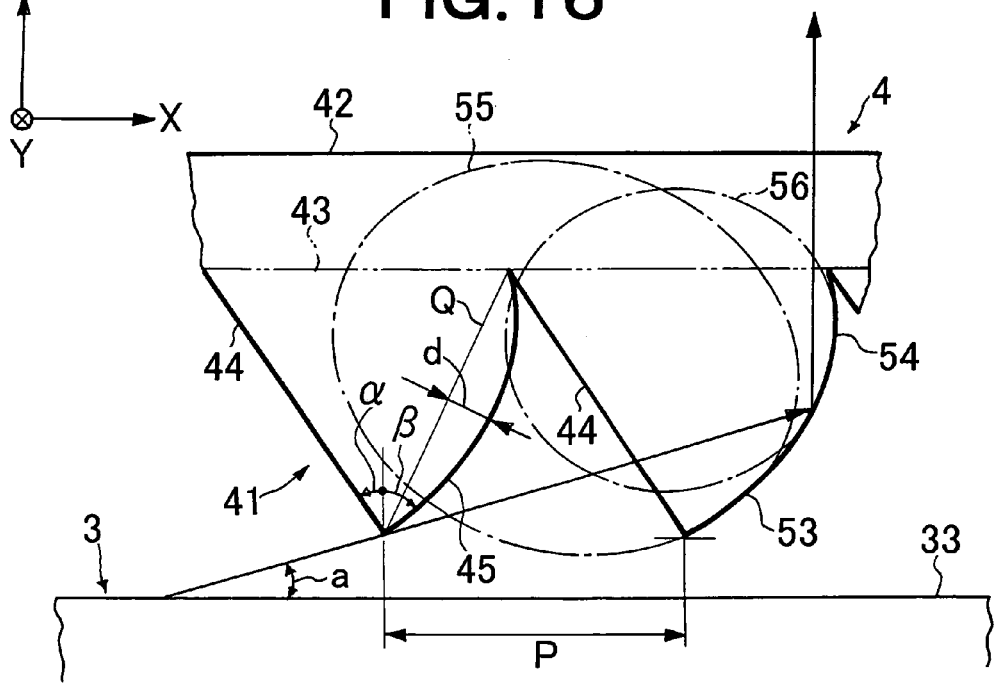
FIG. 16 is an explanatory diagram of the shape of each of elongated prisms of a light entrance surface of a light deflector according to the present invention.

In the present invention, as illustrated in FIGS. 15 and 16, at least one of the forgoing flat surfaces having different inclination angles may be formed as a convex curved surface, or all the flat surfaces may be formed as convex curved surfaces. In FIG. 15, the second prism surface 45 is divided into four areas and composed of three flat surfaces 49 to 51 and one convex curved surface 52. In FIG. 16, the second prism surface 45 is divided into two areas and composed of two convex curved surfaces 53 and 54 having different shapes. In the figure, reference numeral 55 denotes a noncircular shape determining the shape of the curved surface 53, while reference numeral 56 denotes a circular shape determining the shape of the curved surface 54. On the other hand, the second prism surface 45 may include such a curved surface that passes a boundary of the areas obtained by dividing the second prism surface 45, wherein the curved surface may deviate from the boundary of the areas to some degree that does not cause a large reduction in luminance. For example, a deviation of a ratio of a passing position (distance from the prism vertex portion) of the curved surface relative to the pitch of the elongated prisms against a ratio of the boundary of the areas thereto is preferably set to 4% or less, more preferably 2% or less, and further preferably 1% or less. In the present invention, an inclination angle of a convex curved surface represents the mean of inclination angles at all positions in the one convex curved surface. When, as described above, the prism surface is formed by a plurality of convex curved surfaces having different inclination angles, the number of the areas can be reduced as compared to the case where the prism surface is formed by the flat surfaces having different inclination angles, so that the number of the areas can be set in the range of 2 to 10, preferably 2 to 8. However, if the number of the areas is too small, it becomes difficult to design respective convex curved surfaces in terms of adjusting a desired outgoing light luminous intensity distribution (in the XZ-plane), and therefore, the number of the areas is more preferably set in the range of 3 to 8.

The convex curved surface may have a circular-arc shape or a non-circular-arc shape in XZ-section. Further, when the prism surface is formed by a plurality of convex curved surfaces, it is preferable that the shapes of the respective convex curved surfaces be differ from each other. The convex curved surface having a circular-arc shape in section and the convex curved surface having a non-circular-arc shape in section can be used in combination. It is preferable that at least one of the convex curved surfaces be formed non-circular-arc shaped in section. When a plurality of convex curved surfaces are formed circular-arc shaped in section, the respective convex curved surfaces may have different curvatures. As the non-circular-arc shape, there can be cited part of an oval shape, part of a parabolic shape, or the like.

Further, a ratio (r/P) of a radius of curvature (r) of the convex curved surface relative to a pitch (P) of the elongated prisms is preferably set in the range of 2 to 50, more preferably 5 to 30, and further preferably 7 to 10. When this r/P is less than 2 or exceeds 50, there is a tendency that the sufficient light condensing property cannot be exhibited to lower the luminance.

Such flat surfaces and convex curved surfaces having different inclination angles are designed in such a manner that peak angles in outgoing light luminance distributions (in the XZ-plane) upon exiting of lights from the light exit surface that have been totally reflected by the respective flat surfaces and convex curved surfaces become substantially constant. However, these peak angles are not necessarily required to be substantially constant, but can be designed to fall within the range of 15 degrees or less in difference, preferably 10 degrees or less, more preferably 7 degrees or less, and further preferably 5 degrees or less.

In the elongated prism thus configured, as shown in FIGS. 3 to 12, the intensities in the outgoing light luminous intensity distributions (in the XZ-plane) of the lights that have been totally reflected by the areas Part 1 to Part 5 to exit from the light exit surface occupy 75% or more of the intensity in the outgoing light luminous intensity distribution (in the XZ-plane) of the light that has been totally reflected by the whole prism surface to exit from the light exit surface, and therefore, it is particularly important that the outgoing lights that have been totally reflected by these areas to exit be condensed in a desired direction. To this end, when the height from the prism vertex portion of the elongated prism is given as h and the height of the whole elongated prism is given as H, it is preferable that at least two flat surface(s) and/or convex curved surface(s) having different inclination angles be formed in a region having the height h where h/H is 60% or less, and more preferably three or more be formed. The region having the height h is more preferably a region where h/H is 50% or less, and further preferably 40% or less. If the region having the height h becomes too small, there is a tendency that the sufficient light condensing property cannot be achieved, and further, the production of dies becomes complicated. Therefore, h/H is preferably 20% or more. In this case, the number of the areas in the region having the height h is preferably set in the range of 3 to 8, more preferably 3 to 6, and further preferably 3 to 4.

Further, when the prism surface is formed by a plurality of flat surface(s) and/or convex curved surface(s) having different inclination angles, in order to ensure the sufficient light condensing property, it is preferable that a ratio (d/P) of a maximum distance d between a virtual flat surface Q (FIGS. 2, 15, 16) connecting together the vertex portion and the bottom portion (trough portion) of the elongated prism and the plurality of flat surfaces or convex curved surfaces (actual prism surface) relative to the pitch (P) of the elongated prisms be set to 0.4 to 5%. This is because when d/P is less than 0.4% or exceeds 5%, there is a tendency that the light condensing property is lowered and thus the sufficient luminance improvement cannot be achieved. Accordingly, it is more preferably set in the range of 0.4 to 3%, and further preferably 0.7 to 2.2%.

In the present invention, taking into account the light condensing property and the light utilization efficiency, the vertical angle of each elongated prism is preferably set in the range of 35 to 80 degrees, more preferably 35 to 70 degrees, and further preferably 40 to 70 degrees. Further, it is preferable that right and left allocated angles $\alpha$ and $\beta$ of the prism vertical angle relative to a normal (inclination angles of the two prism surfaces relative to the normal) may be equal to each other or different from each other, but are preferably set to different angles for efficiently increasing the luminance in a substantially normal direction (representing a range of ±10 degrees in the XZ-plane given that the normal direction is set to 0 degrees). In this case, the allocated angle $\alpha$ located on the light source side is preferably set to 40 degrees or less while the allocated angle $\beta$ is preferably set in the range of 25 to 50 degrees. The light utilization efficiency can be enhanced to further improve the luminance when there is a small difference between the allocated angles $\alpha$ and $\beta$ of the vertical angle, and therefore, it is preferable that the allocated angle a be set in the range of 25 to 40 degrees while the allocated angle $\beta$ be set in the range of 25 to 45 degrees, and an absolute value of a difference ($\alpha-\beta$) between the allocated angles $\alpha$ and $\beta$ be set in the range of 0.5 to 10 degrees, more preferably 1 to 10 degrees, and further preferably 1 to 8 degrees. Note that when peak light in an outgoing light luminance distribution (in the XZ-plane) is set in a direction other than the substantially normal direction, the outgoing light luminance distribution (in the XZ-plane) having the peak light in a desired direction can be achieved by adjusting the allocated angles $\alpha$ and $\beta$ of the prism vertical angle.

On the other hand, the light utilization efficiency can also be increased to further improve the luminance by setting the allocated angle a to 20 degrees or less. The light utilization efficiency can be increased by reducing the allocated angle $\alpha$. However, if the allocated angle $\alpha$ is reduced too much, the vertical angle of the elongated prism tends to become small to thereby make difficult the production of a prism sheet. Therefore, the allocated angle $\alpha$ is preferably set in the range of 3 to 15 degrees, and more preferably 5 to 10 degrees. In this case, in order to set the peak light in the outgoing light luminance distribution (in the XZ-plane) in the range of ±2 degrees from the normal direction to improve the normal luminance, the allocated angle $\beta$ may be set in the range of 35 to 40 degrees.

When the allocated angle $\alpha$ is set to 20 degrees or less as described above, it is preferable that a ratio in length between two straight lines respectively connecting together the prism vertex portion and the trough portions (a ratio L2/L1 of a length L2 of a straight line on the side farther from the primary light source relative to a length L1 of a straight line on the side closer to the primary light source) in the sectional shape of the elongated prism be set to 1.1 or more. This is because the setting of L2/L1 to 1.1 or more makes it possible to efficiently receive light incident on the prism surface on the side closer to the primary light source by the prism surface on the side farther from the primary light source so that the light utilization efficiency can be enhanced to further improve the luminance. The ratio is more preferably set to 1.15 or more, and further preferably 1.17 or more. On the other hand, if L2/L1 is set too large, the vertical angle of the elongated prism tends to become small to thereby make difficult the production of a prism sheet. Therefore, L2/L1 is preferably set to 1.3 or less, more preferably 1.25 or less, and further preferably 1.2 or less. For the same reason, a ratio (L2/P) of the length L2 of the straight line on the side farther from the primary light source relative to the pitch P of the elongated prisms is preferably set to 1.25 or more, more preferably 1.3 or more, and further preferably 1.4 or more. On the other hand, if L2/P is set too large, the vertical angle of the elongated prism tends to become small to thereby make difficult the production of a prism sheet. Therefore, L2/P is preferably set to 1.8 or less, more preferably 1.6 or less, and further preferably 1.5 or less.

Figure 17:
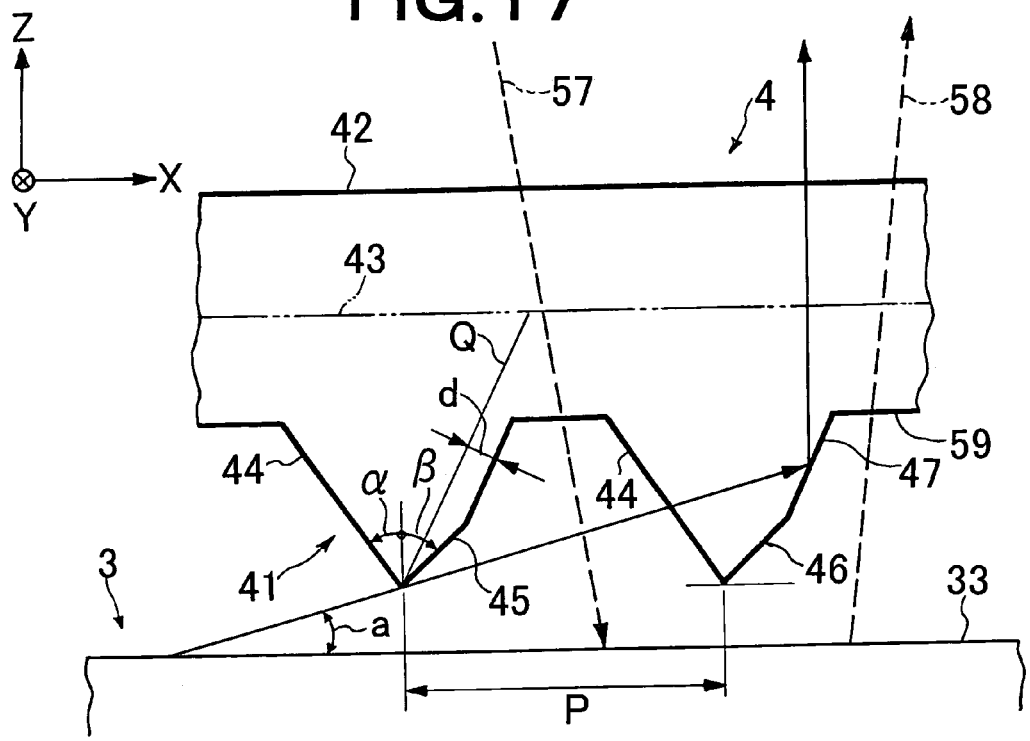
FIG. 17 is an explanatory diagram of the shape of each of elongated prisms of a light entrance surface of a light deflector according to the present invention.
Figure 18:
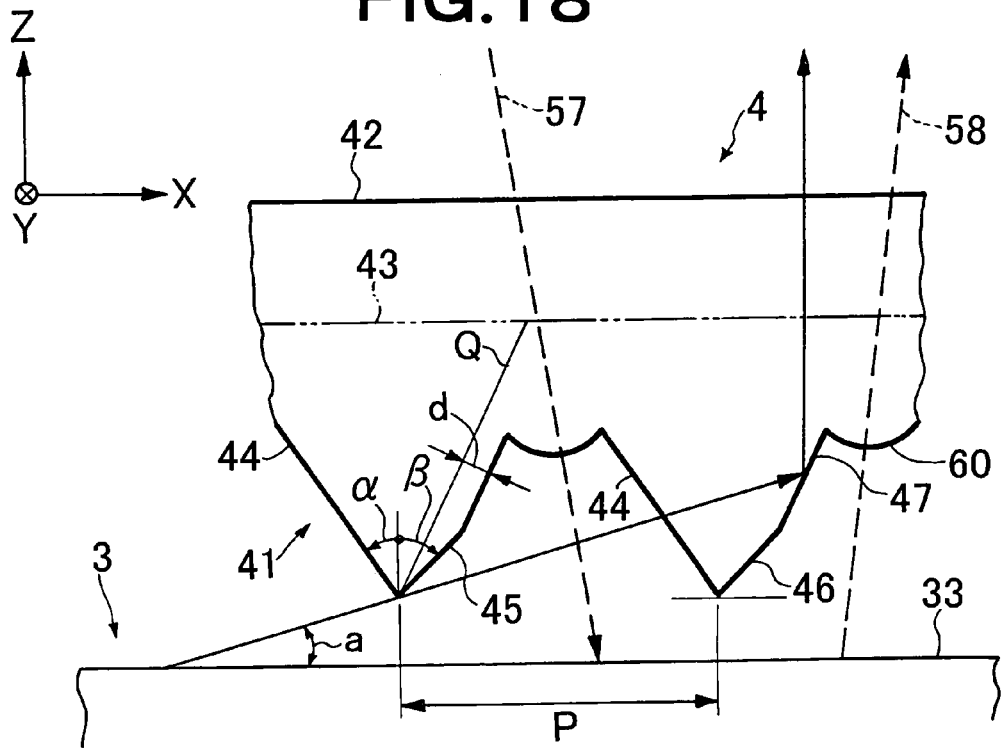
FIG. 18 is an explanatory diagram of the shape of each of elongated prisms of a light entrance surface of a light deflector according to the present invention.

On the other hand, as illustrated in FIG. 17 or 18, the light deflector of the present invention may be formed with convex surfaces or flat surfaces (light transmitting regions) each having an inclination angle smaller than the inclination angle of the elongated prism, between the adjacent elongated prisms. By forming such light transmitting regions, external light 57 incident from the side of a liquid crystal panel can be introduced into the light source device through these regions, reflected by the reflection sheet (light reflection element) 5 adjacently disposed on the back surface of the light guide, and emitted as outgoing light 58 toward the liquid crystal panel again, so that the external light can also be effectively used. In this case, in order to keep uniformity of the external light reflected by the reflection sheet 5, it is preferable to give a small diffusion property to the reflection sheet, form a light diffusion layer on the light exit surface of the light deflector, or place a light diffusion sheet on the light exit surface of the light deflector. On the other hand, since an increase in utilization efficiency of external light causes reduction in light utilization efficiency of a backlight, it is necessary to determine the ratio of each light transmitting region taking into account a manner of use and so forth. For example, the width of the light transmitting region is preferably set in the range of 20 to 50% of the pitch of the elongated prisms, and more preferably 20 to 40%. As the light transmitting region, there can be cited a region 59 of a flat surface shape as shown in FIG. 17, a region 60 of a curved surface shape as shown in FIG. 18, a region of an elongated polygonal prism surface shape, or the like. Among them, it is preferable to form the light transmitting region into the elongated polygonal prism surface shape or the curved surface shape because reflection of the external light can be controlled.

Figure 19:
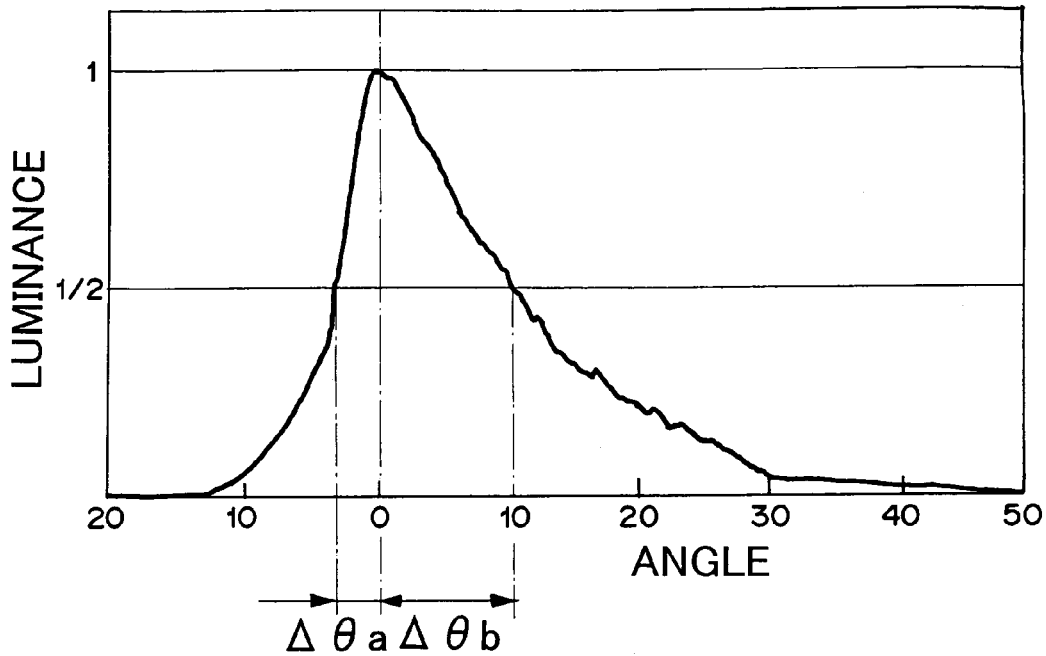
FIG. 19 is an explanatory diagram showing outgoing light luminance distribution (in the XZ-plane) from the light deflector.

In the light deflector of the present invention, since the luminous intensity distribution of the outgoing light from the light guide is strongly reflected when the light is condensed and emitted, there is a tendency that the outgoing light luminance distribution (in the XZ-plane) from the light exit surface of the light deflector becomes an asymmetric distribution at an angle range across the normal direction. When the second prism surface 45 is formed by one curved surface, the outgoing light luminance distribution (in the XZ-plane) on the side of the light incident surface of the light guide is rapidly reduced so that strong asymmetry is visibly seen within an effective viewing angle range when observing it from the normal direction. Therefore, in the present invention, by composing the prism surface of a plurality of flat surface(s) and/or convex curved surface(s) having different inclination angles, it is possible to relax the foregoing asymmetry of the outgoing light luminance distribution (in the XZ-plane). Specifically, as shown in FIG. 19, asymmetry of an outgoing light luminance distribution (in the XZ-plane) can be defined by an absolute value ($|\Delta\theta a - \Delta\theta b|$) of a difference between absolute values (spread widths) $\Delta\theta a$ and $\Delta\theta b$ of differences each between a peak angle in a luminance distribution (in the XZ-plane) of outgoing light exiting from the light deflector and an angle where a luminance becomes ½ of a luminance of peak light (peak luminance). Therefore, by adjusting the inclination angles of the flat surfaces or the convex curved surfaces forming the prism surface so that $|\Delta\theta a - \Delta\theta b|$ becomes 9 degrees or less, it is possible to relax the asymmetry of the outgoing light luminance distribution (in the XZ-plane). It is more preferable that $|\Delta\theta a - \Delta\theta b|$ be set in the range of 6 degrees or less, and further preferably 4 degrees or less. Visibility becomes almost excellent by setting $|\Delta\theta a - \Delta\theta b|$ to 9 degrees or less, and no feeling of discomfort caused by the asymmetry is substantially resulted by setting $|\Delta\theta a - \Delta\theta b|$ to 4 degrees or less.

Figure 20:
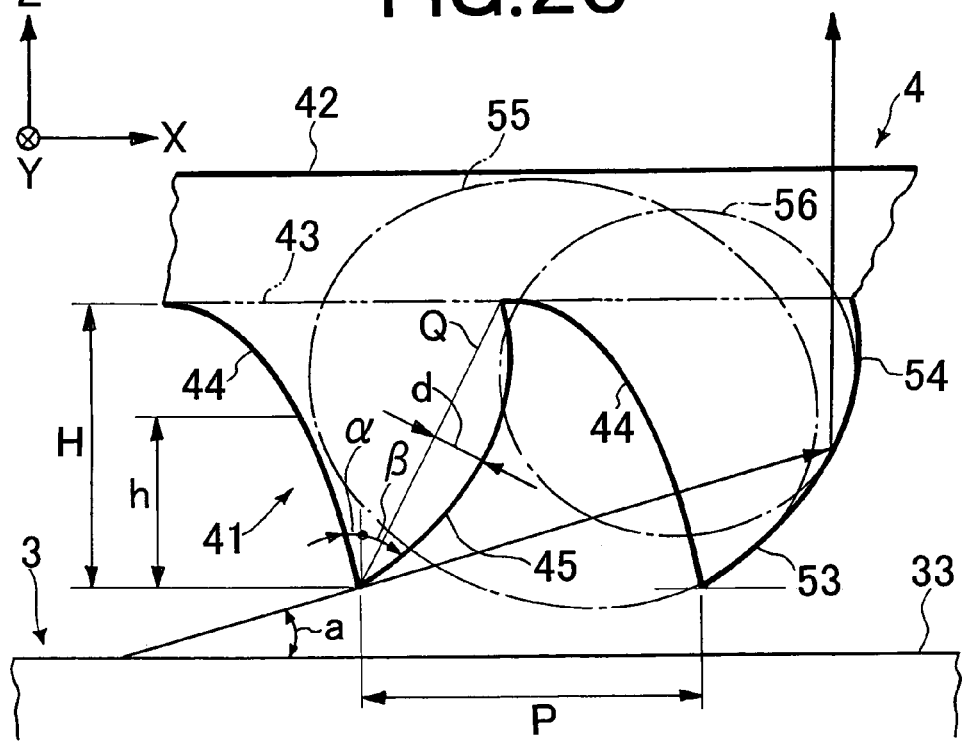
FIG. 20 is an explanatory diagram of the shape of each of elongated prisms of a light entrance surface of a light deflector according to the present invention.

Further, in the light deflector 4 of the present invention, as illustrated in FIG. 20, there is an instance where the flat surface of each first prism surface 44 is subjected to a change in shape (displacement from a flat plane connecting between the vertex portion and the bottom portion of the elongated prism) due to warping or the like that occurs upon forming an elongated prism pattern. When such a displacement of the flat surface is large, the optical properties of the light deflector 4 are affected thereby, and therefore, it is preferable to suppress the displacement to a minute value. Specifically, the displacement of the prism surface from the flat plane connecting between the vertex portion and the bottom portion of the elongated prism is preferably in the range of 0.008 or less in terms of a ratio (S/P) of a maximum distance S between such a flat plane and the prism surface relative to the pitch P of the elongated prisms, more preferably 0.0065 or less, and further preferably 0.005 or less. Since such deformation of the substantially flat surface is caused mainly by an influence of polymerization contraction or the like upon forming the elongated prism pattern, it is preferable to quantify the degree of deformation due to polymerization contraction in advance and to design the shape of elongated prisms of a die so as to cancel it.

In the present invention, it is preferable that the prism surface having the foregoing convex curved surface shaped portions be formed at at least the surface (second prism surface 45) located on the side farther from the primary light source 1. In accordance therewith, it is possible to make sufficiently narrow a distribution in an outgoing light luminance distribution (in the XZ-plane) of light exiting from the light deflector 4 when a primary light source is disposed also at the end surface 32 of the light guide 3. For example, when the ratio of light, propagating in the light guide 3, which is reflected by the end surface 32 on the side remote from the light incident surface 31 and returned, is relatively high, or when the primary light sources 1 are respectively disposed at the confronting two end surfaces of the light guide 3, it is more preferable that the prism surface (first prism surface 44) on the side closer to the primary light source 1 be also formed as a prism surface having such convex curved surface shaped portions. On the other hand, when the ratio of light, propagating in the light guide 3, which is reflected by the end surface 32 on the side remote from the light incident surface 31 and returned, is relatively low, the prism surface on the side closer to the primary light source 1 may be formed as a substantially flat surface. On the other hand, it is preferable that the light deflector 4 of the present invention be configured in such a manner that either side of the vertex portion of each elongated prism is formed by a substantially flat surface. This makes it possible to more accurately form the shape of a shape transfer surface of a forming die member for elongated prism formation so that it is possible to suppress occurrence of a sticking phenomenon upon placing the light deflector 4 on the light guide 3.

As described above, by placing the foregoing light deflector 4 on the light outgoing surface 33 of the light guide 3 with its elongated prism formed surface being located on the side of the light entrance surface, the outgoing light luminous intensity distribution (in the XZ-plane) of the directive outgoing light exiting from the light outgoing surface 33 of the light guide 3 can be further narrowed so that it is possible to achieve higher luminance and narrower visual field of the light source device. The full width half maximum of the outgoing light luminance distribution (in the XZ-plane) of the outgoing light from such a light deflector 4 preferably falls within the range of 5 to 25 degrees, more preferably 10 to 20 degrees, and further preferably 12 to 18 degrees. This is because difficulty in viewing an image or the like due to extreme narrowing of the visual field can be prevented by setting the full width half maximum of the outgoing light luminance distribution (in the XZ-plane) to 5 degrees or more, while higher luminance and narrower visual field can be achieved by setting it to 25 degrees or less.

Since the visual field narrowing of the light deflector 4 in the present invention is affected by a degree of spread (full width half maximum) of the outgoing light luminous intensity distribution (in the XZ-plane) of the light from the light outgoing surface 33 of the light guide 3, the ratio of a full width half maximum A of the outgoing light luminance distribution (in the XZ-plane) of the light from the light exit surface 42 of the light deflector 4 relative to a full width half maximum B of the outgoing light luminous intensity distribution (in the XZ-plane) of the light from the light outgoing surface 33 of the light guide 3 also changes depending on the full width half maximum B of the outgoing light luminous intensity distribution (in the XZ-plane) of the light from the light guide 3. For example, when the full width half maximum B of the outgoing light luminous intensity distribution (in the XZ-plane) of the light from the light guide 3 is less than 26 degrees, the full width half maximum A preferably falls within the range of 30 to 95% of the full width half maximum B, more preferably 30 to 80%, and further preferably 30 to 70%. On the other hand, when the full width half maximum B of the outgoing light luminous intensity distribution (in the XZ-plane) of the light from the light guide 3 is 26 degrees or more, the full width half maximum A preferably falls within the range of 30 to 80% of the full width half maximum B, more preferably 30 to 70%, and further preferably 30 to 60%. Particularly, when the full width half maximum B of the outgoing light luminous intensity distribution (in the XZ-plane) of the light from the light guide 3 is 26 to 36 degrees, the full width half maximum A preferably falls within the range of 30 to 80% of the full width half maximum B, more preferably 30 to 70%, and further preferably 30 to 60%. Further, when the full width half maximum B of the outgoing light luminous intensity distribution (in the XZ-plane) of the light from the light guide 3 exceeds 36 degrees, the full width half maximum A preferably falls within the range of 30 to 70% of the full width half maximum B, more preferably 30 to 60%, and further preferably 30 to 50%.

It would be considered in general that improvement in light emitting efficiency of the light guide 3 causes increase in the full width half maximum B of the outgoing light luminous intensity distribution (in the XZ-plane) of the light from the light guide 3 to thereby lower the light concentration efficiency. In fact, however, the effect of visual field narrowing increases and therefore, it is preferable, in terms of efficiency of visual field narrowing and efficiency of light utilization in the light source device, to use the light deflector in combination with the light guide wherein the full width half maximum B of the outgoing light luminous intensity distribution (in the XZ-plane) is 26 degrees or more, and more preferably in combination with the light guide wherein the full width half maximum B exceeds 36 degrees. On the other hand, although the effect of visual field narrowing is small when the full width half maximum of the outgoing light luminous intensity distribution (in the XZ-plane) of the light from the light guide 3 is small, since higher luminance can be achieved as the full width half maximum of the outgoing light luminous intensity distribution (in the XZ-plane) of the light from the light guide 3 decreases, it is preferable, in terms of achieving higher luminance, to use the light deflector in combination with the light guide 3 wherein the full width half maximum B of the outgoing light luminous intensity distribution (in the XZ-plane) is less than 26 degrees.

The primary light source 1 is a linear light source extending in the Y-direction. As the primary light source 1, a fluorescent lamp or a cold-cathode tube, for example, can be used. In the present invention, the primary light source 1 is not limited to the linear light source, but use can also be made of a point light source such as an LED light source, a halogen lamp, a metal halide lamp. Particularly, when used in a display device with a relatively small screen size such as a portable telephone, a portable information terminal, or the like, it is preferable to use the point light source such as the LED. Further, as illustrated in FIG. 1, not only the primary light source 1 is disposed facing one side end surface of the light guide 3, but also another primary light source can be disposed facing another side end surface on the opposite side depending on necessity.

For example, when the point light source such as an LED light source is disposed at a corner or the like of a light guide 3 and used as a primary light source 1, light entering the light guide 3 is radially propagated in the light guide 3 substantially with respect to the primary light source 1 in the plane parallel to a light outgoing surface 33 so that outgoing light exits likewise radially from the light outgoing surface 33 with respect to the primary light source 1. In order to efficiently deflect such radially exiting outgoing light in a desired direction regardless of exiting directions thereof, it is preferable that elongated prisms formed on the light deflector 4 be disposed substantially in parallel to each other and generally in arcs so as to surround the primary light source 1. In this manner, by disposing the elongated prisms substantially in parallel to each other and generally in arcs so as to surround the primary light source 1, most of the light radially exiting from the light outgoing surface 33 is incident substantially in perpendicular to an extending direction of the elongated prisms of the light deflector 4, and therefore, the outgoing light can be efficiently oriented in a particular direction over the whole area of the light outgoing surface 33 of the light guide 3 so that uniformity in luminance can be improved. It is preferable that the substantially arc-shaped elongated prisms formed on the light deflector 4 be configured in such a manner that the degree of the arc shape thereof is selected depending on a distribution of the light propagating in the light guide 3 so as to allow most of the light radially exiting from the light outgoing surface 33 to be incident substantially in perpendicular to the extending direction of the elongated prisms of the light deflector 4. Specifically, there can be cited such elongated prisms that are disposed substantially in parallel to each other so that radii of circular arcs thereof increase little by little like concentric circles substantially centering on the point light source such as the LED, wherein the range of radii of the circular arcs of the elongated prisms is determined based on a positional relationship between a position of the point light source and an effective area of the surface light source corresponding to a liquid crystal display area in the surface light source system and sizes thereof.

The light source reflector 2 serves to guide the light of the primary light source 1 to the light guide 3 with a small loss. As a material thereof, use can be made of, for example, a plastic film having a metal-deposited reflection layer on the surface. As illustrated in FIG. 1, the light source reflector 2 is wound on the primary light source 1 so as to extend from an outer surface of an edge portion of the light reflector 5 via an outer periphery of the primary light source 1 to an edge portion of the outgoing surface of the light diffuser 6. On the other hand, avoiding the light diffuser 6, the light source reflector 2 may extend from the outer surface of the edge portion of the light reflector 5 via the outer periphery of the primary light source 1 to an edge portion of the light exit surface of the light deflector 4 or an edge portion of the light outgoing surface of the light guide 3.

A reflection member like such a light source reflector 2 can also be provided at a side end surface of the light guide 3 other than the side end surface 31. As the light reflector 5, use can be made of, for example, a plastic sheet having a metal-deposited reflection layer on the surface. In the present invention, instead of the reflection sheet, the light reflector 5 can be in the form of a light reflection layer formed on the back surface 34 of the light guide 3 by metal deposition or the like.

The light guide 3 and the light deflector 4 of the present invention can be made of a synthetic resin having a high light transmissivity. Such a synthetic resin can be exemplified by a methacrylic resin, acrylic resin, polycarbonate-based resin, polyester-based resin, or polyvinyl chloride-based resin. Particularly, the methacrylic resin is excellent in light transmissivity, heat resistance, mechanical property, and moldability, and is optimum. Such a methacrylic resin is a resin containing methyl methacrylate as a main component, preferably at 80 weight % or more. The roughened surface structure or the surface structure of the elongated prisms or the like of the light guide 3 or the light deflector 4 may be formed by heat-pressing a transparent synthetic resin plate using a die member having a desired surface structure, or by screen printing, extrusion molding, injection molding, or the like wherein the shape is given simultaneously with molding. Further, the structural surface can be formed by using a thermosetting or photocuring resin or the like. Further, a roughened surface structure or an elongated lens array structure made of an active energy ray curing resin may be formed on a transparent base member such as a transparent film or sheet made of a polyester-based resin, acrylic resin, polycarbonate-based resin, polyvinyl chloride-based resin, polymethacrylicimide-based resin, or the like, or such a sheet may be integrally joined to a separate transparent base member by a method of bonding, fusion, or the like. As the active energy ray curing resin, use can be made of multifunctional (metha) acrylic compound, vinyl compound, (metha) acrylic ester, allyl compound, metal salt of (metha) acrylic acid, or the like.

By disposing the liquid crystal display element on the light-emitting surface (the outgoing surface 62 of the light diffuser 6) of the surface light source device comprising the primary light source 1, the light source reflector 2, the light guide 3, the light deflector 4, the light reflector 5, and the light diffuser 6, there is formed a liquid crystal display device. The liquid crystal display device is observed by a viewer from above in FIG. 1 through the liquid crystal display element. Further, in the present invention, since the fully collimated light with a narrow distribution can be incident on the liquid crystal display element from the surface light source device, an image display excellent in uniformity of brightness and hue without gradation inversion or the like can be obtained at the liquid crystal display element, and further, light irradiation converging in a desired direction can be obtained, so that it is possible to enhance the utilization efficiency of the quantity of light emitted from the primary light source 1 with respect to illumination of this direction.

Further, in the present invention, in order to properly control a visual field range depending on a purpose while suppressing reduction in luminance as much as possible in the light source device that achieves narrower visual field and higher luminance by the use of the light deflector 4 as described above, the light diffuser 6 is adjacently disposed on the light exit surface of the light deflector 4. Further, in the present invention, by disposing the light diffuser 6 in this manner, it is also possible to suppress glare, luminance spots, and the like which cause deterioration in quality, to thereby achieve improvement in quality.

The light diffuser 6 may be formed integral with the light deflector 4 on the side of the light exit surface thereof, or may be individually placed on the side of the light exit surface of the light deflector 4. Preferably, the light diffuser 6 is individually disposed. When individually placing the light diffuser 6, it is preferable that an incident surface (light incident surface) 61, facing the light deflector 4, of the light diffuser 6 be formed so as to have a convex-concave structure for preventing sticking with the light deflector 4. Likewise, it is also necessary to take into account the sticking between an outgoing surface (light outgoing surface) 62 of the light diffuser 6 and a liquid crystal display element to be disposed thereon, and it is thus preferable to give a convex-concave structure also to the surface of the light diffuser 6 on the exit side thereof. When this convex-concave structure is given only for the purpose of preventing the sticking, the average inclination angle thereof is preferably set to 0.7 degrees or more, more preferably 1 degree or more, and further preferably 1.5 degrees or more.

Figure 3:
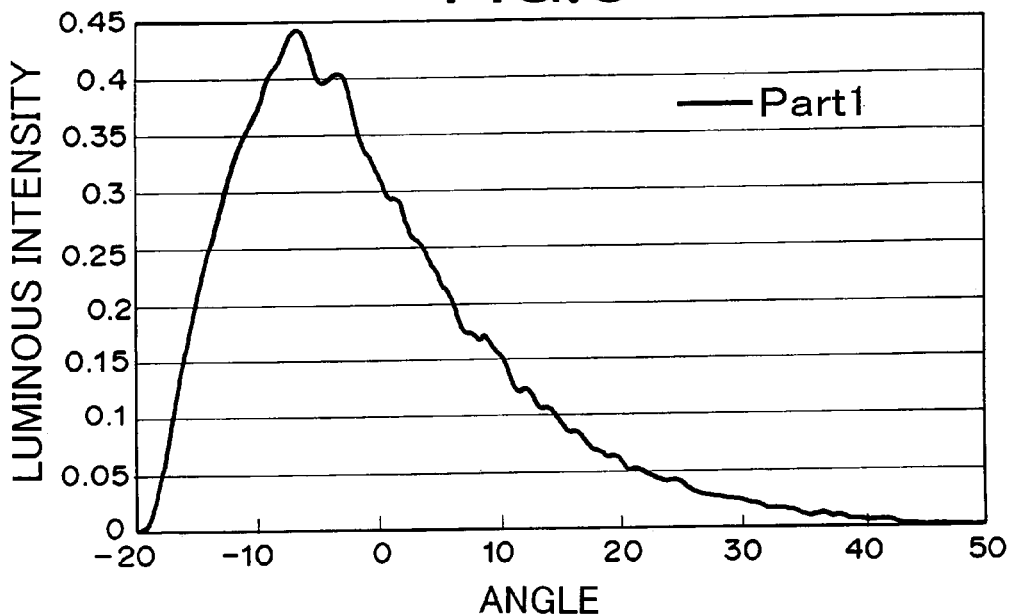
FIG. 3 is an explanatory diagram showing outgoing light luminous intensity distribution (in the XZ-plane) from respective areas of the second prism surface (flat surface) of the light deflector.
Figure 4:
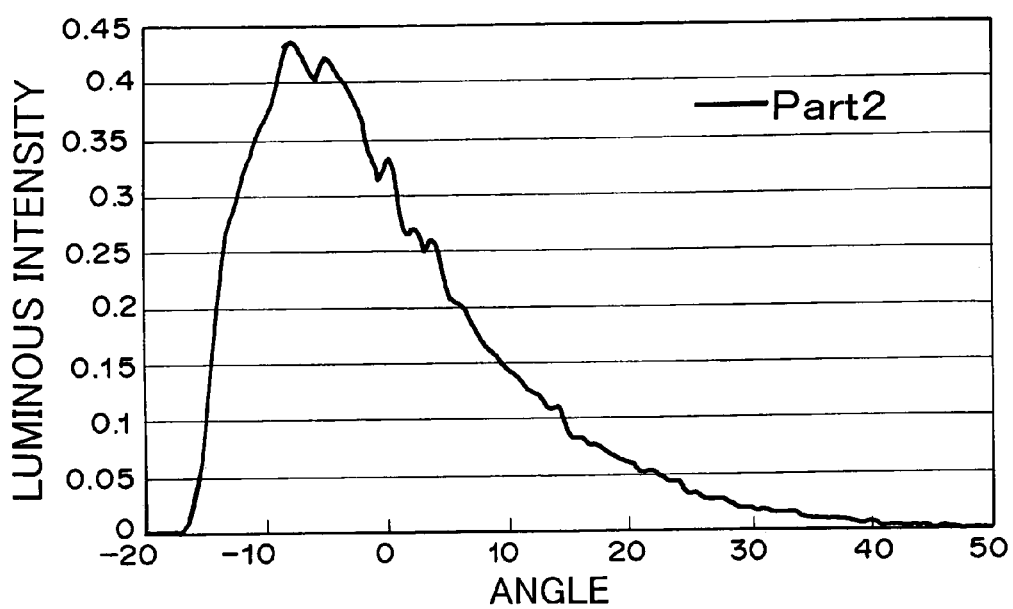
FIG. 4 is an explanatory diagram showing outgoing light luminous intensity distribution (in the XZ-plane) from respective areas of the second prism surface (flat surface) of the light deflector.

In the present invention, it is preferable that use be made of the light diffuser 6 having a light diffusion property for properly diffusing the outgoing light from the light deflector 4, taking into account the balance among luminance characteristic, visibility, quality, and so forth of the light source device. Specifically, when the light diffusion property of the light diffuser 6 is low, there is a tendency that it becomes difficult to sufficiently broaden the viewing angle to lower the visibility so that the quality improving effect becomes insufficient. Conversely, when the light diffusion property is too high, there is a tendency that the effect of visual field narrowing by the light deflector 4 is spoiled and the whole light ray transmissivity is also reduced to lower the luminance. Therefore, as the light diffuser 6 of the present invention, use is made of one that is configured in such a manner that the full width half maximum of an outgoing light luminous intensity distribution (in the XZ-plane) falls within the range of 1 to 13 degrees when parallel light is incident thereon. The full width half maximum of the outgoing light luminous intensity distribution (in the XZ-plane) of the light diffuser 6 is preferably in the range of 3 to 11 degrees, and more preferably 4 to 8.5 degrees. In the present invention, as shown in FIG. 3, the full width half maximum of the outgoing light luminous intensity distribution (in the XZ-plane) of the light diffuser 6 shows a degree to which parallel light rays incident on the light diffuser 6 diffuse to spread upon exiting, and represents an angle ($\Delta\theta_H$) of the full width of a spread angle at a half value relative to a peak value in an luminous intensity distribution (in the XZ-plane) of outgoing light that passes through the light diffuser 6 to be diffused.

Such a light diffusion property can be given by mixing a light diffusion agent into the light diffuser 6 or by forming a convex-concave structure to at least one of the surfaces of the light diffuser 6. The convex-concave structure differs in degree between a case where it is formed on one of the surfaces of the light diffuser 6 and another case where it is formed on both surfaces thereof. When forming the convex-concave structure on one of the surfaces of the light diffuser 6, the average inclination angle thereof is preferably set in the range of 0.8 to 12 degrees, more preferably 3.5 to 7 degrees, and further preferably 4 to 6.5 degrees. When forming the convex-concave structure on both surfaces of the light diffuser 6, the average inclination angle of the convex-concave structure formed on one of the surfaces is preferably set in the range of 0.8 to 6 degrees, more preferably 2 to 4 degrees, and further preferably 2.5 to 4 degrees. In this case, it is preferable that the average inclination angle on the incident surface side of the light diffuser 6 be set greater than the average inclination angle on the outgoing surface side thereof for suppressing reduction of the whole light ray transmissivity of the light diffuser 6.

Further, in terms of improving the luminance characteristic and visibility, a haze value of the light diffuser 6 is preferably set in the range of 8 to 82%, more preferably 30 to 70%, and further preferably 40 to 65%.

In the light source device of the present invention, it is also required that the luminance in a display area (i.e. an effective light-emitting area corresponding to an effective display area of a display element such as a liquid crystal display element used in combination with the light source device) as observed from a normal direction of the light-emitting surface (the outgoing surface 62 of the light diffuser 6) be uniform. The uniformity of luminance also depends on the size of a display area of the light source device. For example, in a large-size light source device applied to one with a large effective display area such as a notebook personal computer or a personal computer monitor, a relatively wide viewing angle characteristic may be required wherein a luminance distribution (in the XZ-plane) of outgoing light exiting from a light-emitting surface is required to be broadened. On the other hand, in a small-size light source device applied to one with a small effective display area such as a portable telephone or a portable information terminal, high luminance or improvement in quality of display image forming illumination may be given priority wherein a luminance distribution (in the XZ-plane) of outgoing light exiting from a light-emitting surface is allowed to be relatively narrow. Therefore, as the light diffuser 6, use is preferably made of one having a proper light diffusion property depending on the size of the display area of the light source device.

Figure 22:
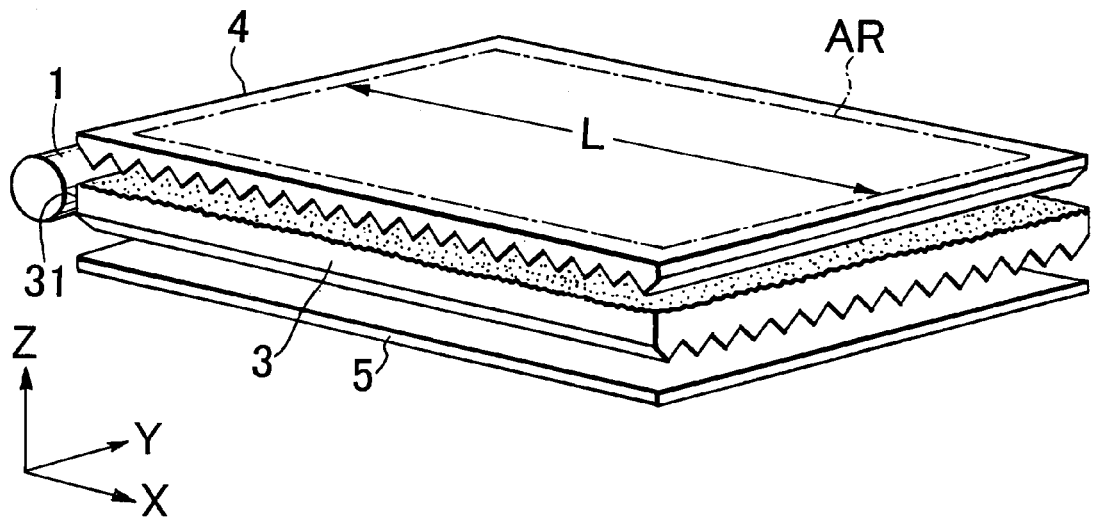
FIG. 22 is an explanatory diagram of a developed length of a light source device.
Figure 23:
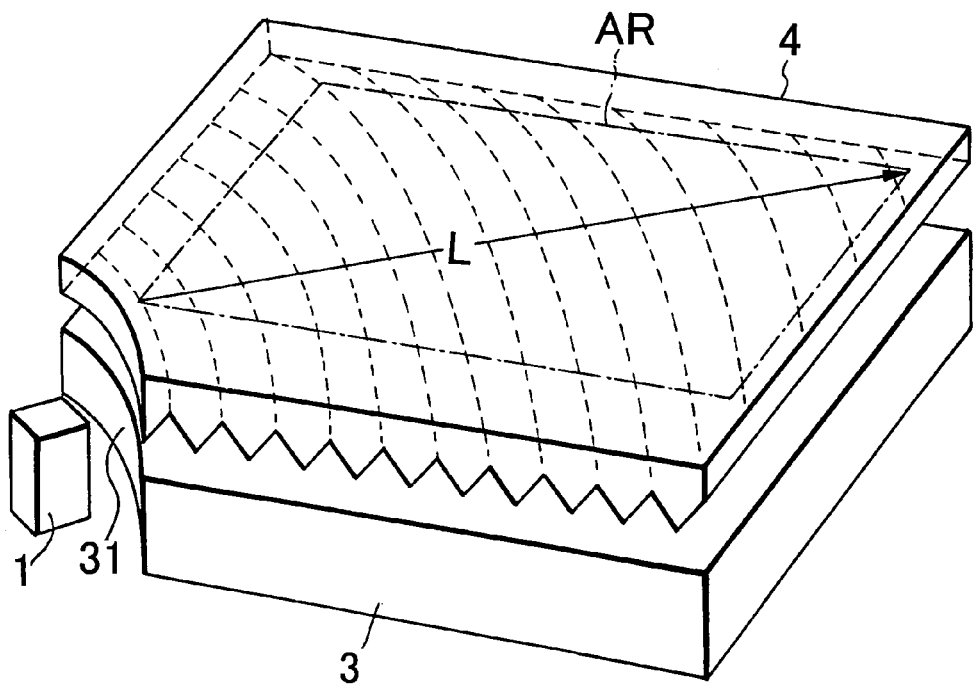
FIG. 23 is an explanatory diagram of a developed length of a light source device.

Description will be made of such a light diffusion property of the light diffuser 6 that depends on the size of the display area of the light source device. Note that the size of the display area of the light source device will be described using a developed length thereof as a reference. As illustrated in FIG. 22, when a linear cold-cathode light source is disposed as a primary light source 1 facing a light incident surface 31 of a light guide 3, the developed length of the light source device (developed length of the light guide 3) represents a maximum length L of a display area AR in a direction where light entering the light guide 3 is guided, i.e. in the X-direction perpendicular to the light incident surface 31. On the other hand, as illustrated in FIG. 23, when a point light source such as an LED is disposed as a primary light source 1 facing a light incident surface 31 formed at a corner of a light guide 3, the developed length represents a distance L of a display area AR connecting between a position farthest from the point light source and a position closest to the point light source.

(1) In Case of the Developed Length of the Light Guide 3 being 8 cm or Less

Since such a light source device uses as the primary light source 1 a liner cold-cathode tube (one-lamp type) or an LED and is used in a display device with a small effective display area of a portable telephone, a portable information terminal, a digital camera, or the like, it is not necessary to increase the viewing angle so much, while it is necessary to give a light diffusion property, by the light diffuser 6, to a degree that can suppress glare, luminance spots, and the like which cause deterioration in quality, to enhance the light utilization efficiency to maintain high luminance, and to suppress the power consumption to be low. Therefore, for the light diffuser 6, the full width half maximum of the outgoing light luminous intensity distribution (in the XZ-plane) is preferably in the range of 1 to 6 degrees, more preferably 1 to 5 degrees, and further preferably 2 to 5 degrees. Further, the haze value is preferably in the range of 8 to 60%, more preferably 8 to 50%, and further preferably 20 to 50%. Furthermore, when the convex-concave structure is formed on the surface of the light diffuser 6, the average inclination angle thereof is preferably in the range of 0.8 to 5 degrees, more preferably 0.8 to 4 degrees, and further preferably 2 to 4 degrees.

(2) In Case of the Developed Length of the Light Guide 3 Being Greater than 8 cm and Equal to or Less than 23 cm (One-Lamp Type Cold-Cathode Tube is used as the Primary Light Source 1)

Since such a light source device is used in a display device of a notebook personal computer, a monitor of a desktop personal computer, a relatively small-size liquid crystal television, or the like, a relatively wide viewing angle is required and, following the demand for higher resolution of the liquid crystal display devices, high luminance with high quality is required. Therefore, for the light diffuser 6, the full width half maximum of the outgoing light luminous intensity distribution (in the XZ-plane) is preferably in the range of 3 to 11 degrees, more preferably 4 to 10 degrees, and further preferably 4 to 9 degrees. Further, the haze value is preferably in the range of 30 to 80%, more preferably 40 to 73%, and further preferably 45 to 70%. Furthermore, when the convex-concave structure is formed on the surface of the light diffuser 6, the average inclination angle thereof is preferably in the range of 3 to 9.5 degrees, more preferably 3.5 to 8.5 degrees, and further preferably 4.5 to 7 degrees.

Particularly, when the developed length of the light guide 3 is greater than 8 cm and equal to or less than 18 cm, since such a light source device is used in a display device of, for example, a relatively small-size notebook personal computer, a required viewing angle is somewhat narrow. Therefore, for the light diffuser 6, the full width half maximum of the outgoing light luminous intensity distribution (in the XZ-plane) is preferably in the range of 3 to 8 degrees, more preferably 4 to 8 degrees, and further preferably 4 to 7 degrees. Further, the haze value is preferably in the range of 30 to 70%, more preferably 40 to 65%, and further preferably 45 to 60%. Furthermore, when the convex-concave structure is formed on the surface of the light diffuser 6, the average inclination angle thereof is preferably in the range of 3 to 7 degrees, more preferably 3.5 to 6.5 degrees, and further preferably 4.5 to 6 degrees.

On the other hand, particularly when the developed length of the light guide 3 is greater than 18 cm and equal to or less than 22 cm, since such a light source device is used in a display device of, for example, a relatively large-size notebook personal computer, a relatively wide viewing angle is required and further the uniformity of luminance in the display area is required to be achieved. Therefore, for the light diffuser 6, the full width half maximum of the outgoing light luminous intensity distribution (in the XZ-plane) is preferably in the range of 4 to 10 degrees, more preferably 5 to 9 degrees, and further preferably 5 to 8.5 degrees. Further, the haze value is preferably in the range of 40 to 75%, more preferably 50 to 70%, and further preferably 50 to 65%. Furthermore, when the convex-concave structure is formed on the surface of the light diffuser 6, the average inclination angle thereof is preferably in the range of 3.5 to 8 degrees, more preferably 4 to 7 degrees, and further preferably 4.5 to 6.5 degrees.

Furthermore, particularly when the developed length of the light guide 3 is greater than 22 cm and equal to or less than 23 cm, such a light source device is used in a display device of, for example, a relatively large-size notebook personal computer. In this case, as the notebook personal computer using the one-lamp type cold-cathode tube as the primary light source 1, the display area is large. Therefore, as compared to one having the developed length of the light guide 3 being 22 cm or less, it is necessary to increase the light utilization efficiency to improve the luminance. For increasing the luminance as described, for example, as a reflection sheet disposed on the back surface of the light guide 3 of the light source device, a metal reflection sheet such as a silver reflection sheet or an aluminum reflection sheet excellent in directive reflection property is required to be used in place of an expanded PET reflection film having a low directive reflectivity. However, when the metal reflection sheet is used, there is significant occurrence of defects such as glare peculiar to metal reflection, dark lines and bright lines appearing in the vicinity of the light incident surface of the light guide, and dark portions appearing in the vicinity of both ends of the light incident surface of the light guide so that the quality as the light source device tends to be spoiled. In order to suppress such quality degradation, it is necessary to use the light diffuser 6 having a high light diffusion property such that the full width half maximum of the outgoing light luminous intensity distribution (in the XZ-plane) exceeds 9 degrees. However, there is a problem that usage of such a light diffuser 6 makes the light diffusion property too large and causes large reduction of the whole light ray transmissivity, and therefore, a sufficiently high luminance can not be achieved. In view of this, in addition to suppressing such quality degradation in the light guide 3 and the light deflector 4, use is preferably made of, as the light diffuser 6, one that is configured such that the full width half maximum of the outgoing light luminous intensity distribution (in the XZ-plane) is in the range of 5 to 11 degrees, more preferably 6 to 10 degrees, and further preferably 7 to 9 degrees. Further, the haze value is preferably in the range of 50 to 80%, more preferably 55 to 73%, and further preferably 55 to 70%. Furthermore, when the convex-concave structure is formed on the surface of the light diffuser 6, the average inclination angle thereof is preferably in the range of 4.5 to 9.5 degrees, more preferably 5 to 8.5 degrees, and further preferably 5 to 7 degrees.

(3) In Case of the Developed Length of the Light Guide 3 Being Greater than 8 cm and Equal to or Less than 28 cm (Multi-Lamp Type Cold-Cathode Tubes are used as Primary Light Sources 1)

Figure 24:
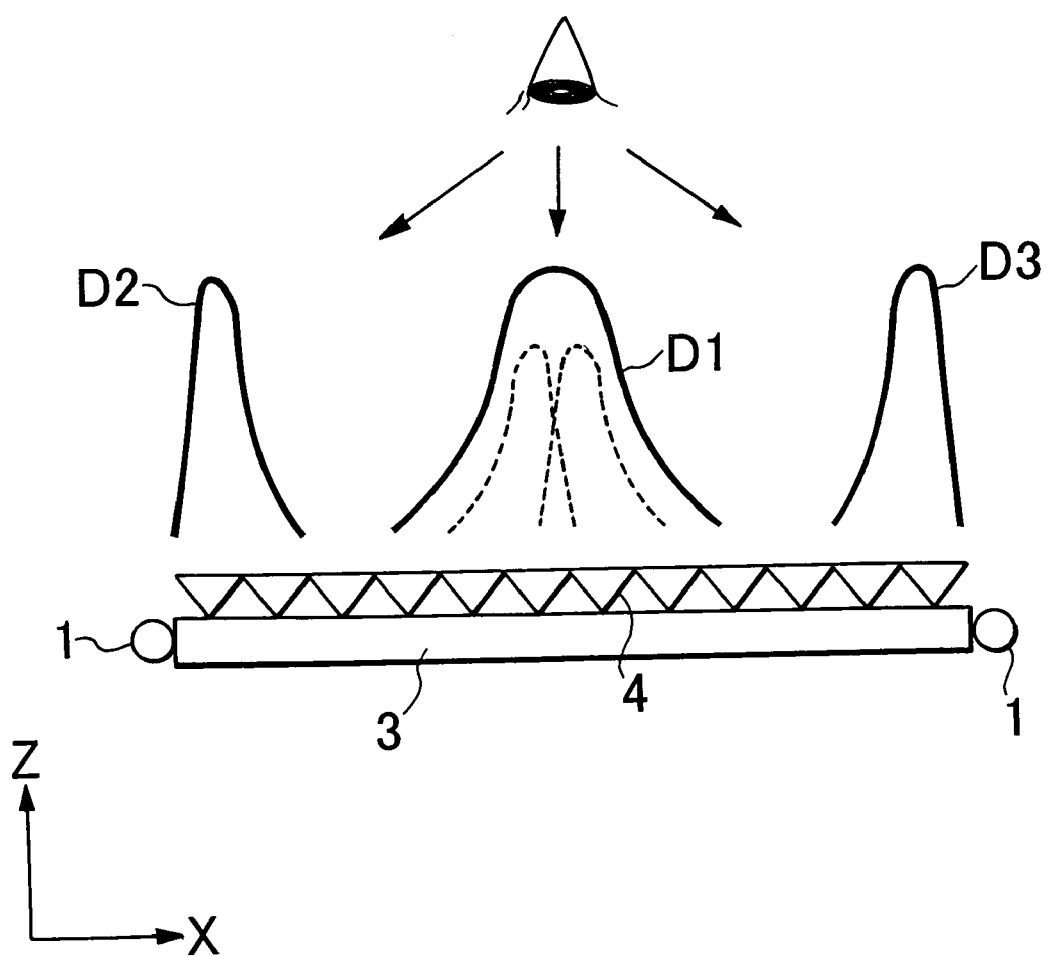
FIG. 24 is an explanatory diagram showing a luminance distribution (in the XZ-plane) of outgoing light from the light deflector of the light source device of the present invention.

Since such a light source device is used in a display device of a monitor of a desktop personal computer, a liquid crystal television, or the like, a relatively wide viewing angle is required and further a high luminance is required. Therefore, as the primary light sources 1, use is made of the multi-lamp type wherein one or more cold-cathode tubes are disposed at each of two mutually substantially parallel end surfaces of the light guide 3. In this light source device, the visibility relating to quality differs from the light source device using the one-lamp type primary light source 1. Asymmetry of an outgoing light luminance distribution (in the XZ-plane) as described later disappears and, as shown in FIG. 24, an outgoing light luminance distribution (in the XZ-plane) D1 in the vicinity of the center portion of the light source device is improved in symmetry even when the light diffuser 6 is not used. Further, outgoing light luminance distributions (in the XZ-plane) D2 and D3 in the vicinity of both ends close to the primary light sources are affected by lights emitted from the closest primary light sources 1 and guided, so as to be somewhat asymmetric, respectively. Specifically, in the vicinity of the left-side end portion in FIG. 24, the outgoing light luminance distribution (in the XZ-plane) D2 shows the tailing tendency steep on the side of the adjacent primary light source and smooth on the center side, and therefore, exiting directions of light in the vicinity of the left-side end portion include somewhat more components directed toward the center portion. On the other hand, in the vicinity of the right-side end portion in FIG. 24, the outgoing light luminance distribution (in the XZ-plane) D3 shows the tailing tendency steep on the side of the adjacent primary light source and smooth on the center side, and therefore, exiting directions of light in the vicinity of the right-side end portion include somewhat more components directed toward the center portion. Consequently, it is possible to obtain an outgoing light characteristic that is excellent in visibility when observing the vicinity of both end portions from the center portion, and therefore, it is advantageous in terms of forming a light source device that achieves a high-quality high luminance over to the end portions. Therefore, the light diffuser 6 is required to have a light diffusion property enabling a wide viewing angle, and the full width half maximum of the outgoing light luminous intensity distribution (in the XZ-plane) is preferably in the range of 0.7 to 13 degrees, more preferably 1 to 11 degrees, and further preferably 2 to 9 degrees. Further, the haze value is preferably in the range of 30 to 82%, more preferably 35 to 75%, and further preferably 40 to 70%. Furthermore, when the convex-concave structure is formed on the surface of the light diffuser 6, the average inclination angle thereof is preferably in the range of 0.8 to 12 degrees, more preferably 1 to 8.5 degrees, and further preferably 1.5 to 7 degrees.

Particularly, when the developed length of the light guide 3 is greater than 22 cm and equal to or less than 28 cm, use is preferably made of, as the light diffuser 6, one that is configured in such a manner that the full width half maximum of the outgoing light luminous intensity distribution (in the XZ-plane) is in the range of 6 to 13 degrees, more preferably 7 to 11 degrees, and further preferably 7 to 9 degrees. Further, the haze value is preferably in the range of 50 to 82%, more preferably 60 to 75%, and further preferably 65 to 70%. Furthermore, when the convex-concave structure is formed on the surface of the light diffuser 6, the average inclination angle thereof is preferably in the range of 4.5 to 12 degrees, more preferably 5.5 to 8.5 degrees, and further preferably 6 to 7 degrees.

Further, when the developed length of the light guide 3 is greater than 8 cm and equal to or less than 22 cm, use is preferably made of, as the light diffuser 6, one that is configured in such a manner that the full width half maximum of the outgoing light luminous intensity distribution (in the XZ-plane) is in the range of 0.7 to 6 degrees, more preferably 1 to 5 degrees, and further preferably 2 to 4 degrees. Further, the haze value is preferably in the range of 30 to 60%, more preferably 35 to 55%, and further preferably 40 to 50%. Furthermore, when the convex-concave structure is formed on the surface of the light diffuser 6, the average inclination angle thereof is preferably in the range of 0.8 to 6 degrees, more preferably 1 to 5 degrees, and further preferably 1.5 to 4.5 degrees.

In the light source device of the present invention, when using the foregoing light diffuser 6, there is an instance where it is preferable in terms of improvement in luminance to use the light deflector 4 having a relatively low light condensing property such that the full width half maximum of the outgoing light luminance distribution (in the XZ-plane) of the light from the light deflector 4 is about 19 to 26 degrees, and to use the light diffuser 6 having a relatively low light diffusion property because this can suppress reduction in luminance caused by diffusion in the YZ-plane. In this case, the light diffuser 6 is required to have a light diffusion property enabling a wide viewing angle, and the full width half maximum of the outgoing light luminous intensity distribution (in the XZ-plane) is preferably in the range of 1 to 8 degrees, more preferably 2 to 8 degrees, and further preferably 3 to 7 degrees. Further, the haze value is preferably in the range of 8 to 70%, more preferably 30 to 65%, and further preferably 40 to 60%. Furthermore, when the convex-concave structure is formed on one of the surfaces of the light diffuser 6, the average inclination angle thereof is preferably in the range of 0.8 to 7 degrees, more preferably 3 to 6.5 degrees, and further preferably 3.5 to 6 degrees. When the convex-concave structure is formed on both surfaces, the average inclination angle thereof on one of the surfaces is preferably in the range of 0.8 to 4 degrees, more preferably 1 to 4 degrees, and further preferably 2 to 4 degrees.

Figure 7:
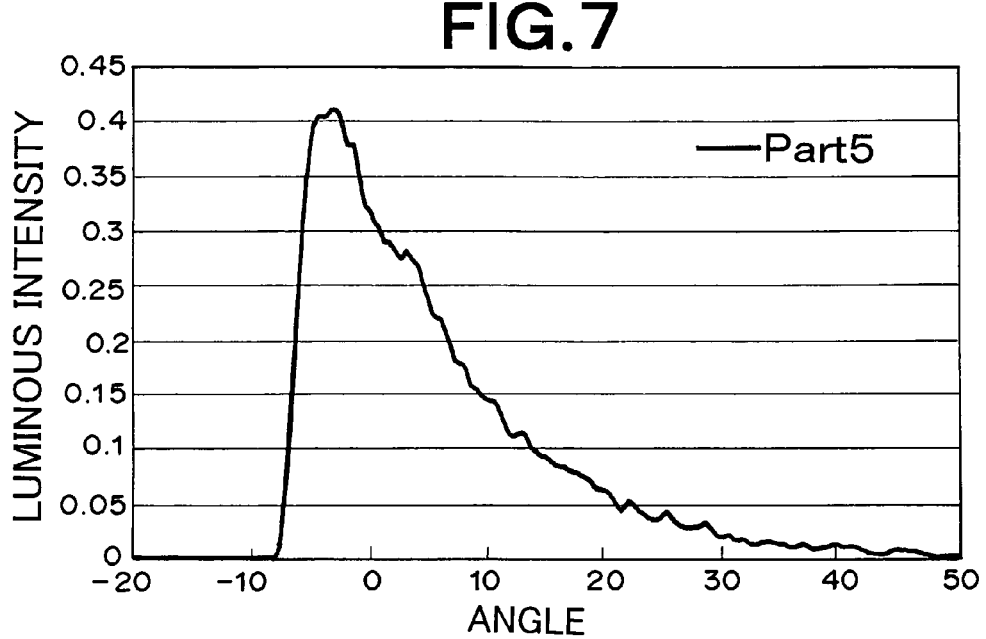
FIG. 7 is an explanatory diagram showing outgoing light luminous intensity distribution (in the XZ-plane) from respective areas of the second prism surface (flat surface) of the light deflector.
Figure 8:
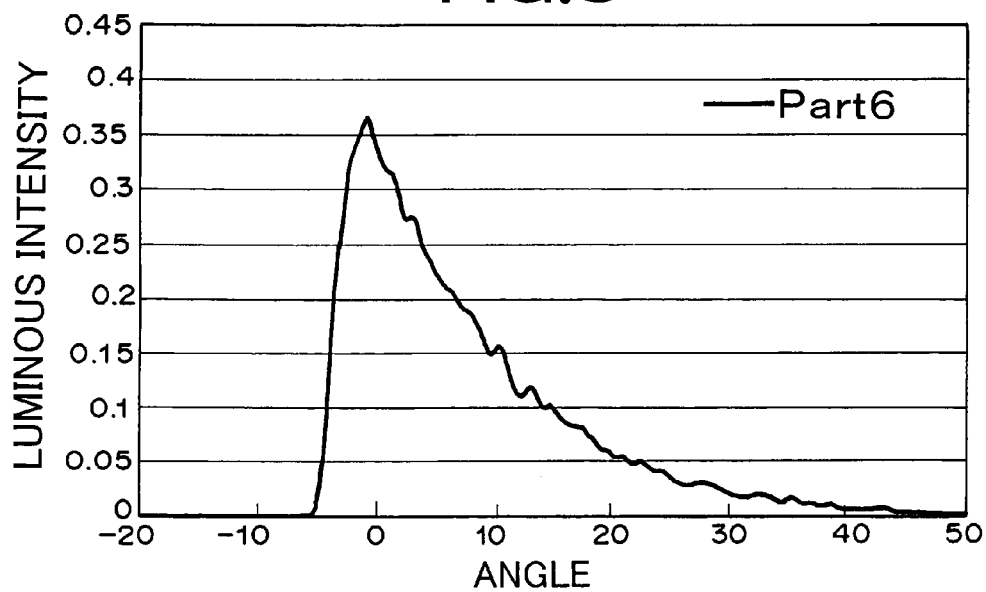
FIG. 8 is an explanatory diagram showing outgoing light luminous intensity distribution (in the XZ-plane) from respective areas of the second prism surface (flat surface) of the light deflector.
Figure 11:
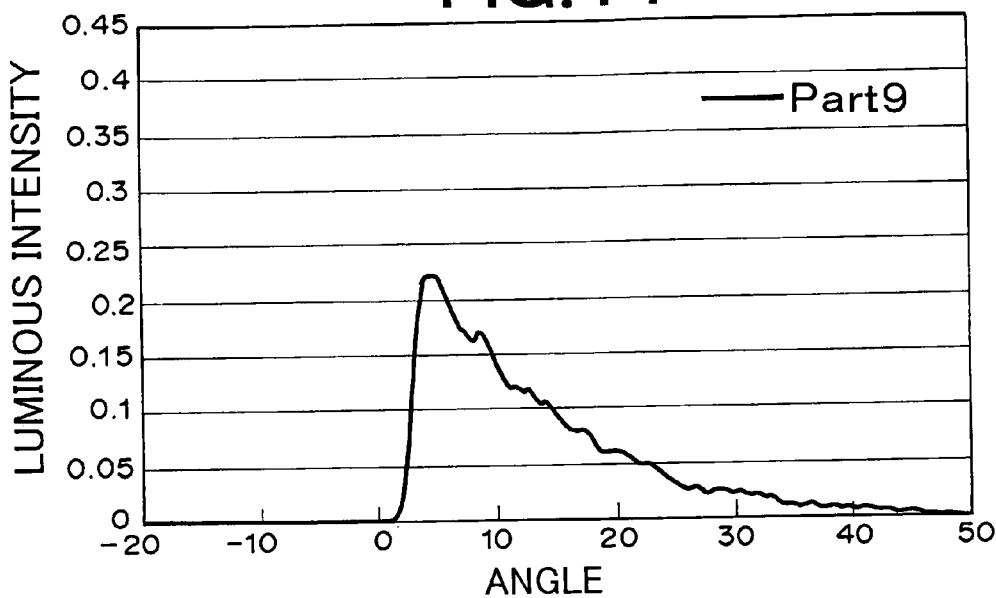
FIG. 11 is an explanatory diagram showing outgoing light luminous intensity distribution (in the XZ-plane) from respective areas of the second prism surface (flat surface) of the light deflector.
Figure 12:
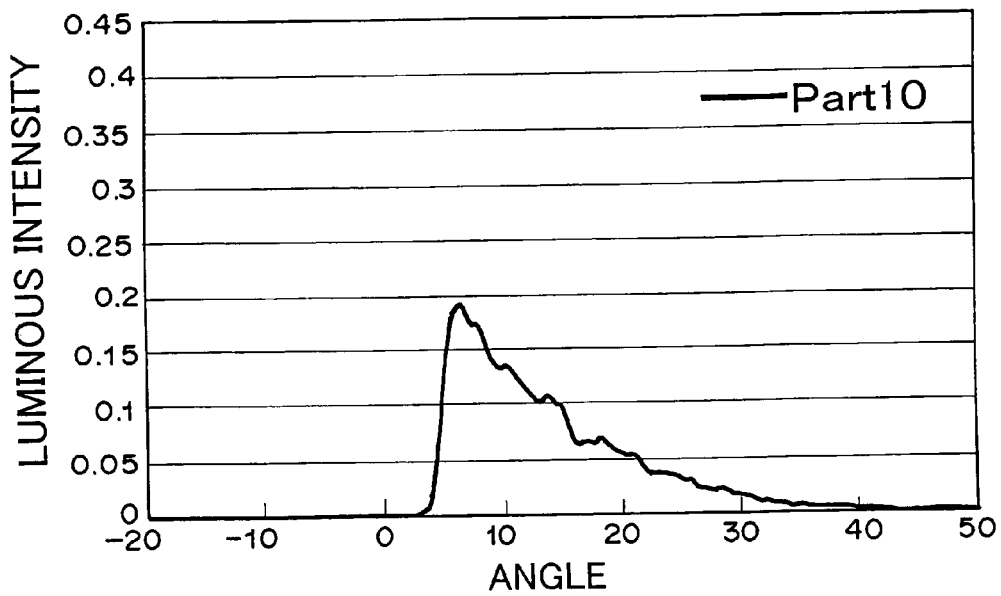
FIG. 12 is an explanatory diagram showing outgoing light luminous intensity distribution (in the XZ-plane) from respective areas of the second prism surface (flat surface) of the light deflector.
Figure 25:
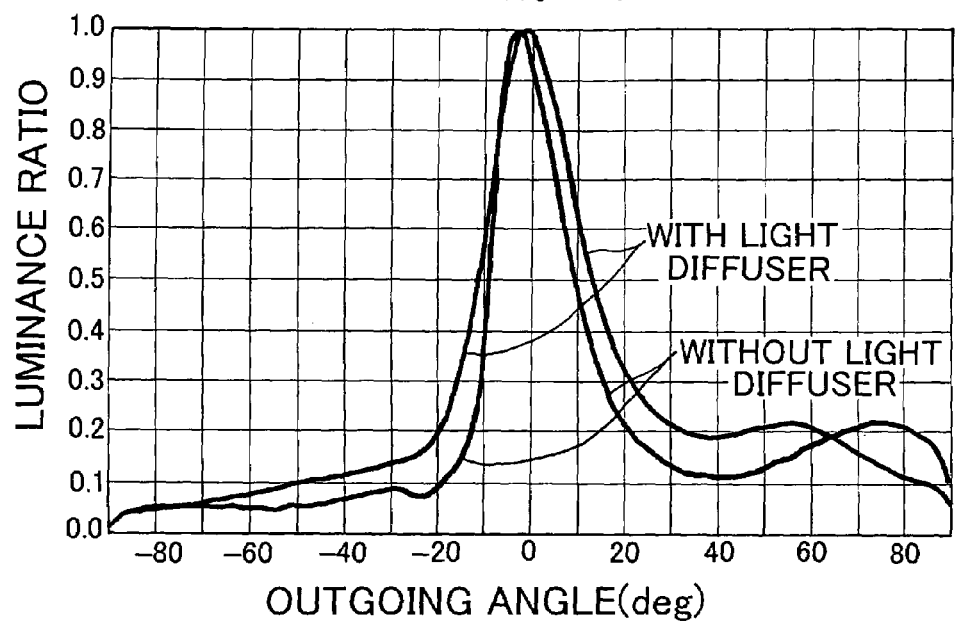
FIG. 25 is a graph showing a luminance distribution (in the XZ-plane) of outgoing light from the light deflector of the light source device of the present invention.

In the light source device of the present invention, there is an instance where the outgoing light exiting from the light exit surface of the light deflector 4 forms an asymmetric outgoing light luminance distribution (in the XZ-plane: "without light diffuser") as shown in FIG. 25. This outgoing light luminance distribution (in the XZ-plane) is resulted from the outgoing light luminous intensity distribution (in the XZ-plane) of the light emitted from the light guide 3. Such an asymmetric outgoing light luminance distribution (in the XZ-plane) tends to be formed when, for example, outgoing light with a high directivity exits from the light deflector 4 in such a manner that the full width half maximum of the luminance distribution (in the XZ-plane) of the outgoing light from the light deflector 4 is 20 degrees or less. Particularly, in the light source device having a relatively large display area, it is necessary to use the light diffuser 6 having a relatively high light diffusion property for relaxing the asymmetry of such an outgoing light luminance distribution (in the XZ-plane) (FIG. 25 shows an outgoing light luminance distribution when such a light diffuser is used ("with light diffuser")). On the other hand, when use is made of, as the light diffuser 6, one wherein the full width half maximum of the outgoing light luminous intensity distribution (in the XZ-plane) is 4 degrees or more and the haze value is 35% or more, it is possible that the peak angle of the luminance distribution (in the XZ-plane) of the outgoing light exiting from the light diffuser 6 is deflected relative to the peak angle of the luminance distribution (in the XZ-plane) of the outgoing light from the light deflector 4 by about 1 to 3 degrees in a direction away from the primary light source. In this case, when the peak angle of the luminance distribution (in the XZ-plane) of the outgoing light from the light deflector is in a desired direction (e.g. the normal direction), usage of the light diffuser 6 causes reduction in luminance in the desired direction. Therefore, when using the foregoing light diffuser 6 in case where the full width half maximum of the luminance distribution (in the XZ-plane) of the outgoing light from the light deflector 4 is 20 degrees or less, it is preferable to design the light deflector 4 or the like in advance such that, as shown in FIG. 7, the peak angle of the luminance distribution (in the XZ-plane) of the outgoing light from the light deflector 4 is inclined toward the light source side from the desired direction by 0.5 to 3 degrees, more preferably 0.5 to 2 degrees, and further preferably 1 to 2 degrees.

Figure 26:
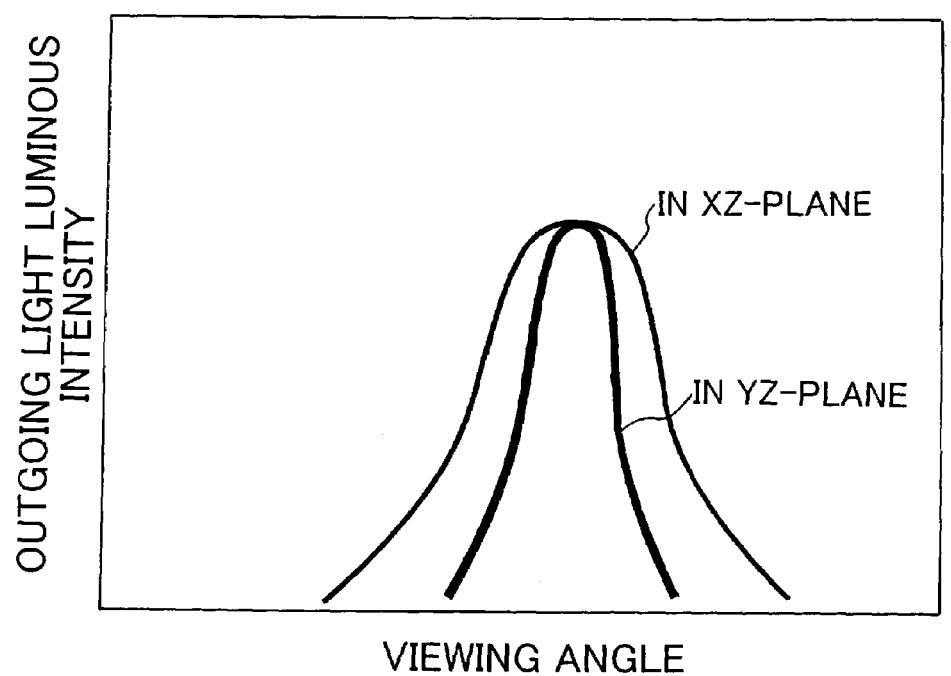
FIG. 26 is an explanatory diagram showing an outgoing light luminous intensity distribution (in the XZ-plane) of the light diffuser having an anisotropic diffusion property of the present invention.

In the present invention, it is preferable to use, as the light diffuser 6, one that has an anisotropy in its light diffusion property because it can increase the whole light ray transmissivity of the light diffuser 6, efficiently diffuse the outgoing light from the light deflector 4, and improve the luminance. For example, in the light source device having the linear cold-cathode tube disposed as the primary light source 1 facing one end surface of the light guide 3, the outgoing light exiting from the light outgoing surface of the light guide 3 is subjected mainly to visual field narrowing in the XZ-plane by the light deflector 4, and the light having been subjected to visual field narrowing in the XZ-plane is further subjected mainly to diffusion by the light diffuser 6 to thereby broaden the viewing angle. However, if use is made of, as the light diffuser 6, one that has an isotropic diffusion property, the light is diffused equally even in the YZ-plane where visual field narrowing by the light deflector is not carried out, so that reduction in luminance is caused. Therefore, as shown in FIG. 26, by using the light diffuser 6 having an anisotropic diffusion property that exhibits a higher light diffusion property in the XZ-plane than in the YZ-plane, diffusion of the light in the XZ-plane subjected to visual field narrowing by the light deflector can be made strong while diffusion of the light in the YZ-plane not subjected to visual field narrowing can be made weak, so that the outgoing light from the light deflector 4 can be efficiently diffused to thereby minimize reduction in luminance.

Figure 27:
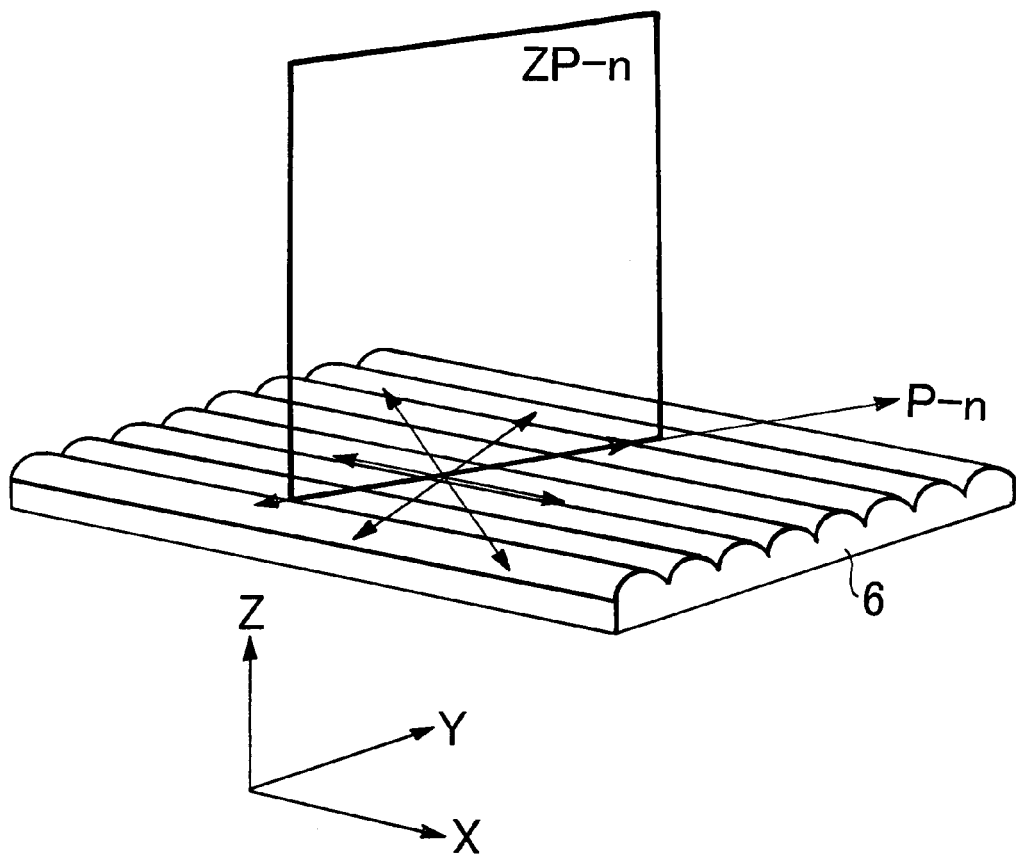
FIG. 27 is an explanatory diagram of an anisotropic diffusion property of the light deflector of the present invention.

In the present invention, with respect to the anisotropic diffusion property of the light diffuser 6, determination on what anisotropy is required for the light diffuser 6 is not made only based on the anisotropy in the XZ-plane and YZ-plane as described above, but it can be suitably selected depending on the shape of the light emitting function portion of the light guide 3, the lens shape and arrangement of the light deflector 4, applied use of the light source device, and so forth. Specifically, as shown in FIG. 27, the anisotropy can be provided by assuming arbitrary planes (ZP-n planes (n=1, 2, ... )) including normal axes relative to the outgoing surface of the light diffuser 6 and arbitrary directions (P-n directions (n=1,2, ... )) in the outgoing surface of the light diffuser 6, and by causing full width half maximums of outgoing light luminance distributions in these arbitrary planes to differ from each other. Note that the maximum value among the full width half maximums of the ZP-n planes is given as a maximum full width half maximum, and the minimum value among them is given as a minimum full width half maximum. Likewise, with respect to the average inclination angle of the convex-concave structure giving the anisotropic diffusion property to the light diffuser 6, the anisotropy of the average inclination angle can be provided by causing average inclination angles in arbitrary P-n directions where the ZP-n planes and the light diffuser 6 (XY-plane) intersect each other, to differ from each other. In this event, the maximum value among the average inclination angles in the P-n directions is given as a maximum average inclination angle, and the minimum value among them is given as a minimum average inclination angle.

For example, when the linear cold-cathode tube is disposed facing one end surface of the light guide 3 to serve as the primary light source 1, since the light deflector 4 achieves visual field narrowing mainly in the XZ-plane while it hardly acts in the YZ-plane, it is optimal to use the light diffuser 6 having an anisotropic diffusion property that effectively diffuses the outgoing light from the light deflector 4 in the XZ-plane while does not diffuse it in the YZ-plane. Therefore, it is preferable that the light diffuser 6 have such an anisotropic diffusion property that exhibits the maximum full width half maximum in the XZ-plane and the minimum full width half maximum in the YZ-plane. Likewise, it is preferable that the convex-concave structure formed on the light diffuser 6 be configured or arranged to have the maximum average inclination angle in the X-direction and the minimum average inclination angle in the Y-direction.

Even in case of the light diffuser 6 having such an anisotropic diffusion property, it is preferable that the light diffuser 6 has a light diffusion property that suitably diffuses the outgoing light from the light deflector 4, taking into account the balance among the luminance characteristic, visibility, quality, and so forth. Specifically, when the light diffusion property of the light diffuser 6 is low, there is a tendency that it becomes difficult to sufficiently broaden the viewing angle to thereby lower the visibility, and the quality improving effect becomes insufficient. Conversely, when the light diffusion property is too high, there is a tendency that the effect of visual field narrowing by the light deflector 4 is spoiled and the whole light ray transmissivity is also reduced to lower the luminance. In view of this, use is made of the light diffuser wherein the maximum full width half maximum of the outgoing light luminous intensity distribution (in the XZ-plane) is in the range of 1 to 13 degrees, preferably 3 to 11 degrees, and more preferably 4 to 9 degrees. Further, the ratio (maximum full width half maximum/minimum full width half maximum) of the maximum full width half maximum relative to the minimum full width half maximum is preferably in the range of 1.1 to 20, more preferably 2 to 15, and further preferably 4 to 10. This is because the light utilization efficiency can be improved to increase the luminance by setting maximum full width half maximum/minimum full width half maximum to 1.1 or more, while, it is possible to suppress reduction in luminance caused by the strong light diffusion property by setting it to 20 or less.

When forming the convex-concave structure on one of the surfaces of the light diffuser 6, the maximum average inclination angle thereof is preferably set in the range of 0.8 to 15 degrees, more preferably 3.5 to 11 degrees, and further preferably 4 to 9 degrees. Further, from the aspect of the anisotropy like maximum full width half maximum/minimum full width half maximum, the ratio (maximum average inclination angle/minimum average inclination angle) of the maximum average inclination angle relative to the minimum average inclination angle is preferably in the range of 1.1 to 20, more preferably 2 to 15, and further preferably 4 to 10. The convex-concave structure may be formed on both surfaces of the light diffuser 6. In this case, it is preferable that the average inclination angle on the incident surface side of the light diffuser 6 be set greater than the average inclination angle on the outgoing surface side thereof for suppressing reduction of the whole light ray transmissivity of the light diffuser 6. Further, in terms of improving the luminance characteristic and visibility, the haze value of the light diffuser 6 is preferably set in the range of 8 to 82%, more preferably 30 to 70%, and further preferably 40 to 65%.

It is preferable to use the light diffuser 6 having a suitable light diffusion property depending on the size of the display area of the light source device. In case of the developed length of the light guide 3 being 8 cm or less, for the light diffuser 6, the maximum full-width half maximum of the outgoing light luminous intensity distribution (in the XZ-plane) is preferably in the range of 1 to 6 degrees, more preferably 1 to 5 degrees, and further preferably 2 to 5 degrees. Further, the haze value is preferably in the range of 8 to 60%, more preferably 8 to 50%, and further preferably 20 to 50%. Furthermore, when the convex-concave structure is formed on the surface of the light diffuser 6, the maximum average inclination angle thereof is preferably in the range of 0.8 to 5 degrees, more preferably 0.8 to 4 degrees, and further preferably 2 to 4 degrees.

In case of the developed length of the light guide 3 being greater than 8 cm and equal to or less than 23 cm (one-lamp type cold-cathode tube is used as the primary light source 1), for the light diffuser 6, the maximum full width half maximum of the outgoing light luminous intensity distribution (in the XZ-plane) is preferably in the range of 3 to 13 degrees, more preferably 4 to 10 degrees, and further preferably 4 to 9 degrees. Further, the haze value is preferably in the range of 30 to 80%, more preferably 40 to 73%, and further preferably 45 to 70%. Furthermore, when the convex-concave structure is formed on the surface of the light diffuser 6, the maximum average inclination angle thereof is preferably in the range of 3 to 15 degrees, more preferably 3.5 to 10 degrees, and further preferably 4.5 to 8 degrees. Particularly, when the developed length of the light guide 3 is greater than 8 cm and equal to or less than 18 cm, for the light diffuser 6, the maximum full width half maximum of the outgoing light luminous intensity distribution (in the XZ-plane) is preferably in the range of 3 to 10 degrees, more preferably 4 to 10 degrees, and further preferably 4 to 9 degrees. Further, the haze value is preferably in the range of 30 to 70%, more preferably 40 to 65%, and further preferably 45 to 60%. Furthermore, when the convex-concave structure is formed on the surface of the light diffuser 6, the maximum average inclination angle thereof is preferably in the range of 3 to 9 degrees, more preferably 3.5 to 8 degrees, and further preferably 4.5 to 8 degrees. On the other hand, when the developed length of the light guide 3 is greater than 18 cm and equal to or less than 22 cm, for the light diffuser 6, the maximum full width half maximum of the outgoing light luminous intensity distribution (in the XZ-plane) is preferably in the range of 4 to 13 degrees, more preferably 5 to 11 degrees, and further preferably 5 to 8.5 degrees. Further, the haze value is preferably in the range of 40 to 75%, more preferably 50 to 70%, and further preferably 50 to 65%. Furthermore, when the convex-concave structure is formed on the surface of the light diffuser 6, the maximum average inclination angle thereof is preferably in the range of 3.5 to 15 degrees, more preferably 4 to 9 degrees, and further preferably 4.5 to 6.5 degrees. Further, when the developed length of the light guide 3 is greater than 22 cm and equal to or less than 23 cm, use is preferably made of, as the light diffuser 6, one that is configured in such a manner that the maximum full width half maximum of the outgoing light intensity distribution (in the XZ-plane) is in the range of 5 to 13 degrees, more preferably 6 to 12 degrees, and further preferably 7 to 9 degrees. Further, the haze value is preferably in the range of 50 to 80%, more preferably 55 to 73%, and further preferably 55 to 70%. Furthermore, when the convex-concave structure is formed on the surface of the light diffuser 6, the maximum average inclination angle thereof is preferably in the range of 4.5 to 15 degrees, more preferably 5 to 10 degrees, and further preferably 5 to 7 degrees.

In case of the developed length of the light guide 3 being greater than 8 cm and equal to or less than 28 cm (multi-lamp type cold-cathode tubes are used as primary light sources 1), the light diffuser 6 is required to have a light diffusion property enabling a wide viewing angle, and the maximum full width half maximum of the outgoing light luminous intensity distribution (in the XZ-plane) thereof is preferably in the range of 0.7 to 13 degrees, more preferably 1 to 11 degrees, and further preferably 2 to 9 degrees. Further, the haze value is preferably in the range of 30 to 82%, more preferably 35 to 75%, and further preferably 40 to 70%. Furthermore, when the convex-concave structure is formed on the surface of the light diffuser 6, the maximum average inclination angle thereof is preferably in the range of 0.8 to 15 degrees, more preferably 1 to 13 degrees, and further preferably 1.5 to 7 degrees. Particularly, when the developed length of the light guide 3 is greater than 22 cm and equal to or less than 28 cm, use is preferably made of, as the light diffuser 6, one that is configured in such a manner that the maximum full width half maximum of the outgoing light luminous intensity distribution (in the XZ-plane) is in the range of 6 to 13 degrees, more preferably 7 to 11 degrees, and further preferably 7 to 9 degrees. Further, the haze value is preferably in the range of 50 to 82%, more preferably 60 to 75%, and further preferably 65 to 70%. Furthermore, when the convex-concave structure is formed on the surface of the light diffuser 6, the maximum average inclination angle thereof is preferably in the range of 4.5 to 15 degrees, more preferably 5.5 to 13 degrees, and further preferably 6 to 7 degrees. Further, when the developed length of the light guide 3 is greater than 8 cm and equal to or less than 22 cm, use is preferably made of, as the light diffuser 6, one that is configured in such a manner that the maximum full width half maximum of the outgoing light intensity distribution (in the XZ-plane) is in the range of 0.7 to 6 degrees, more preferably 1 to 5 degrees, and further preferably 2 to 4 degrees. Further, the haze value is preferably in the range of 30 to 60%, more preferably 35 to 55%, and further preferably 40 to 50%. Furthermore, when the convex-concave structure is formed on the surface of the light diffuser 6, the maximum average inclination angle thereof is preferably in the range of 0.8 to 10 degrees, more preferably 1 to 7 degrees, and further preferably 1.5 to 5 degrees.

Figure 28:
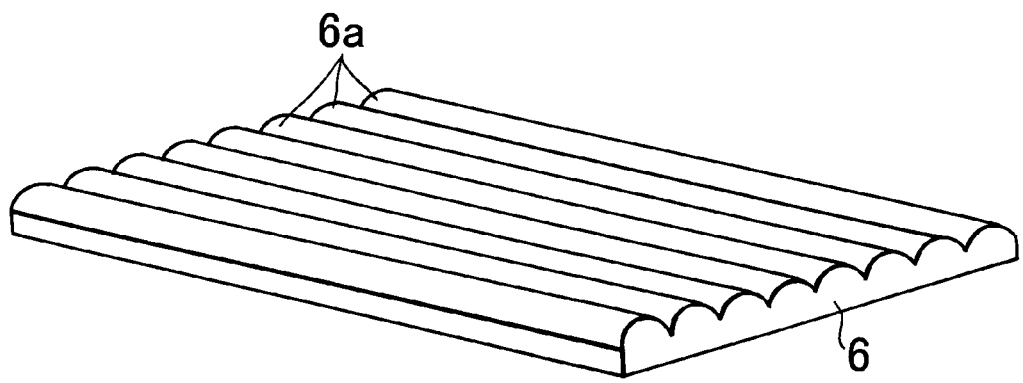
FIG. 28 is a schematic diagram showing a convex-concave structure of the light deflector having the anisotropic diffusion property of the present invention.
Figure 29:
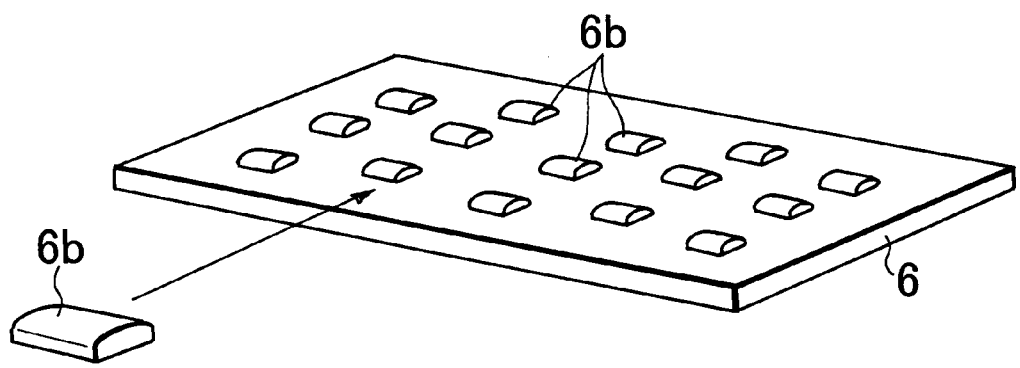
FIG. 29 is a schematic diagram showing a convex-concave structure of the light deflector having the anisotropic diffusion property of the present invention.
Figure 30:
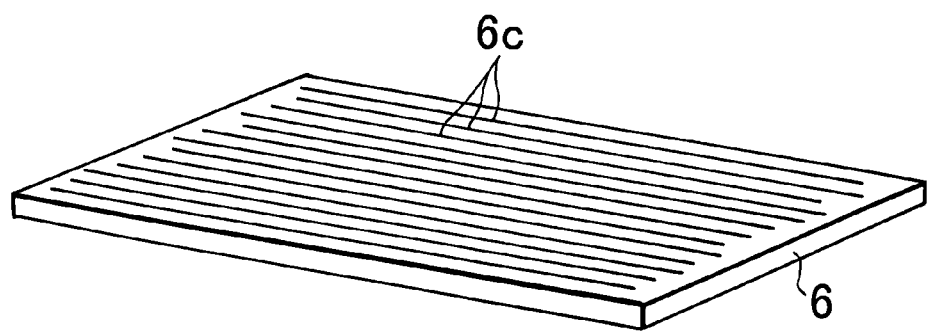
FIG. 30 is a schematic diagram showing a convex-concave structure of the light deflector having the anisotropic diffusion property of the present invention.

As the diffusion property giving structure of the light diffuser 6 having the anisotropic diffusion property, there can be cited convex-concave structures as illustrated in FIGS. 28 to 30. The convex-concave structure illustrated in FIG. 28 is an array structure having a number of elongated lenses 6a such as elongated lenticular lenses successively arrayed side by side and extending in the same direction. For the arraying pitch of the elongated lenses, it is preferable to select a pitch that is not liable to cause moire relative to the arraying pitch of pixels of the liquid crystal display element used in the display device or relative to the arraying pitch of the elongated lenses such as the elongated prisms of the light deflector 4, or to use random arraying pitches. Typically, the arraying pitch of the elongated lenses is preferably set in the range of 1 to 70 µm, more preferably 5 to 40 µm in terms of facilitating production and preventing occurrence of moire, and further preferably 10 to 30 µm. In terms of improvement in luminance and visibility, the average inclination angle in a direction perpendicular to a longitudinal direction of the elongated lens is preferably set in the range of 0.8 to 15 degrees, more preferably 3.5 to 11 degrees, and further preferably 4 to 9 degrees.

The convex-concave structure illustrated in FIG. 29 is a structure wherein a number of cylindrical lens shaped members 6b are discretely arrayed. The arraying interval of the cylindrical lens shaped members may be a fixed regular pitch or random arraying pitches. Typically, the arraying pitch of the cylindrical lens shaped members is preferably set in the range of 1 to 70 µm, more preferably 5 to 40 µm in terms of facilitating production and preventing occurrence of moire, and further preferably 10 to 30 µm. In terms of improvement in luminance and visibility, the average inclination angle in a direction perpendicular to a longitudinal direction of the cylindrical lens shaped member is preferably set in the range of 0.8 to 15 degrees, more preferably 3.5 to 11 degrees, and further preferably 4 to 9 degrees. Such a discrete array structure is preferably arranged in such a manner that the probability becomes high that a line where the plane for which the maximum full width half maximum is required to be shown and the outgoing surface of the light diffuser 6 intersect each other, and the longitudinal direction of the cylindrical lens shaped member become substantially perpendicular to each other. Further, the structure is preferably arranged in such a manner that the probability becomes high that a line where the plane for which the minimum full width half maximum is required to be shown and the outgoing surface of the light diffuser 6 intersect each other, and the longitudinal direction of the cylindrical lens shaped member become substantially parallel to each other.

The convex-concave structure illustrated in FIG. 30 is a hairline structure. In terms of improvement in luminance and visibility, the average inclination angle in a direction perpendicular to an extending direction of hairlines 6c is preferably set in the range of 0.8 to 15 degrees, more preferably 3.5 to 11 degrees, and further preferably 4 to 9 degrees. The extending direction of the hairline is preferably a direction that is substantially perpendicular to a line where the plane required to represent the maximum full width half maximum for the light diffuser 6 and the outgoing surface of the light diffuser 6 intersect each other.

By applying a mat structure to at least one of the surface formed with such a convex-concave structure giving the anisotropic diffusion property and the back surface thereof, it is possible to suppress glare, luminance spots, and the like to thereby achieve improvement in quality. However, if the light diffusion property of the mat structure becomes strong, the anisotropic diffusion property may be spoiled to cause reduction in luminance. Therefore, it is preferable to apply the mat structure having a relatively weak light diffusion property. For such a mat structure, the average inclination angle is preferably in the range of 0.5 to 5 degrees, more preferably 0.8 to 4 degrees, and further preferably 1 to 3.5 degrees. Note that when the mat structure is applied to the surface of the anisotropy giving convex-concave structure, the average inclination angle of the mat structure represents an average inclination angle of the mat structure itself excluding an average inclination angle caused by the convex-concave structure. Such an average inclination angle can be measured at a portion where the convex-concave structure does not exist, or in a direction parallel to the longitudinal direction of the convex-concave structure. It can be measured using a contact-stylus roughness meter, a method of performing an image analysis of a sectional shape of the light diffuser 6, an atomic force microscope, or the like.

In the present invention, it is also possible to emit the outgoing light from the light guide 3 in a particular direction such as the normal direction by the use of the light deflector 4 and emit this outgoing light in a desired direction by the use of the light diffuser 6 having the anisotropic diffusion property. In this case, it is also possible to give both functions, i.e. an anisotropic diffusion action and a light deflection action, to the light diffuser 6. For example, in case of using the elongated lenticular lenses or the cylindrical lens shaped members as the convex-concave structure, both functions of the anisotropic diffusion action and the light deflection action can be given by forming the sectional shape of the convex-concave structure to be asymmetric.

Further, in the present invention, for the purpose of adjusting the viewing angle of the light source device and improving the quality of the light source, a light diffusion material can be contained in the light deflector 4 or the light diffuser 6. As such a light diffusion material, use can be made of transparent particles having a refractive index different from that of a basic material forming the light deflector 4 or the light diffuser 6. For example, there can be cited of silicone beads, polystyrene, polymethylmethacrylate, homopolymer, copolymer, or the like of fluorinated methacrylate or the like. For the light diffusion material, it is necessary to properly select the content, particle size, refractive index, and the like so as not to spoil the visual field narrowing effect achieved by the light deflector 4 or the proper diffusion effect achieved by the light diffuser 6. For example, if a difference between the refractive index of the light diffusion material and that of the basic material of the light deflector 4 or the light diffuser 6 is too small, the small diffusion effect is resulted, while, if it is too large, excessive scattering and refraction are resulted. Therefore, the refractive index difference is preferably set in the range of 0.01 to 0.1, more preferably 0.03 to 0.08, and further preferably 0.03 to 0.05. Further, when the particle size of the light diffusion material is too large, scattering becomes strong to cause glare or reduction in luminance, while, when it is too small, coloring is generated. Therefore, the average particle size is preferably set in the range of 0.5 to 20 μm, more preferably 2 to 15 μm, and further preferably 2 to 10 μm.

There is an instance where the outgoing light of the light source device using the light deflector according to the present invention exhibits an asymmetric luminance distribution (in the XZ-plane) wherein, as going away from the peak light direction used as a boundary, luminance rapidly decreases on the side of the primary light source with respect to the peak light direction while it decreases relatively gently on the side farther from the primary light source. For example, when the light source device having such an outgoing light luminance distribution (in the XZ-plane) is applied to a liquid crystal display device, requiring a relatively wide viewing angle, of a notebook personal computer or the like of about 10 inches or greater, it has been carried out to dispose a light diffuser having a relatively high light diffusion property on the light exit surface of the light deflector to thereby spread the outgoing light luminance distribution (in the XZ-plane) to broaden the viewing angle. When use is made of a light diffuser having a strong light diffusion property with a haze value of 50% or more, the peak angle of the outgoing light luminance distribution (in the XZ-plane) is deflected toward the side away from the primary light source by about 1 to 3 degrees. Therefore, when the peak angle of the outgoing light luminance distribution (in the XZ-plane) from the light deflector is located in the normal direction of the light exit surface thereof, the peak angle of the outgoing light luminance distribution (in the XZ-plane) is deflected toward the side away from the primary light source by about 1 to 3 degrees from the normal direction so that the luminance as observed from the normal direction is extremely lowered. This is because although the asymmetry of the outgoing light luminance distribution (in the XZ-plane) of the light exiting from the light deflector is somewhat relaxed by the use of the light diffuser, a portion of the outgoing light luminance distribution (in the XZ-plane) where the luminance is reduced relatively rapidly is located in the normal direction. In order to avoid such an extreme reduction in luminance, it is preferable that the peak angle of the luminance distribution (in the XZ-plane) of the outgoing light from the light deflector be inclined toward the primary light source side by 1 to 3 degrees in advance.

Hereinbelow, still another embodiment of the present invention will be described with reference to the drawings.

Figure 31:
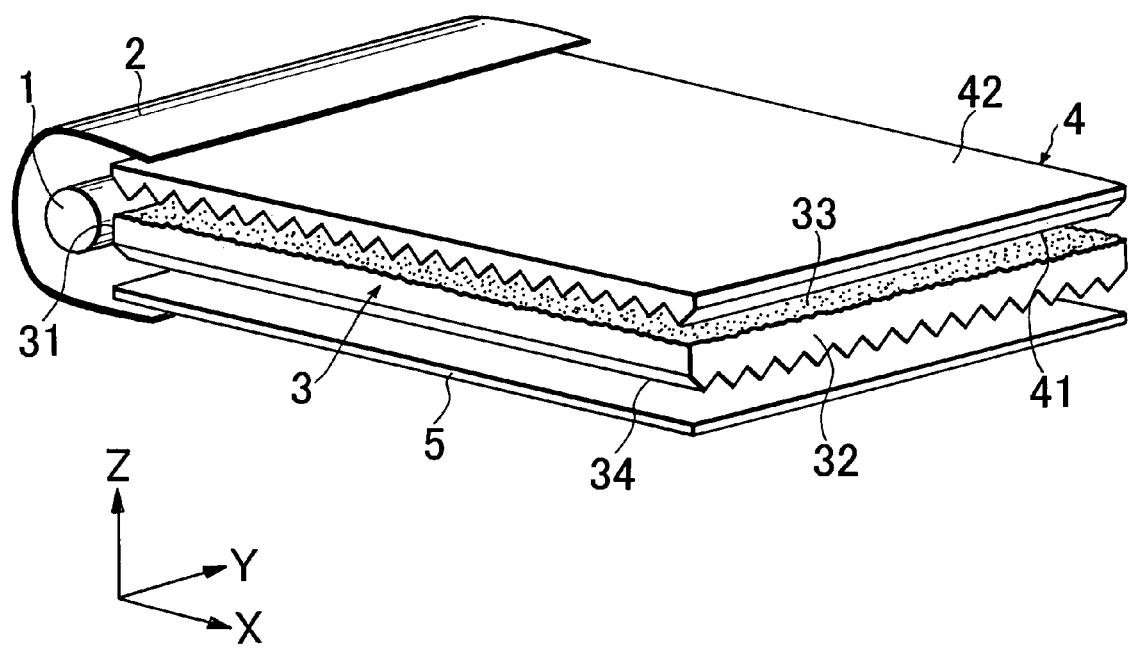
FIG. 31 is a schematic perspective view showing a surface light source device according to the present invention.

FIG. 31 is a schematic perspective view illustrating one embodiment of a surface light source device according to the present invention. As illustrated in FIG. 31, the surface light source device of this embodiment comprises a light guide 3 in which at least one of side end surfaces serves as a light incident surface 31 and one surface substantially perpendicular thereto serves as a light outgoing surface 33, a primary light source 1 disposed facing the light incident surface 31 of the light guide 3 and covered with a light source reflector 2, a light deflector 4 disposed on the light outgoing surface of the light guide 3, and a light reflector 5 disposed facing a back surface 34, opposite to the light outgoing surface 33, of the light guide 3. Among these constituent members, the primary light source 1, the light source reflector 2, the light guide 3, and the light reflector 5 are the same as those described in connection with the foregoing embodiments of FIG. 1 and so forth, and therefore, description thereof is omitted herein.

Figure 32:
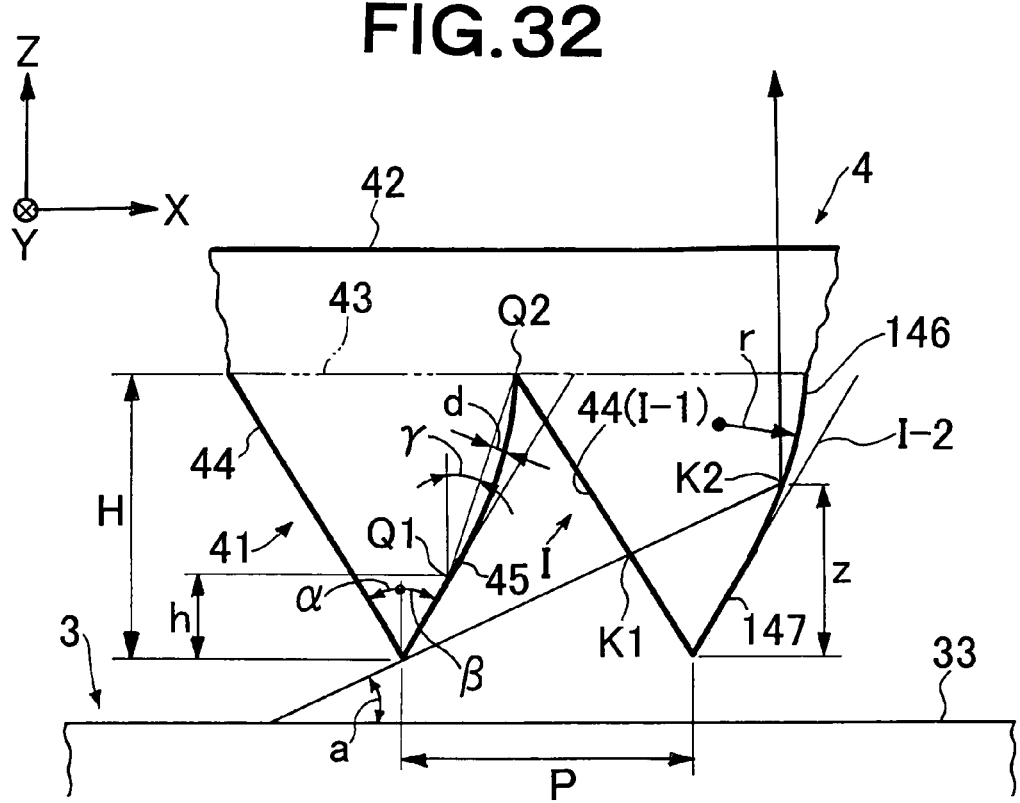
FIG. 32 is a schematic partial cross-sectional view of the shape of each of elongated prisms of a light entrance surface of a light deflector according to the present invention.

FIG. 32 is an explanatory diagram of the shape of each of elongated prisms of the light deflector 4. The light deflector 4 uses one of its principal surfaces as a light entrance surface 41 and the other as a light exit surface 42. The light entrance surface 41 has a number of elongated prisms arrayed side by side, and each elongated prism is composed of two prism surfaces, i.e. a first prism surface 44 located on the side closer to the primary light source and a second prism surface 45 located on the side farther from the primary light source. In the embodiment illustrated in FIG. 32, the first prism surface 44 is a flat surface, while the second prism surface 45 is configured in such a manner that one part thereof located on the side of the vertex portion of the elongated prism is in the form of a substantially flat surface and the other part thereof located on the side of the light exit surface is formed into a convex curved surface shape.

The light deflector 4 of the present invention can achieve an extremely high light condensing effect by forming the second prism surface 45 into a particular shape so that an extremely high luminance can be achieved in the light source device. Specifically, an inclination angle (one of allocated angles of a prism vertical angle) α of the first prism surface 44 is set to 28 to 34 degrees, an inclination angle (the other allocated angle of the prism vertical angle) β of the second prism surface 45 is set to 32.5 to 37 degrees, an inclination angle γ of a chord of a convex curved surface shaped portion 146 is set to 30 to 35 degrees, a ratio (h/H) of a height (h) between the vertex portion of the elongated prism and the convex curved surface shaped portion 146 (i.e. a height from the vertex portion of the elongated prism to a boundary between a substantially flat surface portion 147 and the convex curved surface shaped portion 146) relative to a height (H) of the elongated prism is set to 25 to 60%, and a ratio (r/P) of a radius of curvature (r) of the foregoing convex curved surface shape relative to a pitch (P) of the elongated prisms is set to 5 to 11. Herein, the inclination angles α, β, and γ are angles relative to a normal of an elongated prism formed plane 43. Further, the chord of the convex curved surface shaped portion 46 represents a chord corresponding to a flat surface connecting between both end portions Q1 and Q2 of the convex curved surface shaped portion 146.

Further, in the light deflector 4 of the present invention, the foregoing convex curved surface shape is not limited to the shape having a circular-arc shape in section defined by r/P as described above, but may be a shape having a non-circular-arc shape in section wherein a ratio (d/P) of a maximum distance (d) between the chord of the convex curved surface shaped portion 146 and the convex curved surface shaped portion 146 relative to the pitch (P) of the elongated prisms is 0.2 to 2%.

Figure 33:
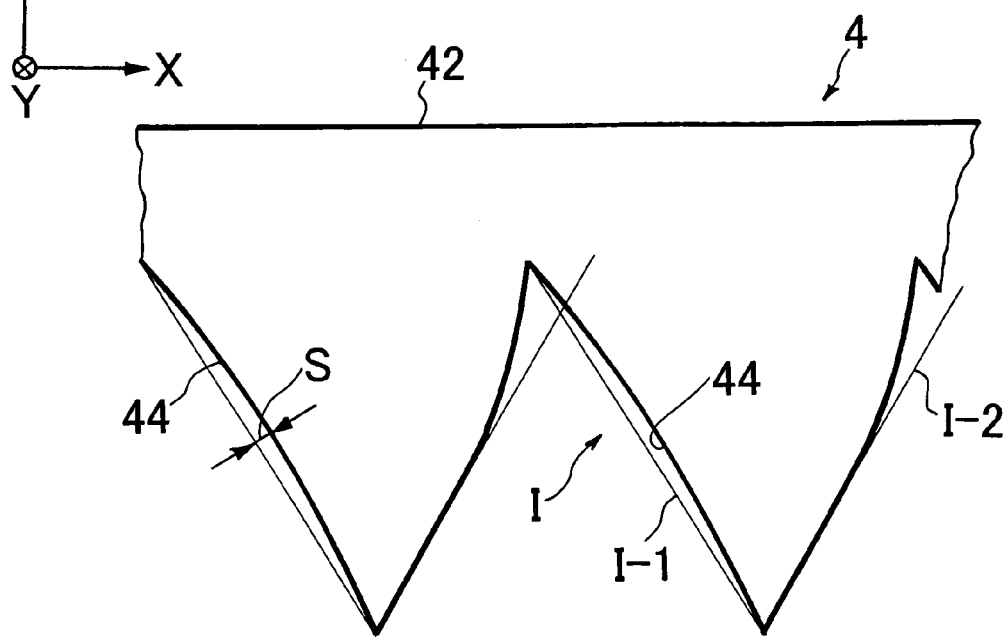
FIG. 33 is a schematic partial cross-sectional view of the shape of each of elongated prisms of a light entrance surface of a light deflector according to the present invention.

Further, in the light deflector 4 of the present invention, as illustrated in FIG. 33, there is an instance where the substantially flat surface of the first prism surface 44 is subjected to a change in shape (displacement from a flat plane connecting between the vertex portion and the bottom portion of the elongated prism) due to warping or the like that occurs upon forming an elongated prism pattern. When such a displacement of the substantially flat surface is large, the optical properties of the light deflector 4 are affected thereby, and therefore, it is preferable to suppress the displacement to a minute value. Specifically, the displacement of the substantially flat surface from the flat plane connecting between the vertex portion and the bottom portion of the elongated prism is preferably in the range of 0.008 or less in terms of a ratio of a maximum distance S between such a flat plane and the substantially flat surface relative to the pitch P of the elongated prisms, more preferably 0.0065 or less, and further preferably 0.005 or less. Since such deformation of the substantially flat surface is caused mainly by an influence of polymerization contraction or the like upon forming the elongated prism pattern, it is preferable to quantify the degree of deformation due to polymerization contraction in advance and to design the shape of elongated prisms of a die so as to cancel it.

The foregoing shape of the elongated prism depends on the full width half maximum and the peak angle of the outgoing light luminous intensity distribution of the light exiting from the light guide 3, and an absolute value of a difference between the inclination angle α of the first prism surface 44 and the inclination angle β of the second prism surface 45. Hereinbelow, description will be given about typical examples of the light guide and the light deflector suitable for the light source device of the present invention.

When the peak angle in the outgoing light luminous intensity distribution from the light guide 3 is 60 to 75 degrees relative to the normal of the light outgoing surface 33, the full width half maximum therein is 26 to 35 degrees, and the absolute value (|α−β|) of the difference between the inclination angle α of the first prism surface 44 and the inclination angle β of the second prism surface 45 is 0.3 or more and less than 1.8, it is preferable that the inclination angle α of the first prism surface 44 be set to 32 to 33.5 degrees, the inclination angle β of the second prism surface 45 be set to 32.5 to 34.5 degrees, the inclination angle γ of the chord of the convex curved surface shaped portion 146 be set to 30 to 31.5 degrees, the ratio (h/H) of the height (h) from the vertex portion of the elongated prism to the convex curved surface shaped portion 146 relative to the height (H) of the elongated prism be set to 25 to 60%, the ratio (r/P) of the radius of curvature (r) of the foregoing convex curved surface shape relative to the pitch (P) of the elongated prisms be set to 5 to 9.5, and the ratio (d/P) of the maximum distance (d) between the chord of the convex curved surface shaped portion 146 and the convex curved surface shaped portion 146 relative to the pitch (P) of the elongated prisms be set to 0.2 to 2%. More preferably, the inclination angle α is set to 32.2 to 33.1 degrees, the inclination angle β is set to 32.8 to 33.8 degrees, the inclination angle γ is set to 30.4 to 31.3 degrees, h/H is set to 30 to 56%, r/P is set to 5.5 to 8.5, and d/P is set to 0.23 to 1.1%. Further preferably, the inclination angle α is set to 32.4 to 32.8 degrees, the inclination angle β is set to 33 to 33.4 degrees, the inclination angle γ is set to 30.8 to 31.2 degrees, h/H is set to 38 to 50%, r/P is set to 6 to 8.5, and d/P is set to 0.25 to 0.68%.

When the absolute value (|α−β|) of the difference between the inclination angle α of the first prism surface 44 and the inclination angle β of the second prism surface 45 is less than 0.3, it is preferable that the inclination angle α of the first prism surface 44 be set to 32.5 to 34 degrees, the inclination angle β of the second prism surface 45 be set to 32.5 to 34 degrees, the inclination angle γ of the chord of the convex curved surface shaped portion 146 be set to 30 to 31.5 degrees, the ratio (h/H) of the height (h) from the vertex portion of the elongated prism to the convex curved surface shaped portion 146 relative to the height (H) of the elongated prism be set to 25 to 50%, the ratio (r/P) of the radius of curvature (r) of the convex curved surface shape relative to the pitch (P) of the elongated prisms be set to 5 to 10, and the ratio (d/P) of the maximum distance (d) between the chord of the convex curved surface shaped portion 146 and the convex curved surface shaped portion 146 relative to the pitch (P) of the elongated prisms be set to 0.2 to 1.5%. More preferably, the inclination angle α is set to 32.7 to 34 degrees, the inclination angle β is set to 32.7 to 34 degrees, the inclination angle γ is set to 30.4 to 31.3 degrees, h/H is set to 30 to 41%, r/P is set to 6 to 10, and d/P is set to 0.2 to 1.3%. Further preferably, the inclination angle α is set to 33.5 to 33.9 degrees, the inclination angle β is set to 33.5 to 33.9 degrees, the inclination angle γ is set to 30.8 to 31.2 degrees, h/H is set to 35 to 39%, r/P is set to 7 to 8.5, and d/P is set to 0.3 to 1.1%.

When the absolute value (|α−β|) of the difference between the inclination angle α of the first prism surface 44 and the inclination angle β of the second prism surface 45 is 1.8 or more and 8.5 or less, it is preferable that the inclination angle α of the first prism surface 44 be set to 28 to 32 degrees, the inclination angle β of the second prism surface 45 be set to 33 to 37 degrees, the inclination angle γ of the chord of the convex curved surface shaped portion 146 be set to 32 to 34 degrees, the ratio (h/H) of the height (h) from the vertex portion of the elongated prism to the convex curved surface shaped portion 146 relative to the height (H) of the elongated prism be set to 30 to 45%, the ratio (r/P) of the radius of curvature (r) of the convex curved surface shape relative to the pitch (P) of the elongated prisms be set to 5 to 11, and the ratio (d/P) of the maximum distance (d) between the chord of the convex curved surface shaped portion 146 and the convex curved surface shaped portion 146 relative to the pitch (P) of the elongated prisms be set to 0.2 to 2%. More preferably, the inclination angle α is set to 28.5 to 31.5 degrees, the inclination angle β is set to 33.5 to 36 degrees, the inclination angle γ is set to 31.7 to 33.2 degrees, h/H is set to 33 to 42%, r/P is set to 5.2 to 10.5, and d/P is set to 0.3 to 1%. Further preferably, the inclination angle α is set to 29.5 to 30.9 degrees, the inclination angle β is set to 34.5 to 34.9 degrees, the inclination angle γ is set to 31.5 to 32.5 degrees, h/H is set to 37.5 to 39%, r/P is set to 5.3 to 10, and d/P is set to 0.4 to 0.85%.

When the peak angle in the outgoing light luminous intensity distribution from the light guide 3 is 60 to 75 degrees relative to the normal of the light outgoing surface 33, the full width half maximum therein is less than 26 degrees, and the absolute value (|α−β|) of the difference between the inclination angle α of the first prism surface 44 and the inclination angle β of the second prism surface 45 is 0.3 or more and less than 1.8, it is preferable that the inclination angle α of the first prism surface 44 be set to 32 to 33.5 degrees, the inclination angle β of the second prism surface 45 be set to 32.5 to 34.5 degrees, the inclination angle γ of the chord of the convex curved surface shaped portion 146 be set to 30 to 31.5 degrees, the ratio (h/H) of the height (h) from the vertex portion of the elongated prism to the convex curved surface shaped portion 146 relative to the height (H) of the elongated prism be set to 30 to 55%, the ratio (r/P) of the radius of curvature (r) of the convex curved surface shape relative to the pitch (P) of the elongated prisms be set to 5 to 9, and the ratio (d/P) of the maximum distance (d) between the chord of the convex curved surface shaped portion 146 and the convex curved surface shaped portion 146 relative to the pitch (P) of the elongated prisms be set to 0.25 to 2%. More preferably, the inclination angle α is set to 32.2 to 33.1 degrees, the inclination angle β is set to 32.7 to 33.7 degrees, the inclination angle γ is set to 30.4 to 31.3 degrees, h/H is set to 37 to 52%, r/P is set to 5.5 to 8.5, and d/P is set to 0.28 to 1.1%. Further preferably, the inclination angle α is set to 32.4 to 32.8 degrees, the inclination angle β is set to 33 to 33.4 degrees, the inclination angle γ is set to 30.8 to 31.2 degrees, h/H is set to 43 to 50%, r/P is set to 6 to 8, and d/P is set to 0.3 to 0.7%.

When the absolute value (|α−β|) of the difference between the inclination angle α of the first prism surface 44 and the inclination angle β of the second prism surface 45 is less than 0.3, it is preferable that the inclination angle α of the first prism surface 44 be set to 33.5 to 34 degrees, the inclination angle β of the second prism surface 45 be set to 33.5 to 34 degrees, the inclination angle γ of the chord of the convex curved surface shaped portion 146 be set to 30 to 31.5 degrees, the ratio (h/H) of the height (h) from the vertex portion of the elongated prism to the convex curved surface shaped portion 146 relative to the height (H) of the elongated prism be set to 35 to 48%, the ratio (r/P) of the radius of curvature (r) of the convex curved surface shape relative to the pitch (P) of the elongated prisms be set to 7 to 9, and the ratio (d/P) of the maximum distance (d) between the chord of the convex curved surface shaped portion 146 and the convex curved surface shaped portion 146 relative to the pitch (P) of the elongated prisms be set to 0.3 to 2%. More preferably, the inclination angle α is set to 33 to 33.5 degrees, the inclination angle β is set to 33 to 33.5 degrees, the inclination angle γ is set to 30.4 to 31.3 degrees, h/H is set to 37 to 42%, r/P is set to 7.2 to 8.8, and d/P is set to 0.33 to 1.1%. Further preferably, the inclination angle α is set to 32.5 to 32.9 degrees, the inclination angle β is set to 32.5 to 32.9 degrees, the inclination angle γ is set to 30.8 to 31.2 degrees, h/H is set to 37 to 40%, r/P is set to 7.8 to 8.2, and d/P is set to 0.35 to 0.7%.

When the absolute value (|α−β|) of the difference between the inclination angle α of the first prism surface 44 and the inclination angle β of the second prism surface 45 is 1.8 or more and 8.5 or less, it is preferable that the inclination angle α of the first prism surface 44 be set to 28 to 31.5 degrees, the inclination angle β of the second prism surface 45 be set to 33 to 37 degrees, the inclination angle γ of the chord of the convex curved surface shaped portion 146 be set to 31 to 35 degrees, the ratio (h/H) of the height (h) from the vertex portion of the elongated prism to the convex curved surface shaped portion 146 relative to the height (H) of the elongated prism be set to 30 to 45%, the ratio (r/P) of the radius of curvature (r) of the convex curved surface shape relative to the pitch (P) of the elongated prisms be set to 6 to 9, and the ratio (d/P) of the maximum distance (d) between the chord of the convex curved surface shaped portion 146 and the convex curved surface shaped portion 146 relative to the pitch (P) of the elongated prisms be set to 0.43 to 2%. More preferably, the inclination angle α is set to 28.6 to 31.4 degrees, the inclination angle β is set to 33.5 to 36 degrees, the inclination angle γ is set to 31.5 to 35 degrees, h/H is set to 33 to 42%, r/P is set to 6.8 to 8.8, and d/P is set to 0.45 to 0.9%. Further preferably, the inclination angle α is set to 28.5 to 31.3 degrees, the inclination angle β is set to 34.5 to 34.9 degrees, the inclination angle γ is set to 31.5 to 35 degrees, h/H is set to 33 to 42%, r/P is set to 7.8 to 8.2, and d/P is set to 0.5 to 0.6%.

More suitable shapes of the elongated prisms exist intermittently as shown in Tables 1 and 2 below in terms of optimum ranges of the inclination angle α of the first prism surface 44, the inclination angle β of the second prism surface 45, the inclination angle γ of the chord of the convex curved surface shaped portion 146, the ratio (h/H) of the height (h) from the vertex portion of the elongated prism to the convex curved surface shaped portion 146 relative to the height (H) of the elongated prism, the ratio (r/P) of the radius of curvature (r) of the convex curved surface shape relative to the pitch (P) of the elongated prisms, and the ratio (d/P) of the maximum distance (d) between the chord of the convex curved surface shaped portion 146 and the convex curved surface shaped portion 146 relative to the pitch (P) of the elongated prisms. The optimum ranges shown in Table 1 are those for a case where the full width half maximum of the outgoing light luminous intensity distribution from the light guide is relatively broad (26 degrees or more in full width half maximum), while the optimum ranges shown in Table 2 are those for a case where the full width half maximum of the outgoing light luminous intensity distribution from the light guide is relatively narrow (less than 26 degrees in full width half maximum). Note that the ranges shown in Tables 1 and 2 do not represent all the optimum ranges, but represent only part thereof.

TABLE 1

| α(deg) | β(deg) | γ(deg) | h/H(%) | r/P | d/P(%) |
|---|---|---|---|---|---|
| 32.5 ± 0.5 | 33.2 ± 0.5 | 31 ± 0.5 | 48 ± 4 | 11.1 ± 0.5 | 0.26 ± 0.1 |
| 32.5 ± 0.5 | 33.2 ± 0.5 | 31 ± 0.5 | 48 ± 4 | 9.3 ± 0.5 | 0.31 ± 0.1 |
| 32.5 ± 0.5 | 33.2 ± 0.5 | 31 ± 0.5 | 48 ± 4 | 8.4 ± 0.5 | 0.34 ± 0.1 |
| 32.5 ± 0.5 | 33.2 ± 0.5 | 31 ± 0.5 | 48 ± 4 | 7.5 ± 0.5 | 0.38 ± 0.1 |
| 32.5 ± 0.5 | 33.2 ± 0.5 | 31 ± 0.5 | 48 ± 4 | 7.1 ± 0.5 | 0.41 ± 0.1 |
| 32.5 ± 0.5 | 33.2 ± 0.5 | 31 ± 0.5 | 48 ± 4 | 6.6 ± 0.5 | 0.43 ± 0.1 |
| 32.5 ± 0.5 | 33.2 ± 0.5 | 31 ± 0.5 | 48 ± 4 | 5.5 ± 0.5 | 0.52 ± 0.1 |
| 32.5 ± 0.5 | 33.2 ± 0.5 | 31 ± 0.5 | 30.3 ± 4 | 8 ± 0.5 | 0.66 ± 0.1 |
| 32.5 ± 0.5 | 33.2 ± 0.5 | 31 ± 0.5 | 38.9 ± 4 | 8 ± 0.5 | 0.5 ± 0.1 |
| 32.5 ± 0.5 | 33.2 ± 0.5 | 31 ± 0.5 | 48 ± 4 | 8 ± 0.5 | 0.36 ± 0.1 |
| 32.5 ± 0.5 | 33.2 ± 0.5 | 31 ± 0.5 | 55.9 ± 4 | 8 ± 0.5 | 0.26 ± 0.1 |
| 32.5 ± 0.5 | 33.7 ± 0.5 | 31 ± 0.5 | 39.3 ± 4 | 8 ± 0.5 | 0.49 ± 0.1 |
| 32.7 ± 0.5 | 33.7 ± 0.5 | 31 ± 0.5 | 48.4 ± 4 | 7.1 ± 0.5 | 0.41 ± 0.1 |
| 32.7 ± 0.5 | 33.7 ± 0.5 | 31 ± 0.5 | 39.5 ± 4 | 7.1 ± 0.5 | 0.55 ± 0.1 |
| 32.7 ± 0.5 | 33.7 ± 0.5 | 31 ± 0.5 | 48.4 ± 4 | 8 ± 0.5 | 0.36 ± 0.1 |
| 32.7 ± 0.5 | 33.7 ± 0.5 | 31 ± 0.5 | 39.5 ± 4 | 8 ± 0.5 | 0.48 ± 0.1 |
| 32.7 ± 0.5 | 33.7 ± 0.5 | 31 ± 0.5 | 30.8 ± 4 | 8 ± 0.5 | 0.64 ± 0.1 |
| 32.7 ± 0.5 | 32.7 ± 0.5 | 30 ± 0.5 | 38.3 ± 4 | 7.1 ± 0.5 | 0.58 ± 0.1 |
| 32.7 ± 0.5 | 32.7 ± 0.5 | 31 ± 0.5 | 47.8 ± 4 | 8 ± 0.5 | 0.36 ± 0.1 |
| 32.7 ± 0.5 | 32.7 ± 0.5 | 31 ± 0.5 | 38.7 ± 4 | 8 ± 0.5 | 0.5 ± 0.1 |
| 32.7 ± 0.5 | 32.7 ± 0.5 | 31 ± 0.5 | 30.2 ± 4 | 8 ± 0.5 | 0.66 ± 0.1 |
| 32.7 ± 0.5 | 32.7 ± 0.5 | 31 ± 0.5 | 30.2 ± 4 | 10 ± 0.5 | 0.53 ± 0.1 |
| 32.7 ± 0.5 | 32.7 ± 0.5 | 30 ± 0.5 | 47.3 ± 4 | 8 ± 0.5 | 0.37 ± 0.1 |
| 32.7 ± 0.5 | 32.7 ± 0.5 | 30 ± 0.5 | 38.3 ± 4 | 8 ± 0.5 | 0.51 ± 0.1 |
| 33.7 ± 0.5 | 33.7 ± 0.5 | 31 ± 0.5 | 40.8 ± 4 | 8 ± 0.5 | 0.44 ± 0.1 |
| 30.5 ± 0.5 | 35.5 ± 0.5 | 33.07 ± 0.5 | 41 ± 4 | 6.8 ± 0.5 | 0.57 ± 0.1 |
| 30.7 ± 0.5 | 34 ± 0.5 | 30 ± 0.5 | 36.8 ± 4 | 8 ± 0.5 | 0.57 ± 0.1 |
| 28.7 ± 0.5 | 36.7 ± 0.5 | 34 ± 0.5 | 38.4 ± 4 | 8 ± 0.5 | 0.55 ± 0.1 |
| 30.7 ± 0.5 | 34.7 ± 0.5 | 32 ± 0.5 | 38.3 ± 4 | 5.3 ± 0.5 | 0.81 ± 0.1 |
| 30.7 ± 0.5 | 34.7 ± 0.5 | 32 ± 0.5 | 38.3 ± 4 | 8 ± 0.5 | 0.53 ± 0.1 |
| 30.7 ± 0.5 | 34.7 ± 0.5 | 32 ± 0.5 | 38.3 ± 4 | 10 ± 0.5 | 0.43 ± 0.1 |
| 31.7 ± 0.5 | 33.7 ± 0.5 | 31 ± 0.5 | 38.3 ± 4 | 8 ± 0.5 | 0.52 ± 0.1 |
| 29.7 ± 0.5 | 35.7 ± 0.5 | 33 ± 0.5 | 38.3 ± 4 | 8 ± 0.5 | 0.54 ± 0.1 |

TABLE 2

| α(deg) | β(deg) | γ(deg) | h/H(%) | r/P | d/P(%) |
|---|---|---|---|---|---|
| 32.5 ± 0.5 | 33.2 ± 0.5 | 31 ± 0.5 | 48 ± 4 | 7.5 ± 0.5 | 0.38 ± 0.1 |
| 32.5 ± 0.5 | 33.2 ± 0.5 | 31 ± 0.5 | 48 ± 4 | 7.08 ± 0.5 | 0.41 ± 0.1 |
| 32.5 ± 0.5 | 33.2 ± 0.5 | 31 ± 0.5 | 48 ± 4 | 6.64 ± 0.5 | 0.43 ± 0.1 |
| 32.5 ± 0.5 | 33.2 ± 0.5 | 31 ± 0.5 | 30.3 ± 4 | 8 ± 0.5 | 0.66 ± 0.1 |
| 32.5 ± 0.5 | 33.2 ± 0.5 | 31 ± 0.5 | 48 ± 4 | 8 ± 0.5 | 0.36 ± 0.1 |
| 32.5 ± 0.5 | 33.7 ± 0.5 | 31 ± 0.5 | 39.3 ± 4 | 8 ± 0.5 | 0.49 ± 0.1 |
| 32.7 ± 0.5 | 33.7 ± 0.5 | 30 ± 0.5 | 39.5 ± 4 | 7.08 ± 0.5 | 0.55 ± 0.1 |
| 32.7 ± 0.5 | 33.7 ± 0.5 | 31 ± 0.5 | 39.5 ± 4 | 8 ± 0.5 | 0.48 ± 0.1 |
| 32.7 ± 0.5 | 33.7 ± 0.5 | 31 ± 0.5 | 30.8 ± 4 | 8 ± 0.5 | 0.64 ± 0.1 |
| 32.7 ± 0.5 | 32.7 ± 0.5 | 30 ± 0.5 | 38.3 ± 4 | 7.08 ± 0.5 | 0.58 ± 0.1 |
| 32.7 ± 0.5 | 32.7 ± 0.5 | 30 ± 0.5 | 47.3 ± 4 | 8 ± 0.5 | 0.37 ± 0.1 |
| 31.7 ± 0.5 | 33.7 ± 0.5 | 31 ± 0.5 | 38.3 ± 4 | 8 ± 0.5 | 0.52 ± 0.1 |
| 30.7 ± 0.5 | 34.7 ± 0.5 | 32 ± 0.5 | 38.3 ± 4 | 8 ± 0.5 | 0.53 ± 0.1 |
| 29.7 ± 0.5 | 35.7 ± 0.5 | 33 ± 0.5 | 38.3 ± 4 | 8 ± 0.5 | 0.54 ± 0.1 |
| 28.7 ± 0.5 | 36.7 ± 0.5 | 34 ± 0.5 | 38.4 ± 4 | 8 ± 0.5 | 0.55 ± 0.1 |

The shape of the second prism surface 45 is set, for example, in the following manner.

Specifically, there are set virtual elongated prisms I each having a triangular shape in section and composed of two virtual prism surfaces having inclination angles α and β. The inclination angles α and β of the two virtual prism surfaces I-1 and I-2 of the virtual elongated prism I are set in such a manner that peak outgoing light (inclination angle: a) of an intensity distribution in the XZ-plane of light arriving from the light outgoing surface 33 of the light guide 3 is incident upon the virtual elongated prism I and totally internally reflected by the virtual prism surface I-2, and then exits from the light exit surface 42 in a predetermined direction (preferably in the range of ±10 degrees relative to the normal of the light exit surface 42). Then, based on the shape of the virtual elongated prism I set in the foregoing manner, the shape of an actual elongated prism is determined in such a manner that part of at least the virtual prism surface I-2 is changed its form to a convex curved surface shape wherein a convex curved surface shaped portion 146 is set according to an inclination angle γ of a chord of the convex curved surface shape, a ratio (h/H) of a height (h) from the vertex portion of the elongated prism to the convex curved surface shaped portion 146 relative to a height (H) of the elongated prism, and a ratio (r/P) of a radius of curvature (r) of the convex curved surface shape relative to a pitch (P) of the elongated prisms, or a ratio (d/P) of a maximum distance (d) between the chord of the convex curved surface shaped portion 146 and the convex curved surface shaped portion 146 relative to the pitch (P) of the elongated prisms. Assuming that peak outgoing light (inclination angle: a) of a luminous intensity distribution of light emitted from the light outgoing surface 33 of the light guide 3 grazes the vertex portion of the adjacent elongated prism located on the side of the primary light source 1 so as to enter the virtual elongated prism I and that this peak outgoing light is set as virtual light, K2 indicated in FIG. 32 represents a position where this virtual light reaches the virtual prism surface I-2 after having passed through a position K1 of the virtual prism surface I-1.

For example, it is assumed that the light totally internally reflected at the position K2 of the virtual elongated prism I is caused to exit in the normal direction of the light exit surface 42. Then, at a Z-direction position where a dimension z (Z-direction distance between the vertex of the elongated prism and the internal reflection position K2 of the virtual prism surface I-2) shown in FIG. 32 is equal to or greater than a value given by the following equation (4):

$$z = \{(P \cdot \tan a \cdot \cot[\theta/2])/(\tan a + \cot[\theta/2])\} \cdot \quad (4)$$
$$[\cot[\theta/2] + (\cot\theta/(\cot[\theta/2] - \cot\theta))]$$

the actual prism surface is set to have an inclination angle greater than an inclination angle of the prism surface I-2 of the virtual elongated prism I given by the following equation (5):

$$n \cos [3\theta/2] = \sin (a - [\theta/2]) \quad (5)$$

(in the equation, n represents a refractive index of the elongated prism).

By setting the shape of each elongated prism of the light entrance surface 41 as described above, a distribution angle (full width half maximum) of light exiting from the light deflector 4 can be reduced. The reason thereof is as follows. Specifically, light arriving at a position located closer to the light exit surface 42 than the total internal reflection position K2 of the virtual prism surface I-2 in the virtual elongated prism I is a set of light rays that are incident from a side lower than the vertex portion of the adjacent virtual elongated prism on the side of the primary light source at inclination angles greater than a. Therefore, the direction of its distribution peak is a direction of inclination greater than a so that the direction of the distribution peak of totally internally reflected light thereof becomes a direction that is inclined from the normal direction of the light exit surface 42 toward a direction along the virtual prism surface of total internal reflection. Such light serves to broaden an anglular distribution of the outgoing light from the light exit surface 42. Therefore, by setting the inclination angle of the prism surface of the actual elongated prism to be greater than the inclination angle of the corresponding virtual prism surface at the position located closer to the light exit surface 42 than the total internal reflection position K2 of the virtual prism surface I-2 in the virtual elongated prism I so as to convergently emit the quantity of light in a particular direction, it is possible to correct an advance direction of the light actually reflected totally internally in this region to shift toward the normal direction of the light exit surface 42 as compared with the reflected light on the virtual prism surface to thereby achieve higher luminance and narrower visual field. In the present invention, by forming the convex curved surface shaped portion 146 from a position where the ratio (h/H) of the height (h) from the vertex portion of the elongated prism to the convex curved surface shaped portion 146 relative to the height (H) of the elongated prism becomes 25 to 60%, it is possible to achieve higher luminance and narrower visual field as described above. More preferably, h/H falls within the range of 30 to 56%, and further preferably 33 to 50%. This is because if h/H deviates from the range of 25 to 60%, reduction in luminance tends to be caused.

Herein, the inclination angle α of the first prism surface 44 is preferably set in the range of 28 to 34 degrees for avoiding reduction in luminance, more preferably 28.5 to 34 degrees, and further preferably 29.5 to 33.9 degrees. On the other hand, the inclination angle β of the second prism surface 45 is preferably set in the range of 32.5 to 37 degrees for avoiding reduction in luminance caused by large fluctuation of the peak angle of the outgoing light luminance distribution, more preferably 32.7 to 36 degrees, and further preferably 33 to 34.9 degrees.

Herein, with respect to the convex curved surface shaped portion 146, the ratio (r/P) of the radius of curvature (r) thereof relative to the pitch (P) of the elongated prisms is preferably set in the range of 5 to 11, more preferably 5.2 to 10.5, and further preferably 5.3 to 10. This is because, by setting r/P in this range, the full width half maximum of the outgoing light luminance distribution of the light exiting from the light exit surface 42 of the light deflector 4 can be sufficiently narrowed so that it is possible to sufficiently enhance the luminance of the light source device. For example, when the pitch of the elongated prisms is 40 to 60 μm, the radius of curvature r is preferably set in the range of 200 to 660 μm, more preferably 205 to 630 μm, and further preferably 210 to 600 μm.

Further, it is preferable that the convex curved surface shaped portion 146 be formed into a relatively gentle curved surface shape such that the ratio (d/P) of the maximum distance d between the chord of the convex curved surface shaped portion 146 and the convex curved surface shaped portion 146 relative to the pitch (P) of the elongated prisms falls within the range of 0.2 to 2%, more preferably 0.2 to 1.5%, and further preferably 0.25 to 1.1%. This is because when d/P exceeds 2%, there is a tendency that the light condensing effect by the light deflector 4 is spoiled to cause occurrence of divergence of light, and therefore, the full width half maximum of the outgoing light luminance distribution of the light exiting from the light exit surface 42 of the light deflector 4 cannot be sufficiently narrowed. Conversely, when d/P is less than 0.2%, there is a tendency that the light condensing effect by the light deflector 4 becomes insufficient, and therefore, the full width half maximum of the outgoing light luminance distribution of the light exiting from the light exit surface 42 of the light deflector 4 cannot be sufficiently narrowed.

A joining portion (boundary portion) between the substantially flat surface portion 47 and the convex curved surface shaped portion 146 on the second prism surface 45 may be designed in such a manner that the inclination of the convex curved surface shaped portion 146 and the inclination of the substantially flat surface portion 147 are equal to each other at that portion, i.e. both are smoothly joined together. On the other hand, if the angle (inclination angle γ), at the joining portion, between the normal of the elongated prism formed plane 43 and the flat plane (chord of the convex curved surface shaped portion) connecting between both end portions Q1 and Q2 of the convex curved surface shaped portion 146 is set in the range of 30 to 35 degrees, even when the inclination is discontinuous at the joining portion between the substantially flat surface portion 147 and the convex curved surface shaped portion 146, the excellent light deflector that does not cause deterioration in optical property can be obtained by adjusting the inclination angle β of the second prism surface and the ratio (r/P) of the radius of curvature (r) of the convex curved surface shape relative to the pitch (P) of the elongated prisms. Preferably, the inclination angle γ is set in the range of 30.4 to 35 degrees, and more preferably 30.8 to 35 degrees.

In the present invention, it is preferable that the prism surface having the foregoing convex curved surface shaped portion 146 be formed at at least the surface (the second prism surface 45) located on the side farther from the primary light source 1. In accordance therewith, it is possible to make sufficiently small a distribution angle of light exiting from the light deflector 4 when a primary light source is disposed also at the end surface 32 of the light guide 3. For example, when the ratio of light, propagating in the light guide 3, which is reflected by the end surface 32 on the side remote from the light incident surface 31 and returned, is relatively high, or when the primary light sources 1 are respectively disposed at the confronting two end surfaces of the light guide 3, it is more preferable that the prism surface (the first prism surface 44) on the side closer to the primary light source 1 be also formed into the same shape as the prism surface having the convex curved surface shaped portion 146. On the other hand, when the ratio of light, propagating in the light guide 3, which is reflected by the end surface 32 on the side remote from the light incident surface 31 and returned, is relatively low, the prism surface on the side closer to the primary light source 1 may be formed as a substantially flat surface. Since the light deflector 4 of the present invention is configured in such a manner that the vertex portion of each elongated prism is formed by two substantially flat surfaces, it is possible to more accurately form the shape of a shape transfer surface of a forming die member for elongated prism formation so that occurrence of a sticking phenomenon can be suppressed upon placing the light deflector 4 on the light guide 3.

In the light deflector of the present invention, a flat portion or a curved surface portion may be formed at the vertex portion of each elongated prism for the purpose of accurately producing a desired prism shape to achieve a stable optical performance and of suppressing abrasion or deformation of the prism vertex portion during assembling or during use of the surface light source device. In this case, in terms of suppressing reduction in luminance of the surface light source device and occurrence of a nonuniform pattern of luminance due to the sticking phenomenon, the width of the flat portion or the curved surface portion formed at the vertex portion of each elongated prism is preferably set to 3 μm or less, more preferably 2 μm or less, and further preferably 1 μm or less.

On the other hand, in the present invention, for the purpose of adjusting the viewing angle of the surface light source device and improving the quality, a light diffusion layer may be formed on the light exit surface side of the light deflector or a light diffusion agent may be contained in the elongated prisms. The light diffusion layer may be formed by placing a light diffusion element on the light exit surface side of the light deflector or may be formed integral with the light deflector on the light exit surface side. In this case, it is preferable that a light diffusion layer having an anisotropic diffusion property be formed to diffuse the light in a desired direction so as not to spoil as much as possible the luminance improving effect obtained owing to the visual field narrowing achieved by the light deflector. As the light diffusion agent dispersed in the elongated prisms, use can be made of transparent particles having a refractive index different from that of the elongated prisms. Also in this case, the content, particle size, refractive index, and the like of the light diffusion agent are selected so as not to spoil as much as possible the luminance improving effect obtained owing to the visual field narrowing achieved by the light deflector.

As described above, by placing the foregoing light deflector 4 on the light outgoing surface 33 of the light guide 3 with its elongated prism formed surface being located on the side of the light entrance surface, the outgoing light luminous intensity distribution in the XZ-plane of the directive outgoing light exiting from the light outgoing surface 33 of the light guide 3 can be further narrowed so that it is possible to achieve higher luminance and narrower visual field of the light source device. The full width half maximum of the outgoing light luminance distribution in the XZ-plane of the outgoing light from such a light deflector 4 preferably falls within the range of 5 to 25 degrees, more preferably 10 to 20 degrees, and further preferably 12 to 18 degrees. This is because difficulty in viewing an image or the like due to extreme narrowing of the visual field can be prevented by setting the full width half maximum of the outgoing light luminance distribution to 5 degrees or more, while higher luminance and narrower visual field can be achieved by setting it to 25 degrees or less.

Since the visual field narrowing of the light deflector 4 in the present invention is affected by a degree of spread (full width half maximum) of the outgoing light luminous intensity distribution (in the XZ-plane) of the light from the light outgoing surface 33 of the light guide 3, the ratio of a full width half maximum A of the outgoing light luminance distribution of the light from the light exit surface 42 of the light deflector 4 relative to a full width half maximum B of the outgoing light luminous intensity distribution of the light from the light outgoing surface 33 of the light guide 3 also changes depending on the full width half maximum B of the outgoing light luminous intensity distribution of the light from the light guide 3. For example, when the full width half maximum B of the outgoing light luminous intensity distribution of the light from the light guide 3 is less than 26 degrees, the full width half maximum A preferably falls within the range of 30 to 95% of the full width half maximum B, more preferably 30 to 80%, and further preferably 30 to 70%. On the other hand, when the full width half maximum B of the outgoing light luminous intensity distribution of the light from the light guide 3 is 26 degrees or more, the full width half maximum A preferably falls within the range of 30 to 80% of the full width half maximum B, more preferably 30 to 70%, and further preferably 30 to 60%. Particularly, when the full width half maximum B of the outgoing light luminous intensity distribution of the light from the light guide 3 is 26 to 36 degrees, the full width half maximum A preferably falls within the range of 30 to 80% of the full width half maximum B, more preferably 30 to 70%, and further preferably 30 to 60%. Further, when the full width half maximum B of the outgoing light luminous intensity distribution of the light from the light guide 3 exceeds 36 degrees, the full width half maximum A preferably falls within the range of 30 to 70% of the full width half maximum B, more preferably 30 to 60%, and further preferably 30 to 50%.

In general, it would be considered that when increasing the light emission efficiency of the light guide, the full width half maximum B of the outgoing light luminous intensity distribution from the light guide 3 increases so that the light condensing efficiency is lowered. However, the effect of visual field narrowing actually increases as described above. Therefore, it is preferable, in terms of efficiency of visual field narrowing and light utilization efficiency of the surface light source device, to use the light deflector in combination with the light guide wherein the full width half maximum B of the outgoing light luminous intensity distribution is 26 degrees or more, and more preferably in combination with the light guide wherein the full width half maximum B exceeds 36 degrees. On the other hand, although the effect of visual field narrowing is small when the full width half maximum of the outgoing light luminous intensity distribution of the light from the light guide 3 is small, since higher luminance can be achieved as the full width half maximum of the outgoing light luminous intensity distribution of the light from the light guide 3 decreases, it is preferable, in terms of achieving higher luminance, to use the light deflector in combination with the light guide wherein the full width half maximum B of the outgoing light luminous intensity distribution is less than 26 degrees.

When a point light source such as an LED light source is adjacently disposed at a corner or the like of a light guide 3 and used as a primary light source 1, light entering the light guide 3 is propagated in the light guide 3 substantially radially with respect to the primary light source 1 in the plane parallel to a light outgoing surface 33 so that outgoing light exits likewise radially from the light outgoing surface 33 with respect to the primary light source 1. In order to efficiently deflect such radially exiting outgoing light in a desired direction regardless of exiting directions thereof, it is preferable that elongated prisms formed on a light deflector 4 extend generally in arcs and be disposed parallel to each other so as to surround the primary light source 1. In this manner, by disposing the elongated prisms side by side generally in arcs so as to surround the primary light source 1, most of the light radially exiting from the light outgoing surface 33 is incident substantially in perpendicular to an extending direction of the elongated prisms of the light deflector 4, and therefore, the outgoing light can be efficiently oriented in a particular direction over the whole area of the light outgoing surface 33 of the light guide 3 so that uniformity in luminance can be improved. It is preferable that the generally arc-shaped elongated prisms formed on the light deflector 4 be configured in such a manner that the degree of the arc shape thereof is selected depending on a distribution of the light propagating in the light guide 3 so as to allow most of the light radially exiting from the light outgoing surface 33 to be incident substantially in perpendicular to the extending direction of the elongated prisms of the light deflector 4. Specifically, there can be cited such elongated prisms that are disposed parallel to each other so that radii of circular arcs thereof increase little by little like concentric circles substantially centering on the point light source such as the LED, wherein the range of radii of the elongated prisms is suitably determined based on a positional relationship between a position of the point light source and an effective area of the surface light source corresponding to a display area of a liquid crystal display element in the surface light source system and sizes thereof.

The light deflector 4 of the present invention can be made of a synthetic resin having a high light transmissivity like the one that has been described in connection with the foregoing embodiments of FIG. 1 and so forth.

By disposing the liquid crystal display element on the light-emitting surface (the light exit surface 42 of the light deflector 4) of the surface light source device comprising the primary light source 1, the light source reflector 2, the light guide 3, the light deflector 4, and the light reflector 5, there is formed a liquid crystal display device. The liquid crystal display device is observed by a viewer from above in FIG. 31 through the liquid crystal display element. Further, in the present invention, since the fully collimated light with a narrow distribution can be incident on the liquid crystal display element from the surface light source device, an image display excellent in uniformity of brightness and hue without gradation inversion or the like can be obtained at the liquid crystal display element, and further, light irradiation converging in a desired direction can be obtained, so that it is possible to enhance the utilization efficiency of the quantity of light emitted from the primary light source with respect to illumination of this direction.

The outgoing light of the light source device using the light deflector according to the present invention exhibits an asymmetric luminance distribution with respect to the peak position wherein, as going away from the peak position, the luminance rapidly decreases on the side of the primary light source while it decreases relatively gently on the side farther from the primary light source. For example, when the light source device having such an outgoing light luminance distribution is applied to a liquid crystal display device, requiring a relatively wide viewing angle, of a notebook personal computer or the like of about 10 inches or greater, it has been carried out to dispose a light diffuser having a relatively high light diffusion property on the light exit surface of the light deflector to thereby spread the outgoing light luminance distribution to broaden the viewing angle. When use is made of a light diffuser having a strong light diffusion property with a haze value of 50% or more, the peak angle of the outgoing light luminance distribution is deflected toward the side away from the primary light source by about 1 to 3 degrees. Therefore, when the peak angle of the outgoing light luminance distribution from the light deflector is located in the normal direction of the light exit surface thereof, the peak angle of the outgoing light luminance distribution is deflected toward the side away from the primary light source by about 1 to 3 degrees from the normal direction so that the luminance as observed from the normal direction is extremely lowered. This is because although the asymmetry of the outgoing light luminance distribution of the light exiting from the light deflector is somewhat relaxed by the use of the light diffuser, a portion of the outgoing light luminance distribution where the luminance is reduced relatively rapidly is located in the normal direction. In order to avoid such an extreme reduction in luminance, it is preferable that the peak angle of the outgoing light luminance distribution from the light deflector be inclined from the normal direction toward the primary light source side by 1 to 3 degrees in advance.

Hereinbelow, the present invention will be described concretely using examples.

Measurement of respective characteristic values in the following examples was implemented in the following manner.

Measurement of Normal Luminance, Full Width Half Maximum and Peak Angle

A cold-cathode tube was used as a primary light source, and DC12V was applied to an inverter (HIU-742A produced by Harison Corporation) of a drive circuit to light the cold-cathode tube at high frequency. The normal luminance was derived by determining 3×5-divided 15 square areas, each having a side of 20 mm, on the surface of a surface light source device or a light guide, and averaging 15 luminance values in the normal direction of the respective squares. With respect to measurement of the luminous intensity full width half maximum of the light guide, a black paper having a pinhole with a diameter of 4 mm was fixed to the surface of the light guide in such a manner that the pinhole is located at the center of the surface of the light guide, the distance was adjusted so that a measurement circle of a luminance meter became 8 to 9 mm, then an adjustment was carried out so that the rotation shaft of a goniometer was rotated about the pinhole in a perpendicular direction and a parallel direction relative to a longitudinal direction axis of the cold-cathode tube. While rotating the rotation shaft at intervals of one degree from +80 degrees to −80 degrees in the respective directions, a luminous intensity distribution (in the XZ-plane) of outgoing light was measured by the luminance meter to thereby derive a peak angle and a full width half maximum (a spread angle of a distribution (in the XZ-plane) of half or greater values relative to a peak value). With respect to measurement of the luminance full width half maximum of the surface light source device, the viewing angle of the luminance meter was set to 0.1 degrees, and an adjustment was implemented so that the rotation shaft of the goniometer was rotated with the center of a light-emitting surface of the surface light source device as a measurement position. While rotating the rotation shaft at intervals of one degree from +80 degrees to −80 degrees in the respective directions, a luminance distribution (in the XZ-plane) of outgoing light was measured by the luminance meter to thereby derive a peak luminance and a full width half maximum (a spread angle of a distribution (in the XZ-plane) of half or greater values relative to a peak value).

Measurement of Average Inclination Angle (θa)

Pursuant to ISO4287/1-1987, the surface roughness of a roughened surface was measured at a driving speed of 0.03 mm/sec by the use of a contact-stylus type surface roughness meter(Surfcom 570A produced by Tokyo Seiki K. K.) employing 010-2528 (1 μmR, 55° circular cone, diamond) as a stylus. From a chart obtained by this measurement, an inclination was corrected by subtracting an average line, and the average inclination angle was calculated according to the foregoing equations (1) and (2).

Measurement of Haze Value

From a whole light ray transmissivity (Tt) and a diffused light ray transmissivity (Td) obtained according to the method B of JIS K-7105 by using a sample of 50 mm×50 mm and an integrating sphere type reflection transmissivity meter (RT-100-Type produced by Murakami Color Research Laboratory), the haze value was calculated by the following equation (6).

$$\text{Haze Value (\%)} = Td/Tt \qquad (6)$$

Measurement of Full Width Half Maximum of Outgoing Light

Luminous Intensity Distribution of Light Diffuser

With respect to a sample of 50 mm×50 mm, measurement was carried out using an automatic variable angle photometer (GP-200-Type produced by Murakami Color Research Laboratory), and twice a half width half maximum angle that was a spread angle of a distribution of half or greater values relative to a derived peak luminous intensity was given as a full width half maximum angle (α). Light from the light source was condensed to the pinhole by a condenser lens, then formed into parallel light (degree of parallelization: ±0.5 or less) via a collimator lens, then was incident on an incident surface of the sample via a diaphragm (aperture diameter: 10.5 mm). The light transmitted through the sample passed through a light receiving lens (aperture diameter: 11.4 mm) (when the surface of the sample was smooth, the light was condensed to a position of a light-receiving diaphragm), then passed through the light-receiving diaphragm to reach a light-receiving element so as to be outputted as a voltage value. Then, the sample was rotated to carry out the same measurement, thereby deriving a maximum full width half maximum (Maxα) and a minimum full width half maximum (Minα).

EXAMPLE 1

Using an acrylic resin (Acrypet VH5#000 produced by Mitsubishi Rayon Co., Ltd.), a light guide having one surface in the form of a mat surface was prepared by injection molding. The light guide had a wedge-plate shape having a size of 216 mm×290 mm with thicknesses 2.0 mm–0.7 mm. On a mirror finished surface of this light guide was formed a prism layer made of an acrylic ultraviolet curing resin and having elongated prisms successively arrayed side by side at a pitch of 50 μm and with a prism vertical angle of 100 degrees and each extending in parallel to a side of 216 mm (short side) of the light guide. A cold-cathode tube was disposed along one side end surface (end surface on the side with the thickness 2.0 mm) corresponding to a side of 290 mm (long side) of the light guide, while the cold-cathode tube was covered with a light source reflector (silver reflection film produced by Reikosha). Further, light diffusion reflection films (E60 produced by Toray Industries, Inc.) were stuck to the other side end surfaces, and a reflection sheet was disposed on the surface (back surface) of elongated prism array. The foregoing structure was incorporated into a frame body. With respect to this light guide, the maximum peak angle of an outgoing light luminous intensity distribution (in the XZ-plane) in the plane perpendicular to both a light incident surface and a light outgoing surface was 70 degrees relative to the normal direction of the light outgoing surface, and the full width half maximum was 22.5 degrees.

On the other hand, using an acrylic ultraviolet curing resin having a refractive index of 1.5064, a prism sheet was prepared wherein an elongated prism formed surface was formed on one surface of a polyester film having a thickness of 125 μm. The elongated prism formed surface was formed with elongated prisms successively arrayed substantially parallel to each other at a pitch of 56.5 μm, wherein, as shown in Table 3, each elongated prism was composed of one prism surface (first prism surface) in the form of a flat surface whose angle (α) was 32.5 degrees relative to the normal, and the other prism surface (second prism surface) in the form of two convex curved surfaces (areas 1 and 2, in order from the side of the prism vertex portion), i.e. a convex curved surface (inclination angle=56.6 degrees, β=33.8 degrees) formed from the prism vertex portion to a height 21.4 μm of the elongated prism and having an oval shape in section (shape in the vicinity of a point of intersection with a minor axis of an oval shape having a radius of curvature of 400 μm at a point of intersection with a major axis and a radius of curvature of 800 μm at the point of intersection with the minor axis) and a convex curved surface (inclination angle=59.0 degrees) formed from and above the height of 21.4 μm of the elongated prism and having a circular-arc shape in section with a radius of curvature of 400 μm. A ratio (d/P) of a maximum distance (d) between the second prism surface of the prism sheet and a virtual flat plane for the second prism surface relative to the pitch (P) of the elongated prisms was 1.03%.

The obtained prism sheet was placed in such a manner that the elongated prism formed surface was oriented toward the light outgoing surface of the foregoing light guide, the prism ridgelines were parallel to the light incident surface of the light guide, and the first prism surface of each elongated prism was located on the side of a primary light source, thereby obtaining a surface light source device. There was derived an outgoing light luminance distribution (in the XZ-plane) in the plane perpendicular to both the light incident surface and the light outgoing surface of the surface light source device. Then, a peak luminance ratio using Comparative Example 1 as a reference, a peak angle, an angle (full width half maximum) exhibiting half a peak luminance, and an absolute value (|Δθa−Δθb|) of a difference between angles exhibiting half the peak luminance were measured, and the results thereof are shown in Table 4.

EXAMPLE 2

A prism sheet was prepared like in Example 1 except that, as shown in Table 3, a second prism surface of each elongated prism was formed by seven flat surfaces (areas 1, 2, ... 7, in order from the side of the prism vertex portion), i.e. a flat surface ($\beta$=34.8 degrees) formed from the prism vertex portion to a height 16 μm of the elongated prism and having an inclination angle of 55.2 degrees, and six flat surfaces of the same width formed from the height 16 μm of the elongated prism to the prism bottom portion in order of inclination angles of 55.5 degrees, 56.2 degrees, 57.0 degrees, 57.8 degrees, 58.4 degrees, and 59.4 degrees from the side closer to the prism vertex portion. A ratio (d/P) of a maximum distance (d) between the second prism surface of the prism sheet and a virtual flat plane for the second prism surface relative to the pitch (P) of the elongated prisms was 1.10%.

The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution (in the XZ-plane) in the plane perpendicular to both the light incident surface and the light outgoing surface of the surface light source device. Then, a peak luminance ratio using Comparative Example 1 as a reference, a peak angle, an angle (full width half maximum) exhibiting half a peak luminance, and an absolute value (|Δθa−Δθb|) of a difference between angles exhibiting half the peak luminance were measured, and the results thereof are shown in Table 4.

EXAMPLE 3

A prism sheet was prepared like in Example 1 except that, as shown in Table 3, a second prism surface of each elongated prism was formed by two flat surfaces and one convex curved surface (areas 1, 2, and 3, in order from the side of the prism vertex portion), i.e. a flat surface ($\beta$=33.6 degrees) formed from the prism vertex portion to a height 10.6 μm of the elongated prism and having an inclination angle of 56.4 degrees, a flat surface formed from the height 10.6 μm to a height 21.3 μm of the elongated prism and having an inclination angle of 56.8 degrees, and a convex curved surface (inclination angle=59.2 degrees) formed from and above the height 21.3 μm of the elongated prism and having a circular-arc shape in section with a radius of curvature of 400 μm. A ratio (d/P) of a maximum distance (d) between the second prism surface of the prism sheet and a virtual flat plane for the second prism surface relative to the pitch (P) of the elongated prisms was 1.03%.

The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution (in the XZ-plane) in the plane perpendicular to both the light incident surface and the light outgoing surface of the surface light source device. Then, a peak luminance ratio using Comparative Example 1 as a reference, a peak angle, an angle (full width half maximum) exhibiting half a peak luminance, and an absolute value (|Δθa−Δθb|) of a difference between angles exhibiting half the peak luminance were measured, and the results thereof are shown in Table 4.

EXAMPLE 4

A prism sheet was prepared like in Example 1 except that, as shown in Table 3, a second prism surface of each elongated prism was formed by two flat surfaces (areas 1 and 2, in order from the side of the prism vertex portion), i.e. a flat surface ($\beta$=33.2 degrees) formed from the prism vertex portion to a height 21.5 μm of the elongated prism and having an inclination angle of 56.8 degrees, and a flat surface formed from and above the height 21.5 μm of the elongated prism and having an inclination angle of 58.7 degrees. A ratio (d/P) of a maximum distance (d) between the second prism surface of the prism sheet and a virtual flat plane for the second prism surface relative to the pitch (P) of the elongated prisms was 0.76%.

The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution (in the XZ-plane) in the plane perpendicular to both the light incident surface and the light outgoing surface of the surface light source device. Then, a peak luminance ratio using Comparative Example 1 as a reference, a peak angle, an angle (full width half maximum) exhibiting half a peak luminance, and an absolute value (|Δθa−Δθb|) of a difference between angles exhibiting half the peak luminance were measured, and the results thereof are shown in Table 4.

EXAMPLE 5

A prism sheet was prepared like in Example 1 except that, as shown in Table 3, an angle ($\alpha$) formed between a first prism surface of each elongated prism and the normal was set to 29.0 degrees, and a second prism surface of each elongated prism was formed by eight flat surfaces (areas 1, 2, ... 8, in order from the side of the prism vertex portion), i.e. a flat surface ($\beta$=34.7 degrees) formed from the prism vertex portion to a height 16.0 μm of the elongated prism and having an inclination angle of 55.3 degrees, and seven flat surfaces of the same width formed from the height 16.0 μm of the elongated prism to the prism bottom portion in order of inclination angles of 55.7 degrees, 56.5 degrees, 57.4 degrees, 58.2 degrees, 59.0 degrees, 59.6 degrees, and 60.3 degrees from the side closer to the prism vertex portion. A ratio (d/P) of a maximum distance (d) between the second prism surface of the prism sheet and a virtual flat plane for the second prism surface relative to the pitch (P) of the elongated prisms was 0.73%.

The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution in the plane perpendicular to both the light incident surface and the light outgoing surface of the surface light source device. Then, a peak luminance ratio using Comparative Example 1 as a reference, a peak angle, an angle (full width half maximum) exhibiting half a peak luminance, and an absolute value (|Δθa−Δθb|) of a difference between angles exhibiting half the peak luminance were measured, and the results thereof are shown in Table 4.

EXAMPLE 6

A prism sheet was prepared like in Example 1 except that, as shown in Table 3, the seven areas from the height 16.0 μm of the elongated prism to the prism bottom portion in Example 5 were respectively formed by curved surfaces (inclination angles of the respective areas were 55.4 degrees, 56.2 degrees, 57.1 degrees, 57.9 degrees, 58.7 degrees, 59.3 degrees, and 60.0 degrees in order from the side closer to the prism vertex portion) passing respective boundaries therebetween. A ratio (d/P) of a maximum distance (d) between the second prism surface of the prism sheet and a virtual flat plane for the second prism surface relative to the pitch (P) of the elongated prisms was 0.68%.

The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution in the plane perpendicular to both the light incident surface and the light outgoing surface of the surface light source device. Then, a peak luminance ratio using Comparative Example 1 as a reference, a peak angle, an angle (full width half maximum) exhibiting half a peak luminance, and an absolute value (|Δθa−Δθb|) of a difference between angles exhibiting half the peak luminance were measured, and the results thereof are shown in Table 4.

EXAMPLE 7

A prism sheet was prepared like in Example 1 except that, as shown in Table 3, a first prism surface of each elongated prism was formed as a flat surface having an angle (α) of 15.0 degrees relative to the normal, and a second prism surface was formed by eleven flat surfaces (areas 1, 2, . . . 11, in order from the side of the prism vertex portion), i.e. a flat surface (β=38 degrees) formed from the prism vertex portion to a height 10.4 μm of the elongated prism and having an inclination angle of 52.0 degrees, and ten flat surfaces of the same width formed from the height 10.4 μm of the elongated prism to the prism bottom portion in order of inclination angles of 52.6 degrees, 52.8 degrees, 53.7 degrees, 54.5 degrees, 55.3 degrees, 56.1 degrees, 56.8 degrees, 57.5 degrees, 58.4 degrees, and 60.0 degrees from the side closer to the prism vertex portion. A ratio (d/P) of a maximum distance (d) between the second prism surface of the prism sheet and a virtual flat plane for the second prism surface relative to the pitch (P) of the elongated prisms was 1.48%.

The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution in the plane perpendicular to both the light incident surface and the light outgoing surface of the surface light source device. Then, a peak luminance ratio using Comparative Example 1 as a reference, a peak angle, an angle (full width half maximum) exhibiting half a peak luminance, and an absolute value (|Δθa−Δθb|) of a difference between angles exhibiting half the peak luminance were measured, and the results thereof are shown in Table 4.

EXAMPLE 8

A prism sheet was prepared like in Example 1 except that, as shown in Table 3, an angle (α) formed between a first prism surface of each elongated prism and the normal was set to 10.0 degrees, and a second prism surface was formed by eleven flat surfaces (areas 1, 2, . . . 11, in order from the side of the prism vertex portion), i.e. a flat surface (β=38.0 degrees) formed from the prism vertex portion to a height 11.5 μm of the elongated prism and having an inclination angle of 52.0 degrees, and ten flat surfaces of the same width formed from the height 11.5 μm of the elongated prism to the prism bottom portion in order of inclination angles of 52.6 degrees, 52.8 degrees, 53.7 degrees, 54.5 degrees, 55.3 degrees, 56.1 degrees, 56.8 degrees, 57.5 degrees, 58.4 degrees, and 60.0 degrees from the side closer to the prism vertex portion. A ratio (d/P) of a maximum distance (d) between the second prism surface of the prism sheet and a virtual flat plane for the second prism surface relative to the pitch (P) of the elongated prisms was 1.64%.

The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution in the plane perpendicular to both the light incident surface and the light outgoing surface of the surface light source device. Then, a peak luminance ratio using Comparative Example 1 as a reference, a peak angle, an angle (full width half maximum) exhibiting half a peak luminance, and an absolute value (|Δθa−Δθb|) of a difference between angles exhibiting half the peak luminance were measured, and the results thereof are shown in Table 4.

EXAMPLE 9

A prism sheet was prepared like in Example 1 except that, as shown in Table 3, an angle (α) formed between a first prism surface of each elongated prism and the normal was set to 5 degrees, and a second prism surface was formed by eleven flat surfaces (areas 1, 2, . . . 11, in order from the side of the prism vertex portion), i.e. a flat surface (β=38 degrees) formed from the prism vertex portion to a height 12.9 μm of the elongated prism and having an inclination angle of 52.0 degrees, and ten flat surfaces of the same width formed from the height 12.9 μm of the elongated prism to the prism bottom portion in order of inclination angles of 52.6 degrees, 52.8 degrees, 53.7 degrees, 54.5 degrees, 55.3 degrees, 56.1 degrees, 56.8 degrees, 57.5 degrees, 58.4 degrees, and 60.0 degrees from the side closer to the prism vertex portion. A ratio (d/P) of a maximum distance (d) between the second prism surface of the prism sheet and a virtual flat plane for the second prism surface relative to the pitch (P) of the elongated prisms was 1.83%.

The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution in the plane perpendicular to both the light incident surface and the light outgoing surface of the surface light source device. Then, a peak luminance ratio using Comparative Example 1 as a reference, a peak angle, an angle (full width half maximum) exhibiting half a peak luminance, and an absolute value ($|\Delta\theta a - \Delta\theta b|$) of a difference between angles exhibiting half the peak luminance were measured, and the results thereof are shown in Table 4.

EXAMPLE 10

A prism sheet was prepared like in Example 1 except that, as shown in Table 3, an angle ($\alpha$) formed between a first prism surface of each elongated prism and the normal was set to 0.1 degrees, and a second prism surface was formed by eleven flat surfaces (areas 1, 2, ... 11, in order from the side of the prism vertex portion), i.e. a flat surface ($\beta$=38 degrees) formed from the prism vertex portion to a height 14.5 μm of the elongated prism and having an inclination angle of 52.0 degrees, and ten flat surfaces of the same width formed from the height 14.5 μm of the elongated prism to the prism bottom portion in order of inclination angles of 52.6 degrees, 52.8 degrees, 53.7 degrees, 54.5 degrees, 55.3 degrees, 56.1 degrees, 56.8 degrees, 57.5 degrees, 58.4 degrees, and 60.0 degrees from the side closer to the prism vertex portion. A ratio (d/P) of a maximum distance (d) between the second prism surface of the prism sheet and a virtual flat plane for the second prism surface relative to the pitch (P) of the elongated prisms was 2.06%.

The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution in the plane perpendicular to both the light incident surface and the light outgoing surface of the surface light source device. Then, a peak luminance ratio using Comparative Example 1 as a reference, a peak angle, an angle (full width half maximum) exhibiting half a peak luminance, and an absolute value ($|\Delta\theta a - \Delta\theta b|$) of a difference between angles exhibiting half the peak luminance were measured, and the results thereof are shown in Table 4.

COMPARATIVE EXAMPLE 1

A surface light source device was obtained like in Example 1 except that each elongated prism of a prism sheet had two prism surfaces each in the form of a flat surface and was formed into an isosceles triangle in section ($\alpha=\beta$=32.7 degrees) with a prism vertical angle of 65.4 degrees. There was derived an outgoing light luminance distribution (in the XZ-plane) in the plane perpendicular to both the light incident surface and the light outgoing surface of the surface light source device, and a peak luminance thereof was set to 1.00. Then, a peak angle, an angle (full width half maximum) exhibiting half the peak luminance, and an absolute value ($|\Delta\theta a - \Delta\theta b|$) of a difference between angles exhibiting half the peak luminance were measured, and the results thereof are shown in Table 4.

TABLE 3

| | Prism Vertical Angle(°) | | Inclination Angle of Flat Surface or Convex Curved Surface(°) | | | | | | | | | | |
|---|---|---|---|---|---|---|---|---|---|---|---|---|---|
| | α | β | Area 1 | | Area 2 | | Area 3 | | Area 4 | | Area 5 | | Area 6 | |
| Ex. 1 | 32.5 | 33.8 | C | 56.6 | C | 59.0 | — | — | — | — | — | — | — | — |
| Ex. 2 | 32.5 | 34.8 | F | 55.2 | F | 55.5 | F | 56.2 | F | 57.0 | F | 57.8 | F | 58.4 |
| Ex. 3 | 32.5 | 33.6 | F | 56.4 | F | 56.8 | C | 59.2 | — | — | — | — | — | — |
| Ex. 4 | 32.5 | 33.2 | F | 56.8 | F | 58.7 | — | — | — | — | — | — | — | — |
| Ex. 5 | 29.0 | 34.7 | F | 55.3 | F | 55.7 | F | 56.5 | F | 57.4 | F | 58.2 | F | 59.0 |
| Ex. 6 | 29.0 | 34.7 | F | 55.3 | C | 55.4 | C | 56.2 | C | 57.1 | C | 57.9 | C | 58.7 |
| Ex. 7 | 15.0 | 38.0 | F | 52.0 | F | 52.6 | F | 52.8 | F | 53.7 | F | 54.5 | F | 55.3 |
| Ex. 8 | 10.0 | 38.0 | F | 52.0 | F | 52.6 | F | 52.8 | F | 53.7 | F | 54.5 | F | 55.3 |
| Ex. 9 | 5.0 | 38.0 | F | 52.0 | F | 52.6 | F | 52.8 | F | 53.7 | F | 54.5 | F | 55.3 |
| Ex. 10 | 0.1 | 38.0 | F | 52.0 | F | 52.6 | F | 52.8 | F | 53.7 | F | 54.5 | F | 55.3 |
| Com. Ex. 1 | 32.7 | 32.7 | — | — | — | — | — | — | — | — | — | — | — | — |

| | Inclination Angle of Flat Surface or Convex Curved Surface(°) | | | | | | | | | | d/P (%) |
|---|---|---|---|---|---|---|---|---|---|---|---|
| | Area 7 | | Area 8 | | Area 9 | | Area 10 | | Area 11 | | |
| Ex. 1 | — | — | — | — | — | — | — | — | — | — | 1.03 |
| Ex. 2 | F | 59.4 | — | — | — | — | — | — | — | — | 1.10 |
| Ex. 3 | — | — | — | — | — | — | — | — | — | — | 1.03 |
| Ex. 4 | — | — | — | — | — | — | — | — | — | — | 0.76 |
| Ex. 5 | F | 59.6 | F | 60.3 | — | — | — | — | — | — | 0.73 |
| Ex. 6 | C | 59.3 | C | 60.0 | — | — | — | — | — | — | 0.68 |
| Ex. 7 | F | 56.1 | F | 56.8 | F | 57.5 | F | 58.4 | F | 60.0 | 1.48 |
| Ex. 8 | F | 56.1 | F | 56.8 | F | 57.5 | F | 58.4 | F | 60.0 | 1.64 |
| Ex. 9 | F | 56.1 | F | 56.8 | F | 57.5 | F | 58.4 | F | 60.0 | 1.83 |
| Ex. 10 | F | 56.1 | F | 56.8 | F | 57.5 | F | 58.4 | F | 60.0 | 2.06 |

TABLE 3-continued

| 10 Com. Ex. 1 | — | — | — | — | — | — | — | — | — | — |

F: Flat Surface
C: Convex Curved Surface

TABLE 4

| | $|\Delta\theta_a - \Delta\theta_b|$ (°) | L2/L1 | L2/P | Peak Luminance Ratio | Peak Angle (°) |
|---|---|---|---|---|---|
| Ex. 1 | 4.7 | 1.00 | 0.93 | 1.53 | −3 |
| Ex. 2 | 5.7 | 1.00 | 0.93 | 1.50 | 0 |
| Ex. 3 | 4.6 | 1.00 | 0.93 | 1.54 | −3 |
| Ex. 4 | 4.1 | 1.00 | 0.93 | 1.23 | −3 |
| Ex. 5 | 6.3 | 1.04 | 0.99 | 1.55 | −2 |
| Ex. 6 | 7.2 | 1.04 | 0.99 | 1.50 | −3 |
| Ex. 7 | 2.1 | 1.17 | 1.28 | 1.59 | −1 |
| Ex. 8 | 2.4 | 1.19 | 1.41 | 1.66 | −2 |
| Ex. 9 | 5.6 | 1.21 | 1.58 | 1.79 | −2 |
| Ex. 10 | 0.2 | 1.21 | 1.78 | 1.43 | −3 |
| Com. Ex. 1 | 0.8 | 1.00 | 0.93 | 1.00 | 0 |

EXAMPLES 11 to 22

A prism sheet was prepared like in Example 1 except that a second prism surface of each elongated prism was formed by three flat surfaces (areas 1, 2, and 3, in order from the side of the prism vertex portion) having inclination angles and division heights as shown in Table 5. The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution (in the XZ-plane) in the plane perpendicular to both the light incident surface and the light outgoing surface of the surface light source device. Then, a peak luminance ratio using Comparative Example 1 as a reference, a peak angle, an angle (full width half maximum) exhibiting half a peak luminance, and an absolute value ($|\Delta\theta a-\Delta\theta b|$) of a difference between angles exhibiting half the peak luminance were measured, and the results thereof are shown in Table 5.

COMPARATIVE EXAMPLE 2

A prism sheet was prepared like in Example 1 except that the whole of a second prism surface of each elongated prism was formed as a convex curved surface (inclination angle=57.3 degrees, β=36.3 degrees) having a circular-arc shape in section with a radius of curvature of 452 μm. The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution (in the XZ-plane) in the plane perpendicular to both the light incident surface and the light outgoing surface of the surface light source device. Then, a peak luminance ratio using Comparative Example 1 as a reference, a peak angle, an angle (full width half maximum) exhibiting half a peak luminance, and an absolute value ($|\Delta\theta a-\Delta\theta b|$) of a difference between angles exhibiting half the peak luminance were measured, and the results thereof are shown in Table 5.

TABLE 5

| | Prism Vertical Angle(°) | | Height of Flat Surface(μm) | | Inclination Angle of Flat or Convex Curved Surface(°) | | | d/P (%) | $|\Delta\theta_a - \Delta\theta_b|$ (°) | L2/L1 | L2/P | Peak Luminance Ratio | Peak Angle (°) |
|---|---|---|---|---|---|---|---|---|---|---|---|---|---|
| | α | β | Area 1 | Area 2 | Area 1 | Area 2 | Area 3 | | | | | | |
| Ex. 11 | 32.5 | 33.2 | 0–21.5 | 21.5–32.7 | 56.8 | 58.0 | 59.9 | 0.90 | 1.2 | 1.00 | 0.93 | 1.34 | −1 |
| Ex. 12 | 32.7 | 32.7 | 0–17.4 | 17.4–30.4 | 57.3 | 58.8 | 61.1 | 1.05 | 1.6 | 0.98 | 0.94 | 1.37 | −4 |
| Ex. 13 | 32.5 | 33.7 | 0–17.6 | 17.6–30.6 | 56.3 | 58.0 | 60.0 | 1.06 | 3.2 | 1.00 | 0.93 | 1.39 | −2 |
| Ex. 14 | 32.7 | 32.7 | 0–13.6 | 13.6–28.6 | 57.3 | 57.8 | 60.1 | 1.55 | 0.5 | 0.99 | 0.93 | 1.29 | −2 |
| Ex. 15 | 32.7 | 32.7 | 0–17.4 | 17.4–30.8 | 57.3 | 58.9 | 61.0 | 1.05 | 3.5 | 0.98 | 0.94 | 1.37 | −5 |
| Ex. 16 | 30.7 | 34.7 | 0–17.4 | 17.4–30.8 | 55.3 | 56.9 | 59.0 | 1.09 | 3.5 | 1.03 | 0.96 | 1.38 | 0 |
| Ex. 17 | 31.7 | 33.7 | 0–17.4 | 17.4–30.8 | 56.3 | 57.9 | 60.0 | 1.07 | 2.7 | 1.00 | 0.95 | 1.37 | −2 |
| Ex. 18 | 29.7 | 35.7 | 0–17.4 | 17.4–30.8 | 54.3 | 55.9 | 58.0 | 1.22 | 2.5 | 1.05 | 0.97 | 1.38 | 3 |
| Ex. 19 | 28.7 | 36.7 | 0–17.4 | 17.4–30.8 | 53.3 | 54.9 | 56.8 | 1.10 | 3.3 | 1.07 | 0.98 | 1.38 | 5 |
| Ex. 20 | 27.7 | 37.7 | 0–17.4 | 17.4–28.0 | 52.3 | 53.7 | 55.8 | 1.11 | 4.3 | 1.10 | 0.99 | 1.36 | 7 |
| Ex. 21 | 33.7 | 33.7 | 0–17.8 | 17.8–39.4 | 56.3 | 59.0 | 60.9 | 1.44 | 4.8 | 0.98 | 0.92 | 1.40 | −4 |
| Ex. 22 | 30.5 | 35.5 | 0–18.3 | 18.3–30.9 | 54.5 | 55.7 | 58.1 | 0.99 | 4.3 | 1.04 | 0.95 | 1.36 | 3 |
| Com. Ex. 2 | 32.7 | 36.3 | — | — | | 57.3 | | 0.93 | 5.1 | 1.00 | 0.93 | 1.48 | −2 |

EXAMPLES 23 to 34

Using an acrylic resin (Acrypet VH5#000 produced by Mitsubishi Rayon Co., Ltd.), a light guide having one surface in the form of a mat surface was prepared by injection molding. The light guide had a wedge-plate shape having a size of 230 mm×310 mm with thicknesses 3.5 mm–1.2 mm. On a mirror finished surface of this light guide was formed a prism layer made of an acrylic ultraviolet curing resin and having elongated prisms successively arrayed substantially parallel to each other at a pitch of 50 µm and with a prism vertical angle of 100 degrees and each extending in parallel to a side of 230 mm (short side) of the light guide. A cold-cathode tube was disposed along one side end surface (end surface on the side with the thickness 3.5 mm) corresponding to a side of 310 mm (long side) of the light guide, while the cold-cathode tube was covered with a light source reflector (silver reflection film produced by Reikosha). Further, light diffusion reflection films (E60 produced by Toray Industries, Inc.) were stuck to the other side end surfaces, and a reflection sheet was disposed on the surface (back surface) of elongated prism array. The foregoing structure was incorporated into a frame body. With respect to this light guide, the maximum peak angle of an outgoing light luminous intensity distribution (in the XZ-plane) in the plane perpendicular to both a light incident surface and a light outgoing surface was 70 degrees relative to the normal direction of the light outgoing surface, and the full width half maximum was 33 degrees.

On the other hand, a prism sheet was prepared like in Example 1 except that a second prism surface of each elongated prism was formed by three flat surfaces (areas 1, 2, and 3, in order from the side of the prism vertex portion) having inclination angles and division heights as shown in Table 6.

The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution (in the XZ-plane) in the plane perpendicular to both the light incident surface and the light outgoing surface of the surface light source device. Then, a peak luminance ratio using Comparative Example 4 as a reference, a peak angle, an angle (full width half maximum) exhibiting half a peak luminance, and an absolute value ($|\Delta\theta_a - \Delta\theta_b|$) of a difference between angles exhibiting half the peak luminance were measured, and the results thereof are shown in Table 6.

COMPARATIVE EXAMPLE 3

A surface light source device was obtained like in Examples 23 to 34 except that the prism sheet of Comparative Example 2 was used. There was derived an outgoing light luminance distribution (in the XZ-plane) in the plane perpendicular to both the light incident surface and the light outgoing surface of the surface light source device. Then, a peak luminance ratio using Comparative Example 4 as a reference, a peak angle, an angle (full width half maximum) exhibiting half a peak luminance, and an absolute value ($|\Delta\theta_a - \Delta\theta_b|$) of a difference between angles exhibiting half the peak luminance were measured, and the results thereof are shown in Table 6.

COMPARATIVE EXAMPLE 4

A surface light source device was obtained like in Examples 23 to 34 except that the prism sheet of Comparative Example 1 was used. There was derived an outgoing light luminance distribution (in the XZ-plane) in the plane perpendicular to both the light incident surface and the light outgoing surface of the surface light source device, and a peak luminance thereof was set to 1.00. Then, a peak angle, an angle (full width half maximum) exhibiting half the peak luminance, and an absolute value ($|\Delta\theta_a - \Delta\theta_b|$) of a difference between angles exhibiting half the peak luminance were measured, and the results thereof are shown in Table 6.

TABLE 6

| | Prism Vertical Angle(°) | | Height of Flat Surface(µm) | | Inclination Angle of Flat or Convex Curved Surface(°) | | | d/P | $|\Delta\theta_a - \Delta\theta_b|$ | | | Peak Luminance | Peak |
| | α | β | Area 1 | Area 2 | Area 1 | Area 2 | Area 3 | (%) | (°) | L2/L1 | L2/P | Ratio | Angle (°) |
|---|---|---|---|---|---|---|---|---|---|---|---|---|---|
| Ex. 23 | 32.5 | 33.2 | 0–21.5 | 21.5–32.7 | 56.8 | 58.0 | 59.9 | 0.90 | 0.1 | 1.00 | 0.93 | 1.36 | −1 |
| Ex. 24 | 32.7 | 32.7 | 0–17.4 | 17.4–30.4 | 57.3 | 58.8 | 61.1 | 1.05 | 1.1 | 0.98 | 0.94 | 1.39 | −4 |
| Ex. 25 | 32.5 | 33.7 | 0–17.6 | 17.6–30.6 | 56.3 | 58.0 | 60.0 | 1.06 | 2 | 1.00 | 0.93 | 1.38 | −2 |
| Ex. 26 | 32.7 | 32.7 | 0–13.6 | 13.6–28.6 | 57.3 | 57.8 | 60.1 | 1.55 | 1.5 | 0.99 | 0.93 | 1.32 | −2 |
| Ex. 27 | 32.7 | 32.7 | 0–17.4 | 17.4–30.8 | 57.3 | 58.9 | 61.0 | 1.05 | 0.1 | 0.98 | 0.94 | 1.38 | −4 |
| Ex. 28 | 30.7 | 34.7 | 0–17.4 | 17.4–30.8 | 55.3 | 56.9 | 59.0 | 1.09 | 0.2 | 1.03 | 0.96 | 1.39 | 1 |
| Ex. 29 | 31.7 | 33.7 | 0–17.4 | 17.4–30.8 | 56.3 | 57.9 | 60.0 | 1.07 | 1.1 | 1.00 | 0.95 | 1.38 | −2 |
| Ex. 30 | 29.7 | 35.7 | 0–17.4 | 17.4–30.8 | 54.3 | 55.9 | 58.0 | 1.22 | 1.1 | 1.05 | 0.97 | 1.38 | 3 |
| Ex. 31 | 28.7 | 36.7 | 0–17.4 | 17.4–30.8 | 53.3 | 54.9 | 56.8 | 1.10 | 1.2 | 1.07 | 0.98 | 1.38 | 5 |
| Ex. 32 | 27.7 | 37.7 | 0–17.4 | 17.4–28.0 | 52.3 | 53.7 | 55.8 | 1.11 | 2.3 | 1.10 | 0.99 | 1.37 | 8 |
| Ex. 33 | 33.7 | 33.7 | 0–17.8 | 17.8–39.4 | 56.3 | 59.0 | 60.9 | 1.44 | 2.8 | 0.98 | 0.92 | 1.35 | −4 |
| Ex. 34 | 30.5 | 35.5 | 0–18.3 | 18.3–30.9 | 54.5 | 55.7 | 58.1 | 0.99 | 1.9 | 1.04 | 0.95 | 1.36 | 3 |
| Com. Ex. 3 | 32.7 | 36.3 | — | — | 57.3 | | | 0.93 | 9.5 | 1.00 | 0.93 | 1.39 | −2 |
| Com. Ex. 4 | 32.7 | 32.7 | — | — | 32.7 | | | — | 5.0 | 1.00 | 0.93 | 1.00 | 0 |

EXAMPLES 35 to 39

A prism sheet was prepared like in Example 1 except that an angle (α) formed between one prism surface (first prism surface) of each elongated prism and the normal, and an allocated angle (β) on the side of the other prism surface (second prism surface) were set to those as shown in Table 7, and the second prism surface was formed by two flat surfaces (areas 1 and 2, in order from the side of the prism vertex portion) having inclination angles and division heights as shown in Table 7. The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution (in the XZ-plane) in the plane perpendicular to both the light incident surface and the light outgoing surface of the surface light source device. Then, a peak luminance ratio using Comparative Example 5 as a reference, a peak angle, an angle (full width half maximum) exhibiting half a peak luminance, and an absolute value ($|\Delta\theta a-\Delta\theta b|$) of a difference between angles exhibiting half the peak luminance were measured, and the results thereof are shown in Table 7.

COMPARATIVE EXAMPLE 5

A prism sheet was prepared like in Example 1 except that the whole of a second prism surface of each elongated prism was formed as a flat surface having an inclination angle of 55.0 degrees ($\beta$=35.0 degrees). The obtained prism sheet was placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution (in the XZ-plane) in the plane perpendicular to both the light incident surface and the light outgoing surface of the surface light source device, and a peak luminance thereof was set to 1.00. Then, a peak angle, an angle (full width half maximum) exhibiting half the peak luminance, and an absolute value ($|\Delta\theta a-\Delta\theta b|$) of a difference between angles exhibiting half the peak luminance were measured, and the results thereof are shown in Table 7.

placed in such a manner that the elongated prism formed surface was oriented toward the light outgoing surface of the light guide in Example 1, the prism ridgelines were parallel to the light incident surface of the light guide, and the first prism surface of each elongated prism was located on the side of a primary light source, thereby obtaining a surface light source device. There was derived an outgoing light luminance distribution (in the XZ-plane) in the plane perpendicular to both the light incident surface and the light outgoing surface of the surface light source device. Then, a peak luminance ratio using Comparative Example 6 as a reference, a peak angle, an angle (full width half maximum) exhibiting half a peak luminance, and an absolute value ($|\Delta\theta a-\Delta\theta b|$) of a difference between angles exhibiting half the peak luminance were measured, and the results thereof are shown in Table 8.

COMPARATIVE EXAMPLE 6

A prism sheet was prepared like in Example 1 except that the whole of a second prism surface of each elongated prism was formed as a flat surface having an inclination angle of 55.0 degrees ($\beta$=35.0 degrees). The obtained prism sheet was placed in such a manner that the elongated prism formed surface was oriented toward the light outgoing surface of the light guide in Examples 23 to 34, the prism ridgelines were parallel to the light incident surface of the light guide, and

TABLE 7

| | Prism Vertical Angle(°) | | Height of Flat Surface(μm) | | Inclination Angle of Flat or Convex Curved Surface (°) | | d/P | $|\Delta\theta_a - \Delta\theta_b|$ | | | Peak Luminance | Peak |
|---|---|---|---|---|---|---|---|---|---|---|---|---|
| | α | β | Area 1 | Area 2 | Area 1 | Area 2 | (%) | (°) | L2/L1 | L2/P | Ratio | Angle (°) |
| Ex. 35 | 15.0 | 35.0 | 0–18.6 | 18.6–60.5 | 55.0 | 57.0 | 0.97 | 7.2 | 1.16 | 1.29 | 1.20 | −7 |
| Ex. 36 | 15.0 | 35.0 | 0–18.6 | 18.6–59.4 | 55.0 | 56.0 | 0.48 | 3.2 | 1.17 | 1.27 | 1.11 | −4 |
| Ex. 37 | 15.0 | 36.0 | 0–18.8 | 18.8–58.9 | 54.0 | 56.0 | 0.97 | 5.3 | 1.17 | 1.27 | 1.22 | −3 |
| Ex. 38 | 15.0 | 37.0 | 0–19.0 | 19.0–57.3 | 53.0 | 55.0 | 0.97 | 5.2 | 1.19 | 1.25 | 1.22 | 0 |
| Ex. 39 | 51.0 | 35.0 | 0–15.1 | 15.1–60.8 | 55.0 | 57.0 | 0.85 | 3.5 | 1.16 | 1.29 | 1.17 | −6 |
| Com. Ex. 5 | 15.0 | 35.0 | — | — | 55.0 | | — | 0.9 | 1.18 | 1.26 | 1.00 | −2 |

EXAMPLES 40 to 44

A prism sheet was prepared like in Examples 23 to 34 except that an angle (a) formed between one prism surface (first prism surface) of each elongated prism and the normal, and an allocated angle (β) on the side of the other prism surface (second prism surface) were set to those as shown in Table 8, and the second prism surface was formed by two flat surfaces (areas 1 and 2, in order from the side of the prism vertex portion) having inclination angles and division heights as shown in Table 8. The obtained prism sheet was the first prism surface of each elongated prism was located on the side of a primary light source, thereby obtaining a surface light source device. There was derived an outgoing light luminance distribution (in the XZ-plane) in the plane perpendicular to both the light incident surface and the light outgoing surface of the surface light source device, and a peak luminance thereof was set to 1.00. Then, a peak angle, an angle (full width half maximum) exhibiting half the peak luminance, and an absolute value ($|\Delta\theta a-\Delta\theta b|$) of a difference between angles exhibiting half the peak luminance were measured, and the results thereof are shown in Table 8.

TABLE 8

| | Prism Vertical Angle(°) | | Height of Flat Surface(μm) | | Inclination Angle of Flat or Convex Curved Surface (°) | | d/P | |Δθ_a − Δθ_b| | | | Peak Luminance | Peak |
|---|---|---|---|---|---|---|---|---|---|---|---|---|
| | α | β | Area 1 | Area 2 | Area 1 | Area 2 | (%) | (°) | L2/L1 | L2/P | Ratio | Angle (°) |
| Ex. 40 | 15.0 | 35.0 | 0–18.6 | 18.6–60.5 | 55.0 | 57.0 | 0.97 | 8.1 | 1.16 | 1.29 | 1.20 | −4 |
| Ex. 41 | 15.0 | 35.0 | 0–18.6 | 18.6–59.4 | 55.0 | 56.0 | 0.48 | 9.3 | 1.17 | 1.27 | 1.10 | −3 |
| Ex. 42 | 15.0 | 36.0 | 0–18.8 | 18.8–58.9 | 54.0 | 56.0 | 0.97 | 9.8 | 1.17 | 1.27 | 1.20 | −2 |
| Ex. 43 | 15.0 | 37.0 | 0–19.0 | 19.0–57.3 | 53.0 | 55.0 | 0.97 | 8.3 | 1.19 | 1.25 | 1.20 | 1 |
| Ex. 44 | 51.0 | 35.0 | 0–15.1 | 15.1–60.8 | 55.0 | 57.0 | 0.85 | 9.2 | 1.16 | 1.29 | 1.15 | −5 |
| Com. Ex. 6 | 15.0 | 35.0 | — | — | 55.0 | | — | 9.6 | 1.18 | 1.26 | 1.00 | −2 |

EXAMPLE 45

In the surface light source device of Example 1, a light diffuser having one surface in the form of a mat surface with an average inclination angle of 7.27 degrees and the other surface in the form of a mat surface with an average inclination angle of 0.7 degrees and exhibiting an outgoing light luminous intensity distribution (in the XZ-plane) with a full width half maximum of 9.4 degrees was placed on the light exit surface of the light deflector in such a manner that the mat surface with the average inclination angle of 7.27 degrees was oriented toward the light deflector, thereby obtaining a surface light source device. In Table 9 are shown the results of a peak luminance ratio in an outgoing light luminance distribution (in the XZ-plane) of the produced surface light source device using Comparative Example 5 as a reference, a full width half maximum of the luminance distribution, and an evaluation of quality confirmed by visual observation in the surface light source device.

EXAMPLE 46

A surface light source device was obtained like in Example 1 except that a light diffuser having one surface in the form of a mat surface with an average inclination angle of 5.0 degrees and the other surface in the form of a mat surface with an average inclination angle of 0.7 degrees and exhibiting an outgoing light luminous intensity distribution (in the XZ-plane) with a full width half maximum of 6 degrees was placed on the light exit surface of the light deflector in such a manner that the mat surface with the average inclination angle of 5.0 degrees was oriented toward the light deflector. In Table 9 are shown the results of a peak luminance ratio in an outgoing light luminance distribution (in the XZ-plane) of the produced surface light source device using Comparative Example 5 as a reference, a full width half maximum of the luminance distribution, and an evaluation of quality confirmed by visual observation in the surface light source device.

EXAMPLE 47

A surface light source device was obtained like in Example 1 except that a light diffuser wherein a polyester film having a thickness of 125 μm had one surface formed with a lens array structure in which a number of elongated lenticular lenses were successively arrayed substantially parallel to each other at a pitch of 30 μm, the surface of the elongated lenticular lenses was roughened to an average inclination angle of 1 degree, a maximum average inclination angle was 10.4 degrees, and maximum average inclination angle/minimum average inclination angle was 10.4, and the other surface formed with a mat surface having an average inclination angle of 0.7 degrees, and the full width half maximum of an outgoing light luminous intensity distribution (in the XZ-plane) was 11.2 degrees, was placed in such a manner that the elongated lenticular lenses were in parallel to the elongated prisms of the light deflector and the surface of the lens array structure was oriented toward the light deflector. In Table 9 are shown the results of a peak luminance ratio in an outgoing light luminance distribution (in the XZ-plane) of the produced surface light source device using Comparative Example 5 as a reference, a full width half maximum of the luminance distribution, and an evaluation of quality confirmed by visual observation in the surface light source device.

EXAMPLE 48

A surface light source device was obtained like in Example 1 except that a light diffuser wherein a polyester film having a thickness of 125 μm had one surface formed with hairlines having a maximum average inclination angle of 8.2 degrees, and the other surface formed with a mat surface having an average inclination angle of 0.7 degrees, and the full width half maximum of an outgoing light luminous intensity distribution (in the XZ-plane) was 10.5 degrees, was placed in such a manner that the direction of the hairlines was substantially in parallel to the elongated prisms of the light deflector and the hairline formed surface was oriented toward the light deflector. In Table 9 are shown the results of a peak luminance ratio in an outgoing light luminance distribution (in the XZ-plane) of the produced surface light source device using Comparative Example 5 as a reference, a full width half maximum of the luminance distribution, and an evaluation of quality confirmed by visual observation in the surface light source device.

EXAMPLE 49

A surface light source device was obtained like in Example 1 except that a light diffuser wherein a polyester film having a thickness of 125 μm had one surface formed with, by etching, a lens array structure in which a number of cylindrical lens shaped members each having a width of 30 μm and a length of 60 μm were discretely arrayed in the same direction, a maximum average inclination angle was 6.0 degrees, and maximum average inclination angle/minimum average inclination angle was 6.0, and the other surface formed with a mat surface having an average inclination angle of 0.7 degrees, and the full width half maximum of an outgoing light luminous intensity distribution (in the XZ-plane) was 7.0 degrees, was placed in such a manner that the array direction of the cylindrical lens shaped members and the elongated prisms of the light deflector were substantially in parallel to each other and the surface of the lens array structure was oriented toward the light deflector. In Table 9 are shown the results of a peak luminance ratio in an outgoing light luminance distribution (in the XZ-plane) of the produced surface light source device using Comparative Example 5 as a reference, a full width half maximum of the luminance distribution, and an evaluation of quality confirmed by visual observation in the surface light source device.

TABLE 9

| | Light Diffuser | | | | | |
| --- | --- | --- | --- | --- | --- | --- |
| | Average Inclination Angle(°) | Full Width Half Maximum(°) | Haze Value(%) | Peak Luminance Ratio | Luminance Full Width Half Maximum(°) | Quality |
| Ex. 1 | — | — | — | 1.53 | 13.2 | Slightly Good |
| Ex. 45 | 7.27 | 9.4 | 73.60 | 1.12 | 17.7 | Good |
| Ex. 46 | 5.00 | 6.0 | 58.25 | 1.18 | 15.5 | Good |
| Ex. 47 | Max: 10.40 Min: 1.00 | 11.2 | 64.70 | 1.31 | 15.8 | Good Good |
| Ex. 48 | 8.20 | 10.5 | 62.00 | 1.27 | 16.2 | Good |
| Ex. 49 | Max: 6.00 Min: 1.00 | 7.0 | 55.00 | 1.34 | 15.4 | Good Good |
| Com. Ex. 5 | — | — | — | 1.00 | 24.3 | Glaring |

EXAMPLES 50 to 84

Using an acrylic resin, there was prepared, by injection molding, a light guide having a wedge shape in section of 14 inches and having one principal surface in the form of a mat surface and the other principal surface formed with elongated prisms successively arrayed side by side and each extending in a direction perpendicular to a light incident surface of the light guide. A cold-cathode tube primary light source was disposed facing the light incident surface of the light guide while being covered with a light source reflector (silver reflection film produced by Reikosha). Further, light diffusion reflection films (E60 produced by Toray Industries, Inc.) were stuck to the other side end surfaces, and a reflection sheet was disposed on the surface (back surface) of the elongated prism array. The foregoing structure was incorporated into a frame body. With respect to this light guide, the maximum peak of an outgoing light luminous intensity distribution was 70 degrees relative to the normal direction of a light outgoing surface, and the full width half maximum was 33 degrees.

On the other hand, using an acrylic ultraviolet curing resin having a refractive index of 1.5064, a prism sheet was prepared wherein an elongated prism formed surface was formed on one surface of a polyester film having a thickness of 125 μm. The elongated prism formed surface was formed with a number of elongated prisms successively arrayed in parallel to each other at a pitch of 50 μm, wherein a prism surface (first prism surface) forming each elongated prism and located on the side closer to the primary light source was formed as a substantially flat surface, while a prism surface (second prism surface) on the side farther from the primary light source had a surface formed as a substantially flat surface on the side closer to the prism vertex portion, and a surface formed into a convex curved surface shape on the side closer to a light exit surface. In this event, the shape of each elongated prism was formed in such a manner that an inclination angle α of the first prism surface, an inclination angle β of the second prism surface, an inclination angle γ of a chord of the convex curved surface shaped portion, a ratio (h/H) of a height (h) from the vertex portion of the elongated prism to the convex curved surface shaped portion relative to a height (H) of the elongated prism, a ratio (r/P) of a radius of curvature (r) of the convex curved surface shape relative to a pitch (P) of the elongated prisms, and a ratio (d/P) of a maximum distance (d) between the chord of the convex curved surface shaped portion and the convex curved surface shaped portion relative to the pitch (P) of the elongated prisms were given values as shown in Table 10.

The prism sheet was placed in such a manner that the elongated prism formed surface was oriented toward the light outgoing surface of the light guide, and the prism ridgelines were parallel to the light incident surface of the light guide, thereby obtaining a surface light source device. With respect to the obtained surface light source device, a peak luminance intensity ratio, a full width half maximum in an outgoing light luminance distribution in the plane perpendicular to the cold-cathode tube, and a peak angle of the outgoing light luminance distribution were measured, and the results thereof are shown in Table 10.

COMPARATIVE EXAMPLE 7

A surface light source device was obtained like in Example 50 except that the whole of each prism surface (second prism surface), on the side farther from the primary light source, of a prism sheet was formed into a convex curved surface shape of a circular arc in section having a radius of curvature of 400 μm. With respect to the obtained surface light source device, a peak luminance intensity ratio, a full width half maximum in an outgoing light luminance distribution in the plane perpendicular to the cold-cathode tube, and a peak angle of the outgoing light luminance distribution were measured, and the results thereof are shown in Table 10.

TABLE 10

|  |  | α(deg) | β(deg) | γ(deg) | h/H(%) | r/P | d/P(%) | Full Width Half Maximum(deg) | Luminance Ratio | Peak Angle(deg) |
|---|---|---|---|---|---|---|---|---|---|---|
| Ex. | 50 | 32.5 | 33.2 | 31 | 48 | 11.1 | 0.26 | 16.0 | 1.018 | −2 |
|  | 51 | 32.5 | 33.2 | 31 | 48 | 9.3 | 0.31 | 15.6 | 1.037 | −2 |
|  | 52 | 32.5 | 33.2 | 31 | 48 | 8.4 | 0.34 | 15.4 | 1.056 | −3 |
|  | 53 | 32.5 | 33.2 | 31 | 48 | 7.5 | 0.38 | 15.2 | 1.080 | −3 |
|  | 54 | 32.5 | 33.2 | 31 | 48 | 7.1 | 0.41 | 15.2 | 1.084 | −3 |
|  | 55 | 32.5 | 33.2 | 31 | 48 | 6.6 | 0.43 | 15.2 | 1.075 | −3 |
|  | 56 | 32.5 | 33.2 | 31 | 48 | 5.5 | 0.52 | 15.8 | 1.030 | −2 |
|  | 57 | 32.5 | 33.2 | 31 | 30.3 | 8.0 | 0.66 | 15.3 | 1.074 | −4 |
|  | 58 | 32.5 | 33.2 | 31 | 38.9 | 8.0 | 0.50 | 15.2 | 1.067 | −3 |
|  | 59 | 32.5 | 33.2 | 31 | 48 | 8.0 | 0.36 | 15.3 | 1.070 | −3 |
|  | 60 | 32.5 | 33.2 | 31 | 55.9 | 8.0 | 0.26 | 15.8 | 1.035 | −2 |
|  | 61 | 32.5 | 33.7 | 31 | 39.3 | 8.0 | 0.49 | 15.2 | 1.059 | −3 |
|  | 62 | 32.7 | 33.7 | 31 | 48.4 | 7.1 | 0.41 | 15.2 | 1.054 | −3 |
|  | 63 | 32.7 | 33.7 | 31 | 39.5 | 7.1 | 0.55 | 15.1 | 1.070 | −4 |
|  | 64 | 32.7 | 33.7 | 31 | 48.4 | 8.0 | 0.36 | 15.3 | 1.052 | −2 |
|  | 65 | 32.7 | 33.7 | 31 | 39.5 | 8.0 | 0.48 | 15.2 | 1.066 | −3 |
|  | 66 | 32.7 | 33.7 | 31 | 30.8 | 8.0 | 0.64 | 15.4 | 1.064 | −4 |
|  | 67 | 32.7 | 32.7 | 30 | 38.3 | 7.1 | 0.58 | 15.1 | 1.085 | −6 |
|  | 68 | 32.7 | 32.7 | 31 | 47.8 | 8.0 | 0.36 | 16.2 | 1.022 | −3 |
|  | 69 | 32.7 | 32.7 | 31 | 38.7 | 8.0 | 0.50 | 15.6 | 1.046 | −3 |
|  | 70 | 32.7 | 32.7 | 31 | 30.2 | 8.0 | 0.66 | 15.2 | 1.066 | −4 |
|  | 71 | 32.7 | 32.7 | 31 | 30.2 | 5.3 | 0.99 | 16.2 | 1.007 | −3 |
|  | 72 | 32.7 | 32.7 | 31 | 30.2 | 10.0 | 0.53 | 16.3 | 1.018 | −3 |
|  | 73 | 32.7 | 32.7 | 30 | 47.3 | 8.0 | 0.37 | 15.3 | 1.068 | −5 |
|  | 74 | 32.7 | 32.7 | 30 | 38.3 | 8.0 | 0.51 | 15.3 | 1.078 | −6 |
|  | 75 | 31.7 | 31.7 | 30 | 36.4 | 8.0 | 0.58 | 18.2 | 1.008 | −6 |
|  | 76 | 33.7 | 33.7 | 31 | 40.8 | 8.0 | 0.44 | 15.1 | 1.051 | −3 |
|  | 77 | 30.5 | 35.5 | 33.07 | 41 | 6.8 | 0.57 | 15.1 | 1.060 | 2 |
|  | 78 | 30.7 | 34 | 30 | 36.8 | 8.0 | 0.57 | 16.9 | 1.019 | −4 |
|  | 79 | 28.7 | 36.7 | 34 | 38.4 | 8.0 | 0.55 | 16.0 | 1.070 | 4 |
|  | 80 | 30.7 | 34.7 | 32 | 38.3 | 5.3 | 0.81 | 16.0 | 1.047 | 0 |
|  | 81 | 30.7 | 34.7 | 32 | 38.3 | 8.0 | 0.53 | 15.3 | 1.079 | −1 |
|  | 82 | 30.7 | 34.7 | 32 | 38.3 | 10.0 | 0.43 | 15.9 | 1.053 | 0 |
|  | 83 | 31.7 | 33.7 | 31 | 38.3 | 8.0 | 0.52 | 15.3 | 1.080 | −4 |
|  | 84 | 29.7 | 35.7 | 33 | 38.3 | 8.0 | 0.54 | 15.4 | 1.095 | 1 |
| Com. Ex. | 7 | 32.7 | 32.7 | — | — | 8.0 | 1.34 | 16.2 | 1.000 | −2 |

EXAMPLES 85 to 105

Using an acrylic resin, there was prepared, by injection molding, a light guide having a wedge shape in section of 14 inches and having one principal surface in the form of a mat surface and the other principal surface formed with elongated prisms successively arrayed side by side and each extending in a direction perpendicular to a light incident surface of the light guide. A cold-cathode tube primary light source was disposed facing the light incident surface of the light guide while being covered with a light source reflector (silver reflection film produced by Reikosha). Further, light diffusion reflection films (E60 produced by Toray Industries, Inc.) were stuck to the other side end surfaces, and a reflection sheet was disposed on the surface (back surface) of the elongated prism array. The foregoing structure was incorporated into a frame body. With respect to this light guide, the maximum peak of an outgoing light intensity distribution was 71 degrees relative to the normal direction of a light outgoing surface, and the full width half maximum was 21.5 degrees.

On the other hand, using an acrylic ultraviolet curing resin having a refractive index of 1.5064, a prism sheet was prepared wherein a elongated prism formed surface was formed on one surface of a polyester film having a thickness of 125 μm. The elongated prism formed surface was formed with a number of elongated prisms successively arrayed parallel to each other at a pitch of 50 μm, wherein a prism surface (first prism surface) forming each elongated prism and located on the side closer to the primary light source was formed as a substantially flat surface, while a prism surface (second prism surface) on the side farther from the primary light source had a surface formed as a substantially flat surface on the side closer to the vertex portion, and a surface formed into a convex curved surface shape on the side closer to a light exit surface. In this event, the shape of each elongated prism was formed in such a manner that an inclination angle α of the first prism surface, an inclination angle β of the second prism surface, an inclination angle γ of a chord of the convex curved surface shaped portion, a ratio (h/H) of a height (h) from the vertex portion of the elongated prism to the convex curved surface shaped portion relative to a height (H) of the elongated prism, a ratio (r/P) of a radius of curvature (r) of the convex curved surface shape relative to a pitch (P) of the elongated prisms, and a ratio (d/P) of a maximum distance (d) between the chord of the convex curved surface shaped portion and the convex curved surface shaped portion relative to the pitch (P) of the elongated prisms were given values as shown in Table 11.

The prism sheet was placed such that the elongated prism formed surface was oriented toward the light outgoing surface side of the light guide, and the prism ridgelines were parallel to the light incident surface of the light guide, thereby obtaining a surface light source device. With respect to the obtained surface light source device, a peak luminance intensity ratio, a full width half maximum in an outgoing light luminance distribution in the plane perpendicular to the cold-cathode tube, and a peak angle of the outgoing light luminance distribution were measured, and the results thereof are shown in Table 11.

COMPARATIVE EXAMPLE 8

A surface light source device was obtained like in Example 50 except that the whole of each prism surface (second prism surface), on the side farther from the primary light source, of a prism sheet was formed into a convex curved surface shape of a circular arc in section having a radius of curvature of 400 µm. With respect to the obtained surface light source device, a peak luminance intensity ratio, a full width half maximum in an outgoing light luminance distribution in the plane perpendicular to the cold-cathode tube, and a peak angle of the outgoing light luminance distribution were measured, and the results thereof are shown in Table 11.

TABLE 11

|  |  | α(deg) | β(deg) | γ(deg) | h/H(%) | r/P | d/P(%) | Full Width Half Maximum(deg) | LuminanceRatio | PeakAngle(deg) |
|---|---|---|---|---|---|---|---|---|---|---|
| Ex. | 85 | 32.5 | 33.2 | 31 | 48 | 8.4 | 0.34 | 14.2 | 1.007 | −3 |
|  | 86 | 32.5 | 33.2 | 31 | 48 | 7.5 | 0.38 | 14.1 | 1.027 | −3 |
|  | 87 | 32.5 | 33.2 | 31 | 48 | 7.1 | 0.41 | 14.1 | 1.031 | −3 |
|  | 88 | 32.5 | 33.2 | 31 | 48 | 6.6 | 0.43 | 14.2 | 1.022 | −3 |
|  | 89 | 32.5 | 33.2 | 31 | 30.3 | 8.0 | 0.66 | 13.7 | 1.020 | −4 |
|  | 90 | 32.5 | 33.2 | 31 | 38.9 | 8.0 | 0.50 | 13.8 | 1.008 | −3 |
|  | 91 | 32.5 | 33.2 | 31 | 48 | 8.0 | 0.36 | 14.1 | 1.019 | −3 |
|  | 92 | 32.5 | 33.7 | 31 | 39.3 | 8.0 | 0.49 | 13.6 | 1.029 | −4 |
|  | 93 | 32.7 | 33.7 | 31 | 48.4 | 7.1 | 0.41 | 13.8 | 1.007 | −3 |
|  | 94 | 32.7 | 33.7 | 31 | 39.5 | 7.1 | 0.55 | 13.5 | 1.042 | −4 |
|  | 95 | 32.7 | 33.7 | 31 | 38.3 | 8.0 | 0.48 | 13.6 | 1.023 | −3 |
|  | 96 | 32.7 | 33.7 | 31 | 30.8 | 8.0 | 0.64 | 13.7 | 1.026 | −4 |
|  | 97 | 32.7 | 32.7 | 30 | 38.3 | 7.1 | 0.58 | 13.4 | 1.034 | −6 |
|  | 98 | 32.7 | 32.7 | 31 | 30.2 | 8.0 | 0.66 | 13.9 | 1.005 | −4 |
|  | 99 | 32.7 | 32.7 | 30 | 47.3 | 8.0 | 0.37 | 13.7 | 1.013 | −5 |
|  | 100 | 32.7 | 32.7 | 30 | 38.3 | 8.0 | 0.51 | 13.6 | 1.029 | −6 |
|  | 101 | 30.5 | 35.5 | 33.07 | 41 | 6.8 | 0.57 | 13.6 | 1.011 | 2 |
|  | 102 | 30.7 | 34.7 | 32 | 38.3 | 8.0 | 0.53 | 13.6 | 1.028 | −1 |
|  | 103 | 31.7 | 33.7 | 31 | 38.3 | 8.0 | 0.52 | 13.7 | 1.040 | −4 |
|  | 104 | 29.7 | 35.7 | 33 | 38.3 | 8.0 | 0.54 | 13.6 | 1.052 | 1 |
|  | 105 | 28.7 | 36.7 | 34 | 38.4 | 8.0 | 0.55 | 13.6 | 1.034 | 3 |
| Com. Ex. | 8 | 32.7 | 32.7 | — | — | 8.0 | 1.34 | 14.0 | 1.000 | −2 |

INDUSTRIAL APPLICABILITY

As described above, according to the present invention, at least one of prism surfaces of each of elongated prisms formed at a light entrance surface of a light deflector is formed by a plurality of flat surface(s) and/or convex curved surface(s) having different inclination angles, so that it is possible to provide a light source device which achieves a high efficiency (utilization efficiency of the quantity of light from a primary light source) in allowing light emitted from the primary light source to convergently exit in a required observation direction.

Further, according to the present invention, at least one of prism surfaces of each of elongated prisms formed at a light entrance surface of a light deflector is formed by a substantially flat surface portion on the light entrance surface side and a convex curved surface shaped portion on the light exit surface side, so that it is possible to provide a light source device which allows light emitted from a primary light source to convergently exit in a required observation direction to thereby achieve a high efficiency, and further, which is easily formed in that a light exit surface of the light deflector is in the form of a flat surface and is thus simplified.

The invention claimed is:

1. A light deflector comprising a light entrance surface on which light is incident and a light exit surface located on an opposite side relative to said light entrance surface and allowing the incident light to exit therefrom, wherein said light entrance surface is formed with a plurality of elongated prisms arrayed substantially parallel to each other and each composed of two prism surfaces, at least one of said prism surfaces of each of the elongated prisms comprises at least two flat surfaces having mutually different inclination angles, any one of said flat surfaces located on a side closer to said light exit surface has a larger inclination angle, and a difference between the inclination angle of one of said flat surfaces closest to said light exit surface and the inclination angle of the other one of said flat surfaces farthest from said light exit surface is 15 degrees or less.

2. A light deflector comprising a light entrance surface on which light is incident and a light exit surface located on an opposite side relative to said light entrance surface and allowing the incident light to exit therefrom, wherein said light entrance surface is formed with a plurality of elongated prisms arrayed substantially parallel to each other and each composed of two prism surfaces, at least one of said prism surfaces of each of the elongated prisms comprises at least three flat surfaces having mutually different inclination angles, and any one of said flat surfaces located on a side closer to said light exit surface has a larger inclination angle, and wherein a difference between the inclination angle of one of said flat surfaces, one of said flat and convex curved surfaces or one of said convex curved surfaces closest to said light exit surface and the inclination angle of the other one of said flat surfaces or the other one of said flat and convex curved surfaces farthest from said light exit surface is 15 degrees or less.

3. A light deflector comprising a light entrance surface on which light is incident and a light exit surface located on an opposite side relative to said light entrance surface and allowing the incident light to exit therefrom, wherein said light entrance surface is formed with a plurality of elongated prisms arrayed substantially parallel to each other and each composed of two prism surfaces, at least one of said prism surfaces of each of the elongated prisms comprises at least two convex curved surfaces having mutually different inclination angles, and any one of said convex curved surfaces located on a side closer to said light exit surface has a larger inclination angle, and wherein a difference between the inclination angle of one of said flat surfaces, one of said flat and convex curved surfaces or one of said convex curved surfaces closest to said light exit surface and the inclination angle of the other one of said flat surfaces or the other one of said flat and convex curved surfaces farthest from said light exit surface is 15 degrees or less.

4. A light deflector according to claim 3, wherein shapes of said convex curved surfaces differ from each other.

5. A light deflector comprising a light entrance surface on which light is incident and a light exit surface located on an opposite side relative to said light entrance surface and allowing the incident light to exit therefrom, wherein said light entrance surface is formed with a plurality of elongated prisms arrayed substantially parallel to each other and each composed of two prism surfaces, at least one of said prism surfaces of each of the elongated prisms comprises at least two flat surfaces having mutually different inclination angles and at least one convex curved surface, and any one of said flat and convex curved surfaces located on a side closer to said light exit surface has a larger inclination angle.

6. A light deflector according to claim 5, wherein a difference between the inclination angle of one of said flat surfaces, one of said flat and convex curved surfaces or one of said convex curved surfaces closest to said light exit surface and the inclination angle of the other one of said flat surfaces or the other one of said flat and convex curved surfaces farthest from said light exit surface is 15 degrees or less.

7. A light deflector comprising one surface serving as a light entrance surface and the other surface located on an opposite side relative to said one surface and serving as a light exit surface, wherein said light entrance surface is formed with a plurality of elongated prisms arrayed parallel to each other, each of said elongated prisms has two prism surfaces being a first prism surface and a second prism surface, and at least said second prism surface is formed as a substantially flat surface at one portion thereof located on a side of a vertex portion of each of said elongated prisms while formed into a convex curved surface at the other portion thereof located on a side of said light exit surface, and wherein a ratio (h/H) of a height (h) from the vertex portion of each of said elongated prisms to a portion of the convex curved surface relative to a height (H) of each of said elongated prisms is 25 to 60%, and wherein a ratio (h/H) of a height (h) from the vertex portion of each of said elongated prisms to a portion of the convex curved surface relative to a height (H) of each of said elongated prisms is 25 to 60%, wherein an inclination angle α of said first prism surface is 28 to 34 degrees, an inclination angle α of said second prism surface is 32.5 to 37 degrees, and an inclination angle γ of a chord of said portion of convex curved surface is 30 to 35 degrees.

8. A light deflector comprising one surface serving as a light entrance surface and the other surface located on an opposite side relative to said one surface and serving as a light exit surface, wherein said light entrance surface is formed with a plurality of elongated prisms arrayed parallel to each other, each of said elongated prisms has two prism surfaces being a first prism surface and a second prism surface, and at least said second prism surface is formed as a substantially flat surface at one portion thereof located on a side of a vertex portion of each of said elongated prisms while formed into a convex curved surface at the other portion thereof located on a side of said light exit surface, and wherein a ratio (h/H) of a height (h) from the vertex portion of each of said elongated prisms to a portion of the convex curved surface relative to a height (H) of each of said elongated prisms is 25 to 60%, and wherein a ratio (h/H) of a height (h) from the vertex portion of each of said elongated prisms to a portion of the convex curved surface relative to a height (H) of each of said elongated prisms is 25 to 60%, and wherein a ratio (r/P) of a radius of curvature (r) of said convex curved surface relative to a pitch (P) of said elongated prisms is 5 to 11.

9. A light deflector according to claim 8, wherein an inclination angle α of said first prism surface is 28 to 32 degrees, an inclination angle β of said second prism surface is 33 to 37 degrees, an inclination angle γ of a chord of said portion of convex curved surface is 32 to 34 degrees, and the ratio (h/H) of the height (h) from the vertex portion of each of said elongated prisms to the portion of the convex curved surface relative to the height (H) of each of said elongated prisms is 30 to 450.

10. A light deflector comprising one surface serving as a light entrance surface and the other surface located on an opposite side relative to said one surface and serving as a light exit surface, wherein said light entrance surface is formed with a plurality of elongated prisms arrayed parallel to each other, each of said elongated prisms has two prism surfaces being a first prism surface and a second prism surface, and at least said second prism surface is formed as a substantially flat surface at one portion thereof located on a side of a vertex portion of each of said elongated prisms while formed into a convex curved surface at the other portion thereof located on a side of said light exit surface, and wherein a ratio (h/H) of a height (h) from the vertex portion of each of said elongated prisms to a portion of the convex curved surface relative to a height (H) of each of said elongated prisms is 25 to 60%, and wherein a ratio (d/P) of a maximum distance (d) between a chord of said portion of convex curved surface and said portion of convex curved surface relative to a pitch (P) of said elongated prisms is 0.2 to 20.

11. A light deflector according to claim 10, wherein an inclination angle α of said first prism surface is 28 to 32 degrees, an inclination angle β of said second prism surface is 33 to 37 degrees, an inclination angle γ of a chord of said portion of convex curved surface is 32 to 34 degrees, and the ratio (h/H) of the height (h) from the vertex portion of each of said elongated prisms to the portion of the convex curved surface relative to the height (H) of each of said elongated prisms is 30 to 45%.

12. A light deflector according to any one of claims 9 and 11, wherein an absolute value of a difference between the inclination angle α of said first prism surface and the inclination angle β of said second prism surface is 1.8 degrees or more and 8.5 degrees or less.

13. A light deflector according to claim 10, wherein an inclination angle α of said first prism surface is 32.5 to 34 degrees, an inclination angle β of said second prism surface is 32.5 to 34 degrees, an inclination angle γ of a chord of said portion of convex curved surface is 30 to 31.5 degrees, and the ratio (h/H) of the height (h) from the vertex portion of each of said elongated prisms to the portion of the convex curved surface relative to the height (H) of each of said elongated prisms is 25 to 500.

14. A light deflector comprising one surface serving as a light entrance surface and the other surface located on an opposite side relative to said one surface and serving as a light exit surface, wherein said light entrance surface is formed with a plurality of elongated prisms arrayed parallel to each other, each of said elongated prisms has two prism surfaces being a first prism surface and a second prism surface, and at least said second prism surface is formed as a substantially flat surface at one portion thereof located on a side of a vertex portion of each of said elongated prisms while formed into a convex curved surface at the other portion thereof located on a side of said light exit surface, and wherein a ratio (h/H) of a height (h) from the vertex portion of each of said elongated prisms to a portion of the convex curved surface relative to a height (H) of each of said elongated prisms is 25 to 60%, and wherein an inclination angle α of said first prism surface is 32.5 to 34 degrees, an inclination angle β of said second prism surface is 32.5 to 34 degrees, an inclination angle γ of a chord of said portion of convex curved surface is 30 to 31.5 degrees, the ratio (h/H) of the height (h) from the vertex portion of each of said elongated prisms to the portion of the convex curved surface relative to the height (H) of each of said elongated prisms is 25 to 50%, and a ratio (r/P) of a radius of curvature (r) of said convex curved surface relative to a pitch (P) of said elongated prisms is 5 to 10.

15. A light deflector according to any one of claims 14 and 13, wherein an absolute value of a difference between the inclination angle α of said first prism surface and the inclination angle β of said second prism surface is less than 0.3 degrees.

16. A light deflector comprising one surface serving as a light entrance surface and the other surface located on an opposite side relative to said one surface and serving as a light exit surface, wherein said light entrance surface is formed with a plurality of elongated prisms arrayed parallel to each other, each of said elongated prisms has two prism surfaces being a first prism surface and a second prism surface, and at least said second prism surface is formed as a substantially flat surface at one portion thereof located on a side of a vertex portion of each of said elongated prisms while formed into a convex curved surface at the other portion thereof located on a side of said light exit surface, and wherein a ratio (h/H) of a height (h) from the vertex portion of each of said elongated prisms to a portion of the convex curved surface relative to a height (H) of each of said elongated prisms is 25 to 60%, and wherein an inclination angle α of said first prism surface is 32 to 33.5 degrees, an inclination angle β of said second prism surface is 32.5 to 34.5 degrees, an inclination angle β of a chord of said portion of convex curved surface is 30 to 31.5 degrees, and a ratio (r/P) of a radius of curvature (r) of said convex curved surface relative to a pitch (P) of said elongated prisms is 5 to 9.5.

17. A light deflector comprising one surface serving as a light entrance surface and the other surface located on an opposite side relative to said one surface and serving as a light exit surface, wherein said light entrance surface is formed with a plurality of elongated prisms arrayed parallel to each other, each of said elongated prisms has two prism surfaces being a first prism surface and a second prism surface, and at least said second prism surface is formed as a substantially flat surface at one portion thereof located on a side of a vertex portion of each of said elongated prisms while formed into a convex curved surface at the other portion thereof located on a side of said light exit surface, and wherein a ratio (h/H) of a height (h) from the vertex portion of each of said elongated prisms to a portion of the convex curved surface relative to a height (H) of each of said elongated prisms is 25 to 60%, and wherein an inclination angle α of said first prism surface is 32 to 33.5 degrees, an inclination angle α of said second prism surface is 32.5 to 34.5 degrees, an inclination angle γ of a chord of said portion of convex curved surface is 30 to 31.5 degrees, and a ratio (d/P) of a maximum distance (d) between a chord of said portion of convex curved surface and said portion of convex curved surface relative to a pitch (P) of said elongated prisms is 0.2 to 20.

18. A light deflector according to any one of claims 16 and 17, wherein an absolute value of a difference between the inclination angle α of said first prism surface and the inclination angle α of said second prism surface is 0.3 degrees or more and less than 1.8 degrees.

19. A light deflector comprising a light entrance surface on which light is incident and a light exit surface located on an opposite side relative to said light entrance surface and allowing the incident light to exit therefrom, wherein said light entrance surface is formed with a plurality of elongated prisms arrayed substantially parallel to each other and each composed of two prism surfaces, at least one of said prism surfaces of each of the elongated prisms comprises at least three flat surfaces having mutually different inclination angles, and any one of said flat surfaces located on a side closer to said light exit surface has a larger inclination angle, wherein at least two of said flat surfaces and/or convex curved surface(s) are formed in a region from a prism vertex portion to a portion of height h from said prism vertex portion, and h/H is 60% or less where a height of each of the elongated prisms is given as H.

20. A light deflector comprising a light entrance surface on which light is incident and a light exit surface located on an opposite side relative to said light entrance surface and allowing the incident light to exit therefrom, wherein said light entrance surface is formed with a plurality of elongated prisms arrayed substantially parallel to each other and each composed of two prism surfaces, at least one of said prism surfaces of each of the elongated prisms comprises at least two convex curved surfaces having mutually different inclination angles, and any one of said convex curved surfaces located on a side closer to said light exit surface has a larger inclination angle, wherein at least two of said flat surfaces and/or convex curved surface(s) are formed in a region from a prism vertex portion to a portion of height h from said prism vertex portion, and h/H is 60% or less where a height of each of the elongated prisms is given as H.

21. A light deflector comprising a light entrance surface on which light is incident and a light exit surface located on an opposite side relative to said light entrance surface and allowing the incident light to exit therefrom, wherein said light entrance surface is formed with a plurality of elongated prisms arrayed substantially parallel to each other and each composed of two prism surfaces, at least one of said prism surfaces of each of the elongated prisms comprises at least two convex curved surfaces having mutually different inclination angles, and any one of said convex curved surfaces located on a side closer to said light exit surface has a larger inclination angle, wherein a ratio (r/P) of a radius of curvature (r) of said convex curved surface relative to a pitch (P) of said elongated prisms is 2 to 50.

22. A light deflector comprising a light entrance surface on which light is incident and a light exit surface located on an opposite side relative to said light entrance surface and allowing the incident light to exit therefrom, wherein said light entrance surface is formed with a plurality of elongated prisms arrayed substantially parallel to each other and each composed of two prism surfaces, at least one of said prism surfaces of each of the elongated prisms comprises at least three flat surfaces having mutually different inclination angles, and any one of said flat surfaces located on a side closer to said light exit surface has a larger inclination angle, wherein a ratio (d/P) of a maximum distance (d) between said flat surfaces and/or convex curved surface(s) and a virtual flat surface connecting between a prism vertex portion and a prism bottom portion relative to a pitch (P) of the elongated prisms is 0.4 to 5%.

23. A light deflector comprising a light entrance surface on which light is incident and a light exit surface located on an opposite side relative to said light entrance surface and allowing the incident light to exit therefrom, wherein said light entrance surface is formed with a plurality of elongated prisms arrayed substantially parallel to each other and each composed of two prism surfaces, at least one of said prism surfaces of each of the elongated prisms comprises at least two convex curved surfaces having mutually different inclination angles, and any one of said convex curved surfaces located on a side closer to said light exit surface has a larger inclination angle, wherein a ratio (d/P) of a maximum distance (d) between said flat surfaces and/or convex curved surface(s) and a virtual flat surface connecting between a prism vertex portion and a prism bottom portion relative to a pitch (P) of the elongated prisms is 0.4 to 5%.

24. A light deflector according to any one of claims 3, 5, 20, and 23, wherein a ratio (r/P) of a radius of curvature (r) of said convex curved surface relative to a pitch (P) of said elongated prisms is 2 to 50.

25. A light deflector according to any one of claims 3, 5, 20, 21, and 23, wherein said convex curved surface has a non-circular-arc shape in section.

26. A light deflector according to any one of claims 1 to 5 and 21 to 23, wherein at least two of said flat surfaces and/or convex curved surface(s) are formed in a region from a prism vertex portion to a portion of height h from said prism vertex portion, and h/H is 60% or less where a height of each of the elongated prisms is given as H.

27. A light deflector according to any one of claims 1 to 5 and 19 to 21, wherein a ratio (d/P) of a maximum distance (d) between said flat surfaces and/or convex curved surface(s) and a virtual flat surface connecting between a prism vertex portion and a prism bottom portion relative to a pitch (P) of the elongated prisms is 0.4 to 5%.

28. A light deflector according to any one of claims 1 to 5 and 19 to 23, wherein an allocated angle ($\alpha$) of a vertical angle of said elongated prisms is 40 degrees or less, while the other allocated angle ($\beta$) is 25 to 50 degrees.

29. A light deflector according to any one of claims 1 to 5 and 19 to 23, wherein an absolute ($|\alpha-\beta|$) of a difference between said two allocated angles $\alpha$ and $\beta$ is 0.5 to 10 degrees.

30. A light deflector according to any one of claims 1 to 5 and 19 to 23, wherein an allocated angle ($\alpha$) of a vertical angle of said elongated prisms is 40 degrees or less.

31. A light deflector according to any one of claims 1 to 5 and 19 to 23, wherein one of said prism surfaces forming said elongated prisms is formed by said flat surfaces and/or convex curved surface(s), while the other of the prism surfaces is a substantially flat surface.

32. A light source device comprising a primary light source, a light guide that guides light emitted from said primary light source and has a light incident surface on which the light emitted from said primary light source is incident, and a light outgoing surface from which the guided light exits, and said light deflector according to any one of claims 1 to 5 and 19 to 23 disposed adjacent to the light outgoing surface of said light guide.

33. A light deflector according to any one of claims 7 to 17, 14, 13, 9, and 11, wherein said first prism surface is a substantially flat surface.

34. A light source device comprising a primary light source, a light guide that guides light emitted from said primary light source and has a light incident surface on which the light emitted from said primary light source is incident, and a light outgoing surface from which the guided light exits, and said light deflector according to any one of claims 7 to 17, and 14 disposed adjacent to the light outgoing surface of said light guide.

* * * * *